(12) United States Patent
Sanada et al.

(10) Patent No.: US 7,957,476 B2
(45) Date of Patent: Jun. 7, 2011

(54) WIRELESS COMMUNICATON APPARATUS

(75) Inventors: Yukitoshi Sanada, Kanagawa (JP); Hideki Yokoshima, Kanagawa (JP); Masayoshi Abe, Tokyo (JP); Yuya Kondo, Kanagawa (JP); Mamiko Inamori, Kanagawa (JP); Kazuyuki Saijo, Tokyo (JP)

(73) Assignee: Sony Corporation, Tokyo (JP)

( * ) Notice: Subject to any disclaimer, the term of this patent is extended or adjusted under 35 U.S.C. 154(b) by 900 days.

(21) Appl. No.: 11/747,676

(22) Filed: May 11, 2007

(65) Prior Publication Data

US 2008/0089443 A1   Apr. 17, 2008

(30) Foreign Application Priority Data

May 16, 2006 (JP) ................. 2006-137047
Feb. 19, 2007 (JP) ................. 2007-037719
Apr. 17, 2007 (JP) ................. 2007-108046

(51) Int. Cl.
*H04K 1/10* (2006.01)
*H04L 27/28* (2006.01)

(52) U.S. Cl. ........ 375/260; 375/267; 370/203; 370/208; 370/210

(58) Field of Classification Search .......... 370/203–211; 375/260, 267
See application file for complete search history.

(56) References Cited

U.S. PATENT DOCUMENTS

| | | |
|---|---|---|
| 2003/0133518 A1 | 7/2003 | Koomullil et al. |
| 2003/0174790 A1 | 9/2003 | Ho et al. |
| 2004/0146122 A1 * | 7/2004 | Fague et al. .................. 375/326 |
| 2004/0202102 A1 | 10/2004 | Kim et al. |
| 2005/0020226 A1 | 1/2005 | Mohindra |
| 2005/0078509 A1 | 4/2005 | Parkin |
| 2005/0276358 A1 | 12/2005 | Pipilos |

OTHER PUBLICATIONS

Batra, "Multi-band OFDM Physical Layer Proposal", IEEE P802.15, Jul. 14, 2003.
Namgoong et al., "Direct-Conversion RF Receiver Design", IEEE Transactions on Communications, vol. 49, No. 3, Mar. 2001, pp. 518-529.
Gil et al., "Joint ML Estimation of Carrier Frequency, Channel, I/Q Mismatch, and DC Offset in Communication Receivers", IEEE Transactions on Vehicular Technology, vol. 54, No. 1, Jan. 2005, pp. 338-349.

(Continued)

*Primary Examiner* — Curtis B Odom
(74) *Attorney, Agent, or Firm* — K&L Gates LLP

(57) ABSTRACT

A wireless communication apparatus for receiving a packet formed of a signal modulated by OFDM includes the following elements. A band-pass filter extracts an OFDM signal of a desired band. A low-noise amplifier having a gain controlled according to a received-signal intensity amplifies the desired OFDM signal. A frequency converter down-converts the amplified OFDM signal into a baseband signal. An analog-digital converter converts the baseband signal into a digital signal. A first high-pass filter removes a DC offset from the baseband signal corresponding to a predetermined preamble portion of the packet. A frequency-offset estimator estimates a frequency offset from the sample signals constituting the baseband signal from which the DC offset has been removed by the first high-pass filter. A frequency-offset corrector removes the estimated frequency offset from the baseband signal. A demodulator demodulates subcarrier signals arranged in a frequency domain from the baseband signal compensated for the frequency offset.

31 Claims, 44 Drawing Sheets

OTHER PUBLICATIONS

Ho et al., "Low Complexity Frequency Offset Estimation in the Presence of DC Offset", Proc. of IEEE International Conference on Communications 2003, vol. 3, May 2003, pp. 2051-2055.

Yuba et al., "Decision Directed Scheme for IQ Imbalance Compensation on OFCDM Direct Conversion Receiver", IEICE Trans. on Communications, vol. E89-E, No. 1, Jan. 2006, pp. 184-190.

Olsson et al., "WLAN/WCDMA Dual-Mode Receiver Architecture Design Trade-Offs", IEEE 6th CAS Symp., vol. 2, May 31-Jun. 2, 2004, pp. 725-728.

Itani, "OFDM Modulation Technique", (Triceps, 2000).

IEEE Std. 802. 11a-1999, Part 11: Wireless LAN Medium Access Control (MAC) and Physical Layer (PHY) specification: High-speed Physical Layer in the 5 GHZ Band.

IEEE Std. 802. 11g-2003, Part 11: Wireless LAN Medium Access Control (MAC) and Physical Layer (PHY) specifications: Amendment 4: Further Higher Data Rate Extension in the 2.4 GHz Band.

Otaka et al., "A Low Offset 1.9-GHz Direct Conversion Receiver IC with Spurious Free Dynamic Range of over 67 dB,"IEICE Trans. Fundamentals, vol. E84 A, No. 2, Feb. 2001, pp. 514-519.

* cited by examiner

<u>21</u>

<u>21</u>

WIRELESS COMMUNICATON APPARATUS

CROSS REFERENCES TO RELATED APPLICATIONS

The present application claims priority to Japanese Patent Applications JP 2006-137047 filed in the Japanese Patent Office on May 16, 2006, JP 2007-037719 filed in the Japanese Patent Office on Feb. 19, 2007, and JP 2007-108046 filed in the Japanese Patent Office on Apr. 17, 2007, the entire contents of which are incorporated herein by reference.

BACKGROUND

The present application relates to wireless communication apparatuses for receiving radio-frequency (RF) signals modulated by orthogonal frequency division multiplexing (OFDM). In particular, the present invention relates to wireless communication apparatuses for receiving OFDM signals using a direct-conversion architecture in which no intermediate-frequency (IF) stage is used.

More specifically, the present application relates to a wireless communication apparatus for removing a frequency offset using a training sequence added to the header of packets and demodulating OFDM symbols. In particular, the present invention relates to a wireless communication apparatus for accurately estimating a frequency offset in the presence of both time-varying DC offsets and in-phase and quadrature-phase (IQ) imbalance in received OFDM symbols.

Wireless networks have been attracted attention as cable-free systems in place of traditional wired communication systems. IEEE (The Institute of Electrical and Electronics Engineers) 802.11 is a standard commonly used for wireless networks.

For example, when a wireless network is set up in an indoor environment, there occurs a problem in that a receiving apparatus receives a superposition of a direct wave and a plurality of reflected waves and delayed waves, that is, multipath reception occurs. The multipath reception causes delay distortion (or frequency selective fading), resulting in communication errors. The delay distortion causes interference between symbols. In wireless local area network (LAN) standards such as IEEE 802.11a/g, the OFDM modulation scheme, which is one of multicarrier modulation schemes, is adopted (see, for example, IEEE 802.11a, Part 11: Wireless LAN Medium Access Control (MAC) and Physical Layer (PHY) specifications: High-speed Physical Layer in the 5 GHZ Band; and IEEE 802.11g, Part 11: Wireless LAN Medium Access Control (MAC) and Physical Layer (PHY) specifications: High-speed Physical Layer in the 2.4 GHZ Band).

TABLE

|  | Standard | |
| --- | --- | --- |
|  | IEEE 802.11a | IEEE 802.11g |
| Used Frequency | 5.2 GHz | 2.4 GHZ |
| Maximum Transmission Speed | 54 Mbps | 54 Mbps |
| Modulation Scheme | OFDM | OFDM |

An OFDM transmitter converts information transmitted by serial signals into parallel data for each symbol period with a rate lower than an information transmission rate, and assigns the plurality of parallel data streams to subcarriers for modulation of the amplitude and phase for each of the subcarriers. The OFDM transmitter further performs an inverse fast Fourier transform (IFFT) on the plurality of subcarriers to convert the frequency-domain subcarriers into time-domain signals, and transmits the resulting signals. An OFDM receiver performs an operation reverse to the operation of the OFDM transmitter. That is, the OFDM receiver performs a fast Fourier transform (FFT) to convert the time-domain signals into frequency-domain signals for demodulation according to the modulation schemes corresponding to the subcarriers. The OFDM receiver further performs parallel-serial conversion, and reproduces the original information transmitted by the serial signal. The frequencies of the carriers are determined so that the subcarriers are orthogonal to each other over the symbol periods. The subcarriers being orthogonal to each other means that the peak point of the spectrum of a given subcarrier constantly matches the zero points of the spectra of other subcarriers and no crosstalk occurs therebetween. Accordingly, transmission data is transmitted over a plurality of carriers with orthogonal frequencies, and advantages of narrow bandwidths of the carriers, high frequency-use efficiency, and high resistance to frequency selective fading are achieved. An effective OFDM modem can therefore be implemented by using FFT algorithm. The OFDM transmission scheme is used in wireless LAN systems and various other broadband digital communication systems such as terrestrial digital broadcasting systems (see, for example, J. Olsson, "WLAN/WCDMA Dual-Mode Receiver Architecture Design Trade-Offs," Proc. of IEEE 6th CAS Symp., vol. 2, pp. 725-728, 31 May to 2 Jun., 2004), and fourth-generation mobile communication systems, and power line carrier communication systems.

In the RF front-end of a wireless communication apparatus, during transmission, generally, after an analog baseband signal is up-converted into an RF band signal using a frequency converter (quadrature modulator) and is band-limited using a band-pass filter, the transmission power is amplified using a variable gain amplifier circuit. During reception, the signal received by an antenna is amplified by a low-noise amplifier (LNA), and is then down-converted into a baseband signal using a local frequency $f_{LO}$. An automatic gain control (AGC) circuit is used to maintain the current of the self signal at an appropriate constant level.

In recent wireless communication apparatuses, a frequency converter that up-converts or down-converts a transmission/reception signal uses a direct-conversion architecture to perform direct frequency conversion using a carrier frequency $f_c$ as the local frequency $f_{LO}$. The direct-conversion architecture does not use an external intermediate frequency (IF) filter (also referred to as an "RF interstage filter"), leading to reduction in size and power consumption and increased integration compared with the superheterodyne structure. Further, in principle, no spurious frequencies are generated, and the direct-conversion architecture is superior in terms of design of the transmitter and receiver. In the direct-conversion receiver architecture, however, there has been pointed out a problem in that due to the equality of the receiving frequency and the local frequency, a direct-current component, or DC offset, is caused at the down-converter output by self-mixing of a local signal (see, for example, Anuj Batra, "03267r1P802-15_TG3a-Multi-band-OFDM-CFP-Presentation.ppt", pp. 17, Jul. 2003). Self-mixing occurs due to the finite isolation between the local signal and the RF port of the low-noise amplifier or the mixer. The term DC, as used herein, is defined as 0 Hz (zero IF) in a baseband signal in the OFDM modulation scheme.

OFDM communication systems have a problem in that a small error between frequencies of oscillators in a transmitter and a receiver (for example, in a wireless LAN, oscillators with an accuracy of about 20 ppm are used) causes a frequency offset in the receiver. Although subcarriers do not interfere with each other, frequency orthogonality between the subcarriers is not maintained in the presence of frequency offsets, resulting in degradation in the demodulation characteristics, i.e., errors in received data.

In packet-switched wireless communication systems such as an IEEE 802.11 communication system, symbols known to both the transmitter and the receiver, i.e., a training sequence, are placed at the head of each packet. The receiver uses the received training sequence to perform automatic gain control of the low-noise amplifier, DC-offset estimation and removal, frequency-offset estimation and removal, packet detection, and timing detection. If the frequency-offset processing is implemented by an analog circuit, complexity of circuit structure and power consumption are increased. Therefore, the present inventors consider it preferable that the frequency-offset estimation and compensation processing be implemented by digital processing. In response to an observation of frequency offset, the phase of the data is inverted to correct the frequency offset.

The problem of frequency offset will be examined in the context of IEEE 802.11a/g. FIG. 15 shows the preamble structure specified in IEEE 802.11a/g (see, for example, M. Itami, "OFDM Modulation Technique," Triceps, 2000; and IEEE 802.11a, Part 11: Wireless LAN Medium Access Control (MAC) and Physical Layer (PHY) specifications: High-speed Physical Layer in the 5 GHZ Band). As shown in FIG. 15, a short preamble period of 8.0 µs and a long preamble period of 8.0 µs are added to the head of a packet. The short preamble period is formed of a short training sequence (STS), in which ten short preamble symbols $t_1$ to $t_{10}$ are repeatedly transmitted. The long preamble period is formed of a long training sequence (LTS), in which two long preamble symbols $T_1$ to $T_2$ are repeatedly transmitted after a guard interval GI2 of 1.6 µs. One short preamble symbol is formed of 12 subcarriers, and has a length of 0.8 µs, which corresponds to one quarter of an IFFT/FFT period TFFT. One long preamble symbol is formed of 52 subcarriers, and has a length of 3.2 µs, which corresponds to the IFFT/FFT period TFFT. As shown in FIG. 30, an OFDM signal does not include the DC or 0-Hz subcarrier to avoid DC-offset interference.

IEEE 802.11a/g does not specify the use of preambles. In general, a receiver sets the gain of the receiver and corrects a DC offset using four STS symbols of 0.8 µs, and performs frequency-offset estimation and correction, packet detection, and coarse timing detection using the remaining six STS symbols.

The frequency-offset estimation can be derived using the 0.8-microsecond periodicity of the STS according to equation (1) as follows:

$$\Delta f(k) = \frac{1}{2\pi T_{STS}} \frac{1}{M} \sum_{i=k}^{k+M-1} \arg(S(i)S(i-16)^*) \quad (1)$$

where $T_{sts}$ indicates 0.8 microseconds, S(i) denotes an STS signal sampled at a frequency of 20 MHz, S*(i) denotes the complex conjugate of the STS signal, and M denotes the average number of samples.

Packet detection and coarse timing detection can be performed on the basis of a correlation value normalized by the STS power level, which is given by equation (2) below:

$$CF(k) = \frac{1}{N} \sum_{i=k}^{k-M-1} \frac{S(i)S(i-16)^*}{S(i)S(i)^*} \quad (2)$$

where N denotes the average number of samples.

In the packet detection, a threshold level is set for the correlation value given by equation (2) above, and a packet is detected when a correlation value exceeds the threshold level. In the coarse timing detection, the characteristic that the correlation value is changed from the increase to the decrease at the end of the STS is utilized. That is, the currently determined correlation value is compared with the previously determined correlation value to determine a coarse timing.

Accordingly, the receiver performs automatic gain control of the low-noise amplifier, DC-offset estimation and removal, frequency-offset estimation and removal, packet detection, and timing detection using the preamble portion of each packet.

However, the accuracy of frequency-offset estimation, packet detection, and timing detection is sensitive to DC offsets, and there arises a problem in that it is difficult to accurately estimate a frequency offset in the presence of DC offsets. In the above-described direct-conversion architecture in particular, the problem of DC offset caused by self-mixing is serious, and the quality of the received signal may be impaired by both frequency offsets and DC offsets.

For example, in the presence of a DC offset at the I-axis and Q-axis inputs, the correlation value increases even during silent periods. That is, the correlation value is constantly increased by one, and as a result of the continuous increase, the correlation value exceeds the threshold value that packet detection is based on. Therefore, the receiver recognizes that a packet is received even during silent periods, resulting in an operation error.

In the presence of a DC offset at the I-axis and Q-axis inputs, further, even in a portion where received signals are not correlated with each other, the correlation value is not changed from the increase to the decrease due to the influence of the DC offset. Therefore, the coarse-timing-detection characteristics are degraded.

In the presence of a DC offset, further, the accuracy of frequency-offset estimation is lowered, and residual frequency offsets cause further degradation in characteristics of the received signal. A frequency offset that has not been removed causes a phase rotation of the overall subcarriers of the OFDM symbols subsequent to the training sequence, and causes error floor in which packet errors still occur even if the signal-to-noise (SN) ratio is increased. Conversely, when a DC offset is estimated in the presence of a frequency offset, it is difficult to accurately estimate the DC offset. Therefore, it is desirable to address the presence of both DC offsets and frequency offsets.

As described above, it is desirable to perform high-accuracy DC-offset correction in the preceding stage of a frequency-offset correction circuit module within a period of time as short as the first four STS symbols $t_1$ to $t_4$. In general, it is difficult to implement short-time high-accuracy DC-offset correction, and the power consumption and the circuit size are considerably increased.

There have been a method for removing a DC offset using a high-pass filter (HPF), a method for estimating a DC offset and a frequency offset at the same time, a method for estimating a DC offset and a frequency offset in parallel, a method for repeating DC-offset estimation and frequency-offset compensation, and the like.

FIG. 16 schematically shows the structure of a receiver that removes a DC offset using an HPF (see, for example, W. Namgoong and T. H. Meng, "Direct-Conversion RF Receiver Design", IEEE Trans. on Commun. Vol. 49, No. 3, March 2001). In the receiver shown in FIG. 16, the DC-offset component included in received OFDM symbols is removed using the HPF. Then, signal processing is performed to estimate a frequency offset, and the frequency offset is removed from the OFDM symbols subsequent to the training sequence. In this method, however, the HPF attenuates a near-DC signal in the OFDM symbols, and the demodulation characteristics may be degraded.

One approach to prevent the attenuation of a near-DC signal is to sufficiently reduce the cutoff frequency $f_c$ of the HPF relative to the subcarrier spacing (see FIG. 17A). However, if the gain of the low-noise amplifier is changed by automatic gain control, there is a problem in that a time-varying DC offset is generated (see, for example, S. Otaka, T. Yamaji, R. Fujimoto, and H. Tanimoto, "A Low Offset 1.9 GHz Direct Conversion Receiver IC with Spurious Free Dynamic Range of over 67 dB", IECE Trans. on Fundamentals, vol. E84-A, no. 2, pp. 513-519, February 2001). The HPF with low cutoff frequency $f_c$ has low response, and a time-varying DC offset may be transmitted through the HPF.

For example, in the preamble structure shown in FIG. 15, the gain of the low-noise amplifier is changed from high to low around the center of the short preamble period. A DC offset largely varies over time in accordance with the change in gain, and the high-frequency component is included in the DC offset (see part (a) of FIG. 31). Since the HPF with low cutoff frequency $f_c$ has low response, the high-frequency component of the time-varying DC offset is transmitted through the HPF, and also passes through a frequency-offset estimator in the subsequent stage. Such a residual DC offset affects fine frequency-offset estimation performed in the long preamble period if it still exists in the subsequent long preamble period (see part (b) of FIG. 31), resulting in low estimation accuracy.

For example, in IEEE 802.11a/g, the preamble period is significantly short, and it is desirable that a residual DC offset be rapidly converged using the HPF. The convergence time is minimized by greatly increasing the cutoff frequency $f_c$ of the HPF (see, for example, T. Yuba and Y. Sanada, "Decision Directed Scheme for IQ Imbalance Compensation on OFDCM Direct Conversion Receiver", IEICE Trans. on Communications, vol. E89-B, no. 1, pp. 184-190, January 2006).

The HPF with an increased cutoff frequency $f_c$ has high response to changes in DC offset caused by changing the gain of the low-noise amplifier, and may cut even an effective near-DC signal (see FIG. 17B). Therefore, the OFDM demodulation characteristics may be degraded.

In view of better transient response and fast convergence speed, it is preferable that the cutoff frequency $f_c$ of the HPF be high. In the preamble structure shown in FIG. 15, in the STS having a spacing of 1.25 MHz between the DC component and the subcarrier nearest the DC component, the signals of the near-DC subcarriers are not cut even if the cutoff frequency is high. In the subsequent LTS having a spacing of 312.5 kHz between the subcarriers nearest DC, however, the HPF would cut the signals of the near-DC subcarriers, resulting in degradation in the demodulation characteristics.

FIG. 18 schematically shows the structure of a receiver that estimates a DC offset and a frequency offset at the same time (see, for example, G. T. Gil, I. H. Sohn, J. K. Park, and Y. H. Lee, "Joint ML Estimation of Carrier Frequency, Channel, I/Q Mismatch, and DC Offset in Communication Receivers", IEEE Trans. on Vehi. Tech., Vol. 54, No. 1, January 2005). In the receiver shown in FIG. 18, a DC offset and a frequency offset are simultaneously estimated and compensated using a maximum likelihood estimation method. However, due to the large amount of computation and the long computation time of the maximum likelihood estimation method, it is difficult to implement maximum likelihood estimation in a system with limited offset compensation time. In the preamble structure shown in FIG. 15, it is desirable that DC-offset estimation be completed within about the first four STS symbols $t_1$ to $t_4$, i.e., about 3.2 microseconds.

FIG. 19 schematically shows the structure of a receiver that estimates a DC offset and a frequency offset in parallel (see, for example, C. K. Ho, S. Sun, and P. He, "Low Complexity Frequency Offset Estimation in the Presence of DC Offset", Proc. of IEEE International Conference on Communications 2003, Vol. 3, pp. 2051-2055, May 2003; and U.S. Patent Application Publication Nos. 2003/0174790 and 2005/0078509). A DC-offset estimator estimates a DC offset by averaging over the overall preambles. A frequency-offset estimator in the subsequent stage calculates the correlation function of the preamble signal, and subtracts the estimated DC offset to estimate an accurate frequency offset from the DC-offset-removed signal. However, if the level of the DC offset is changed by changing the gain of the low-noise amplifier or the like during the reception of preambles, the DC offset may be incorrectly estimated.

FIG. 20 schematically shows the structure of a receiver that repeats DC-offset estimation and frequency-offset compensation (see, for example, U.S. Patent Application Publication Nos. 2005/0020226, 2003/0133518, 2004/0202102, and 2005/0276358). In the receiver shown in FIG. 20, a DC-offset remover removes a DC offset, and then a frequency offset is estimated. After the frequency offset is compensated, a DC offset is further estimated to cancel a residual DC offset. This method takes a long time for convergence of a feedback loop for DC-offset removal, and it is difficult to use the method for short preambles. Further, if a DC offset is varied by changing the gain of the low-noise amplifier or the like, errors occur in the frequency-offset estimation.

As is known, the DC-offset level varies in accordance with a change of the gain set in the low-noise amplifier. The receivers shown in FIGS. 18 to 20 do not take sufficient account of DC offsets varying over time in accordance with changes of the gain in the low-noise amplifier.

OFDM direct-conversion receivers also have a problem of IQ imbalance as well as DC offset caused by self-mixing of a local signal. The direct-conversion architecture does not use IF signals in the digital domain, and IQ quadrature demodulation is not performed in the digital domain but is performed in the analog domain. IQ imbalance is caused by imbalance between in-phase (I) components and quadrature-phase (Q) components. In particular, IQ phase imbalance is caused by non-90-degree phase difference between local signals input to I-channel and Q-channel mixers, and IQ gain imbalance is caused by gain difference between signals in the I channel and Q channel (see, for example, T. Yuba and Y. Sanada, "Decision Directed Scheme for IQ Imbalance Compensation on OFDCM Direct Conversion Receiver", IEICE Trans. on Communications, vol. E89-B, no. 1, pp. 184-190, January 2006). Like DC offsets, IQ imbalances cause degradation in accuracy of frequency-offset estimation, and also affect the decoding characteristics.

In the OFDM direct-conversion receiver architecture, therefore, the quality of received signals may be impaired due to frequency offset, DC offset, and IQ imbalance. The receivers shown in FIGS. 18 to 20 do not take account of both time-varying DC offset and IQ imbalance.

SUMMARY

It is therefore desirable to provide an excellent wireless communication apparatus using a direct-conversion architecture, in which a frequency offset can be appropriately removed to achieve OFDM demodulation with higher characteristics in the presence of a time-varying DC offset.

It is further desirable to provide an excellent wireless communication apparatus in which a DC offset can be removed and a frequency offset can be accurately estimated in the concurrent presence of a time-varying DC offset, an IQ imbalance, and a frequency offset in received OFDM symbols.

According to a first embodiment, there is provided a wireless communication apparatus for receiving a packet formed of a signal modulated by orthogonal frequency division multiplexing (OFDM). The wireless communication apparatus includes the following elements. A band-pass filter extracts an OFDM signal of a desired band. A low-noise amplifier having a gain controlled according to a received-signal intensity amplifies the OFDM signal of the desired band. A frequency converter down-converts the amplified OFDM signal into a baseband signal. An analog-digital converter converts the baseband signal into a digital signal. A first high-pass filter removes a DC offset from the baseband signal corresponding to a predetermined preamble portion of the packet. A frequency-offset estimator estimates a frequency offset from sample signals constituting the baseband signal from which the DC offset has been removed by the first high-pass filter. A frequency-offset corrector removes the estimated frequency offset from the baseband signal. A demodulator demodulates subcarrier signals arranged in a frequency domain from the baseband signal compensated for the frequency offset.

An embodiment relates to a wireless communication apparatus for receiving an OFDM signal using a direct-conversion architecture. The direct-conversion architecture in which no IF filter is used easily realizes a wide-band receiver, and allows for flexibility in the receiver design. However, there is a problem in that a DC offset caused by self-mixing of a local signal affects frequency offset or timing detection.

In the wireless communication apparatus according to the embodiment, after DC offsets are removed using a first high-pass filter from a portion of a baseband signal corresponding to a predetermined preamble portion of a packet, a frequency offset is estimated with high accuracy. The estimated frequency offset is removed from a portion of the received baseband signal subsequent to the portion in which the frequency offset has been estimated.

A differential filter having a simple circuit structure is used as the first high-pass filter to remove a DC offset. The differential filter has sufficiently high response to changes in DC-offset level caused by changing the gain of the low-noise amplifier or the like during the reception of preambles.

If the cutoff frequency $f_c$ for DC-offset removal is increased, the response to changes in DC offset caused by changing the gain of the low-noise amplifier is increased. However, there occurs a problem in that even a near-DC signal is cut, resulting in degradation in the demodulation characteristics (see FIG. 17B). However, since the preamble portion used for frequency-offset estimation is divided and DC-offset removal is performed, the increased cutoff frequency $f_c$ may not affect the demodulation characteristics in the subsequent data portion.

If a DC offset rapidly changes due to a change in the gain of the low-noise amplifier or the like, the DC offset may be transmitted through the differential filter. Therefore, the differential filter serving as the first high-pass filter may be configured to, upon detecting a rapid DC-offset change, input a detection signal to the frequency-offset estimator in the subsequent stage. The frequency-offset estimator does not perform frequency-offset estimation for a sample signal obtained from the differential filter when the detection signal is input. Thus, high estimation accuracy is achieved.

It is assumed that the OFDM signal input to the wireless radio communication apparatus does not include a DC subcarrier. The frequency-offset estimator may be configured to estimate a frequency offset using a preamble in which two OFDM symbols are transmitted.

Specifically, one OFDM symbol is formed of n subcarriers. When an i-th sample of the time waveform of the two transmitted OFDM symbols is represented by s(i), samples of the first transmitted OFDM symbol are represented by {s(0), s(1), ..., s(n−1)}, samples of the second transmitted OFDM symbol are represented by {s(n), s(n+1), ..., s(2n−1)}, the frequency offset is represented by Δf, and the DC offset is represented by D, the first high-pass filter may be configured to perform an operation given by equation (4) below on the received baseband signal given by equation (3) below, and to output a sample signal d(i):

$$r(i) = s(i)\exp(j2\pi\Delta fi) + D \quad (3)$$

$$\begin{aligned} d(i) &= r(i+1) - r(i) \\ &= s(i+1)\exp(j2\pi\Delta f(i+1)) - s(i)\exp(j2\pi\Delta fi) \end{aligned} \quad (4)$$

The frequency-offset corrector may be configured to perform an operation given by equation (5) below using the sample signal d(i) to estimate the frequency offset Δf included in the received baseband signal r(i):

$$\begin{aligned} d(i+n)/d(i) &= \frac{s(i+1+n)\exp(j2\pi f(i+1+n)) - s(i+n)\exp(j2\pi f(i+n))}{s(i+1)\exp(j2\pi f(i+1)) - s(i)\exp(j2\pi f(i))} \\ &= \exp(j2\pi\Delta f(n)) \end{aligned} \quad (5)$$

In IEEE 802.11a/g, which is one example of wireless communication system according to an embodiment, short preambles and long preambles having repetitions of transmission of the same symbol are included at the head of each packet. Therefore, by performing the above-described operations, a frequency offset can be more accurately estimated from the signal from which the DC offset has been removed.

The sample signal d(i) output from the first high-pass filter formed of the differential filter is determined by equation (4) above. More specifically, as given by equation (6) below, a DC-offset change between the i-th and (i+1)-th samples, given by D(i+1)−D(i), is added to the sample signal d(i). No problem occurs if the amount of DC-offset change is small. However, if the DC offset largely varies between the sample signals due to a change in the gain of the low-noise amplifier or the like, the DC offset affects frequency-offset estimation:

$$\begin{aligned} d(i) &= r(i+1) - r(i) \\ &= \{s(i+1)\exp(j2\pi\Delta f(i+1)) - s(i)\exp(j2\pi\Delta fi)\} + \\ &\quad \{D(i+1) - D(i)\} \end{aligned} \quad (6)$$

Therefore, when the absolute value of the sample output d(i) is large due to a DC-offset change between the i-th and (i+1)-th samples, given by D(i+1)−D(i), the first high-pass filter may be configured to output the detection signal to the frequency-offset estimator in the subsequent stage. In response to the detection signal, the frequency-offset estimator does not perform frequency-offset estimation for the i-th sample output using the operation given by equation (5) above. Thus, high estimation accuracy is achieved.

As described above, the frequency-offset estimator estimates a frequency offset from the signal from which the DC offset has been removed. The frequency-offset corrector removes the frequency offset estimated by the frequency-offset estimator from the portion of the received baseband signal subsequent to the portion used for frequency-offset estimation (that is, from which no DC offset has been removed). In other words, while a DC offset is removed only for a preamble portion in which frequency-offset estimation is performed, a frequency offset is removed but a DC offset is not removed for a preamble portion subsequent to the portion used for the frequency-offset estimation and a payload portion. In such a case, there may arise a problem in that the DC offset influences a demodulation circuit in the subsequent stage even though the frequency-offset estimation is performed with high accuracy.

Therefore, preferably, means for removing a DC offset is also provided in the portion subsequent to the portion in which a frequency offset has been estimated in the received baseband signal.

For example, in the case where the frequency converter uses a direct-conversion architecture, the phase of the local frequency oscillated by the local oscillator may be inverted according to the frequency offset estimated by the frequency-offset estimator. Therefore, the effect of both DC offset and frequency offset can be eliminated from the portion of the received baseband signal including a DC offset subsequent to the portion in which the frequency offset has been estimated.

Alternatively, the wireless communication apparatus may further include a DC-offset estimator that estimates a DC offset in the digital baseband signal converted by the analog-digital converter, and the estimated DC offset may be removed from the converted digital baseband signal.

A DC offset is typically estimated by averaging of a converted digital baseband signal. Therefore, if a DC offset rapidly changes due to a change in the gain of the low-noise amplifier or the like, the average value is no longer useful, and continuation of DC-offset estimation would cause degradation in accuracy. Therefore, upon detecting a rapid DC-offset change, the differential filter may be configured to input a detection signal to the DC-offset estimator. The DC-offset estimator may be configured to exclude the estimation data estimated before the detection signal is input and to re-estimate a DC offset to prevent reduction in estimation accuracy.

Alternatively, the received baseband signal down-converted using the direct-conversion architecture may be filtered by a second high-pass filter, and the DC offset caused by self-mixing of a local signal or the like may be removed, after which the resulting signal may be converted into a digital signal. The second high-pass filter allows all signals to pass therethrough, and the cutoff frequency of the second high-pass filter is preferably set relatively low so that a near-DC signal in the OFDM symbols may not be cut.

The second high-pass filter with low cutoff frequency has low response, and causes long influence of DC offset. However, a frequency offset is estimated after DC offsets are removed using the first high-pass filter with sufficiently high cutoff frequency, thus attaining high estimation accuracy.

Further, the filtering at a high cutoff frequency is performed only for the preamble portion in which frequency-offset estimation is performed, and the demodulation characteristics for the subsequent signals are not degraded.

In general, not only in frequency-offset estimation but also in other signal processing such as packet detection or coarse timing detection, the characteristic degradation is largely sensitive to DC offsets.

Therefore, the wireless communication apparatus may further include a detector that performs packet detection and coarse timing detection using the signal from which the DC offset has been removed by the differential filter.

The wireless communication apparatus may further include a switch that exclusively connects an output terminal of the analog-digital converter to a path directed to the first high-pass filter or a path directed to the DC-offset corrector. The switch may be arranged to switch the output terminal of the analog-digital converter from the path directed to the first high-pass filter to the path directed to the DC-offset corrector at a time when the detector detects the end of the predetermined preamble portion used for frequency-offset estimation.

Since the output terminal of the analog-digital converter is connected to the path directed to the first high-pass filter for a period until the end of the predetermined preamble portion has been detected, the frequency-offset estimator can estimate a frequency offset with high accuracy for a period of time until the end of the predetermined preamble portion using the received baseband signal from which the DC offset has been removed using the first high-pass filter.

The DC-offset estimator may be configured to estimate a DC offset for a period of time until the end of the predetermined preamble portion. When the end of the predetermined preamble portion is detected, the output terminal of the analog-digital converter is switched to the path directed to the DC-offset corrector. DC-offset correction can be performed on the portion of the received baseband signal subsequent to the end of the predetermined preamble portion using the DC offset estimated with high accuracy by the DC-offset estimator for the long period of time. In the portion of the received baseband signal subsequent to the end of the predetermined preamble portion, no DC offset is removed using the first high-pass filter, and degradation in the SNR characteristics is not taken into account.

The frequency-offset estimator may be arranged to estimate a frequency offset for a period of time until the end of the predetermined preamble portion, and the frequency-offset corrector may be arranged to correct the estimated frequency offset from the portion of the received baseband signal subsequent to the end of the predetermined preamble portion.

According to an embodiment, there is provided a wireless communication system complying with the IEEE 802.11a standard. In the IEEE 802.11a standard, a short preamble portion formed of a short training sequence with a relatively large subcarrier spacing, and a long preamble portion formed of a long training sequence with a relatively small subcarrier spacing are added to the head of each packet.

The wireless communication apparatus according to the embodiment is configured such that a short preamble portion with a relatively large subcarrier spacing is utilized, and a frequency offset is estimated after DC offsets are removed using the differential filter having sufficiently high cutoff frequency, thus attaining high estimation accuracy. That is, since frequency-offset correction is performed only using the short preamble portion, the switch can be arranged to switch the output terminal of the analog-digital converter from the path directed to the first high-pass filter to the path directed to the DC-offset corrector at the beginning of the long preamble portion subsequent to the end of the short preamble portion.

Then, the frequency-offset estimator estimates a frequency offset in the short preamble portion, and the frequency-offset corrector removes the estimated frequency offset from the long preamble portion. The DC-offset estimator estimates a DC offset in the short preamble portion, and the DC-offset corrector removes the estimated DC offset from the long preamble portion.

The long preamble portion transmitted subsequently to the short preamble portion can be used in any way by the receiver. In general, coarse frequency-offset correction is performed using the short preamble portion, and then fine frequency-offset correction and channel estimation are performed using the long preamble portion. Therefore, an accurate frequency offset is estimated in the short preamble portion to achieve more accurate channel estimation.

For example, the wireless communication apparatus may further include a second frequency-offset estimator that estimates a frequency offset in the long preamble portion subsequent to the short preamble portion, and a second frequency-offset corrector that removes the frequency offset estimated by the second frequency-offset estimator in the long preamble portion. The second frequency-offset estimator receives the portion of the received baseband signal subsequent to the long preamble portion from which the frequency offset and DC offset estimated in the short preamble portion have been removed, and estimates a frequency offset. The second frequency-offset corrector removes the frequency offset estimated by the second frequency-offset estimator from the portion of the received baseband signal subsequent to the long preamble portion.

Alternatively, the portion of the received baseband signal subsequent to the long preamble portion from which the frequency offset and DC offset estimated in the short preamble portion have been removed may be fed back to the frequency-offset estimator to estimate a frequency offset from the portion of the received baseband signal subsequent to the long preamble portion. The frequency-offset corrector removes the estimated frequency offset from the portion of the received baseband signal subsequent to the long preamble portion.

In either case, a channel is estimated from the received baseband signal from which the frequency offset and DC offset estimated in the short preamble portion have been removed and from which the residual frequency offset estimated in a portion subsequent to the long preamble portion has been corrected, thereby obtaining channel information with higher accuracy.

If the received baseband signal includes an IQ imbalance, the desired reception characteristics may not be obtained even if frequency-offset correction is performed. In order to avoid such inconvenience, the wireless communication apparatus may further include an IQ-imbalance estimator and an IQ-imbalance corrector. With this structure, the IQ imbalance included in the received baseband signal can be canceled, and further improved reception characteristics can be obtained.

OFDM direct-conversion receivers have a problem of not only DC offset but also IQ imbalance caused by a phase difference between local signals input to I-axis and Q-axis mixers and an amplitude difference between the mixers. Like DC offsets, IQ imbalances cause degradation in frequency-offset estimation accuracy, and also affect the decoding characteristics.

When the frequency-offset estimator estimates a frequency offset using the received baseband signal from which the DC offset has been removed and in which IQ imbalance still exists, the frequency-offset information includes the frequency-offset value $\Delta f$ and a component caused by the IQ imbalance, i.e., an IQ imbalance component.

In a typical communication system, a plurality of preamble symbols are transmitted from a transmitter, and a frequency-offset estimator in a receiver can estimate a frequency offset for each of the preamble symbols. The frequency offsets can be represented as vectors on a complex space. The direction of the vectors indicating the IQ imbalance component is different depending on the preamble symbol. By sequentially summing the frequency offsets estimated for the preamble symbols, the frequency-offset estimator can relatively reduce the IQ imbalance component included in the estimated frequency-offset value, and can finally obtain a more accurate frequency offset.

The receiver generally includes a gain controller that adjusts the gain of the low-noise amplifier. When the gain of the low-noise amplifier is changed during frequency-offset estimation performed by the frequency-offset estimator, the IQ imbalance component included in the frequency offset estimated when a large gain is set increases. Therefore, if the frequency offsets estimated for the plurality of preamble symbols are simply summed, it may be difficult to sufficiently reduce the proportion of the IQ imbalance component.

In this case, the frequency-offset estimator may weight each of the frequency offsets estimated for the preamble symbols according to the gain set in the low-noise amplifier when the corresponding preamble symbol is received, and may sum the weighted frequency offsets to obtain a final frequency-offset value. Therefore, the IQ imbalance component included in the estimated frequency-offset value can be relatively reduced, and a more accurate frequency offset can be finally obtained.

In receivers, generally, a large gain is determined for the low-noise amplifier at the beginning of signal detection, and the gain is changed to a lower gain according to the power of the received signal. Therefore, the frequency-offset estimator applies a small weight to frequency offsets estimated in the first several preamble symbols during which a large gain is set in the low-noise amplifier while applying a larger weight to frequency offsets estimated the subsequent preamble symbols in which the gain is changed to a smaller gain, and sums the weighted frequency offsets to obtain a final frequency offset. Specifically, applying a weight to a frequency offset is equivalent to multiplying a frequency-offset-estimation vector (described below) or the output of the differential filter by a weighting factor.

Specifically, the frequency-offset estimator is configured to calculate a weighting factor on the basis of the absolute value of the frequency offset estimated for each of the preamble symbols, to weight the frequency offsets by the weighting factors, and to sum the weighted frequency offsets to obtain a final frequency-offset value.

For example, the frequency-offset estimator may weight the frequency offsets estimated for the preamble symbols by applying a weighting factor of 0 to a frequency offset whose absolute value exceeds a predetermined threshold value and a weighting factor of 1 to a frequency offset whose absolute value does not exceed the predetermined threshold value, and may sum the weighted frequency offsets to obtain a final frequency-offset value. That is, the frequency offsets estimated for a preamble period during which a large gain is set in the low-noise amplifier are ignored. The predetermined threshold value can be determined on the basis of, for example, the received-signal intensity.

Alternatively, the frequency-offset estimator may weight the frequency offsets estimated for the preamble symbols by applying weighting factors formed of the inverse of the absolute values of the frequency offsets to the frequency offsets, and may sum the weighted frequency offsets to obtain a final frequency-offset value.

According to an embodiment, an excellent wireless communication apparatus using a direct-conversion architecture, in which a frequency offset can be appropriately removed to achieve OFDM demodulation with higher characteristics in the presence of a time-varying DC offset, can be achieved.

According to another embodiment, an excellent wireless communication apparatus in which a DC offset can be removed and a frequency offset can be accurately estimated in the concurrent presence of a time-varying DC offset, an IQ imbalance, and a frequency offset in received OFDM symbols can be achieved.

A wireless communication apparatus according to an embodiment receives an OFDM signal using a direct-conversion architecture. Even if the OFDM signal includes a DC offset, the wireless communication apparatus can perform high-speed high-accuracy frequency-offset estimation by removing the DC offset using a differential filter. Further, if a rapid DC-offset change occurs due to a change in the gain of the low-noise amplifier, the DC-offset change is detected from the output of the differential filter, and frequency-offset estimation is not performed for that output. Therefore, the accuracy of frequency-offset estimation can be increased.

Furthermore, according to an embodiment, when vector signals including frequency-offset information are summed, the vector signals are multiplied by a weighting factor according to the power of the corresponding preamble signals, that is, the gain of the low-noise amplifier. Therefore, more accurate frequency-offset estimation can be performed with simple signal processing while reducing the influence of IQ imbalances and time-varying DC offsets during the frequency-offset estimation.

Additional features and advantages are described herein, and will be apparent from, the following Detailed Description and the figures.

DETAILED DESCRIPTION

First Embodiment

The present application will be described in detail with reference to the drawings according to an embodiment.

The present application relates to wireless communication apparatuses for receiving OFDM signals using a direct-conversion architecture. The direct-conversion architecture in which no IF filter is used easily realizes a wide-band receiver, and increases the flexibility in the receiver design.

An OFDM communication system has a problem in that a small error between frequencies of oscillators in a transmitter and a receiver causes a frequency offset, which is observed as a phenomenon of rotation of the phase of a received signal in the digital section of the receiver. In a general procedure, a frequency offset is observed using a known training sequence added to the head of each packet, and the frequency offset is corrected.

However, direct-conversion receivers have a problem in that a direct-current component, or DC offset, is caused at the down-converter output due to self-mixing of a local signal. The accuracy of frequency-offset estimation and timing detection is susceptible to the influence of DC offsets, and it is difficult to accurately estimate a frequency offset in the presence of a DC offset.

A wireless communication apparatus according to an embodiment realizes high-speed and high-accuracy frequency-offset estimation by removing a DC offset using a differential filter.

Figure 1:
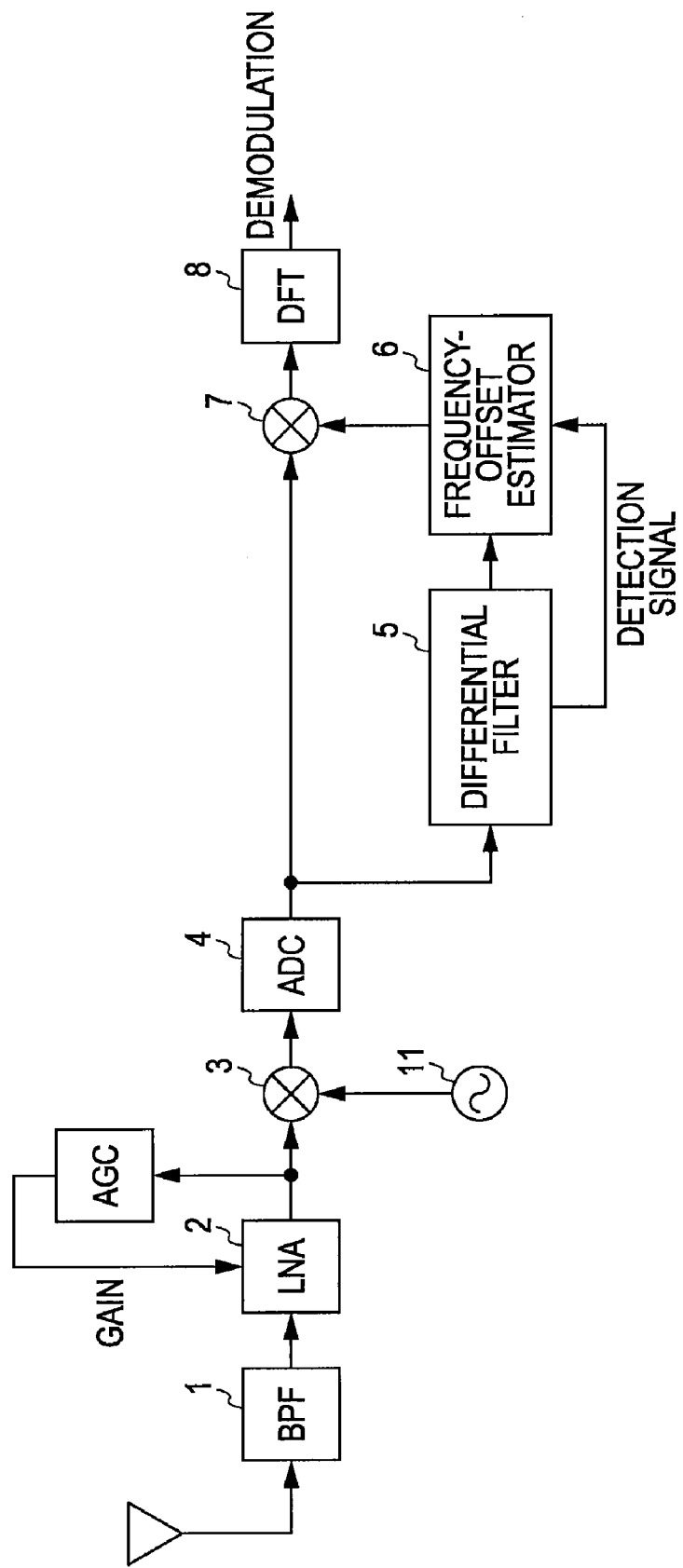
FIG. 1 is a diagram showing the structure of a receiver in a wireless communication apparatus according to an embodiment.

FIG. 1 shows the structure of a receiver in the wireless communication apparatus according to a first embodiment. The apparatus shown in FIG. 1 has a direct-conversion receiver for receiving an OFDM signal, and a module for compensating a frequency offset.

When an antenna receives an OFDM signal, only a signal of a desired frequency band in the OFDM signal is transmitted through a band-pass filter (BPF) 1, and is amplified by a low-noise amplifier (LNA) 2. The received RF signal has a frequency offset caused by a frequency error between local oscillators of a transmitter and the receiver.

An automatic gain control (AGC) circuit adjusts the gain of the low-noise amplifier 2 to maintain the power of the received signal at an appropriate constant level. For example, a gain control range of 50 dB or more is specified in IEEE 802.11a/g. In general, a large gain is set in the low-noise amplifier 2 at the beginning of signal detection, and is switched to a lower gain according to the power of the received signal, for example, around the center of a short preamble period (in the first embodiment, at the end of the fourth short preamble $t_4$). The gain switching level is about 20 dB. The AGC mechanism is well known, and is not described herein.

The amplified received signal is multiplied by a local frequency $f_{LO}$ generated by a local oscillator 11 using a mixer 3, and is frequency-converted into a baseband signal using the direct-conversion scheme. The baseband signal is converted into a digital signal by an analog-to-digital (AD) converter (ADC) 4.

In the direct-conversion architecture of the receiver, due to the equality of the receiving frequency and the local frequency, a direct-current component, or DC offset, is caused at the down-converter output by self-mixing of a local signal. If the gain of the low-noise amplifier 2 is changed by automatic gain control, the DC offset also varies over time (see, for example, IEEE 802.11g, Part 11: Wireless LAN Medium Access Control (MAC) and Physical Layer (PHY) specifications: High-speed Physical Layer in the 2.4 GHZ Band). The received baseband signal in the current stage has a time-varying DC offset as well as a frequency offset.

Figure 21:
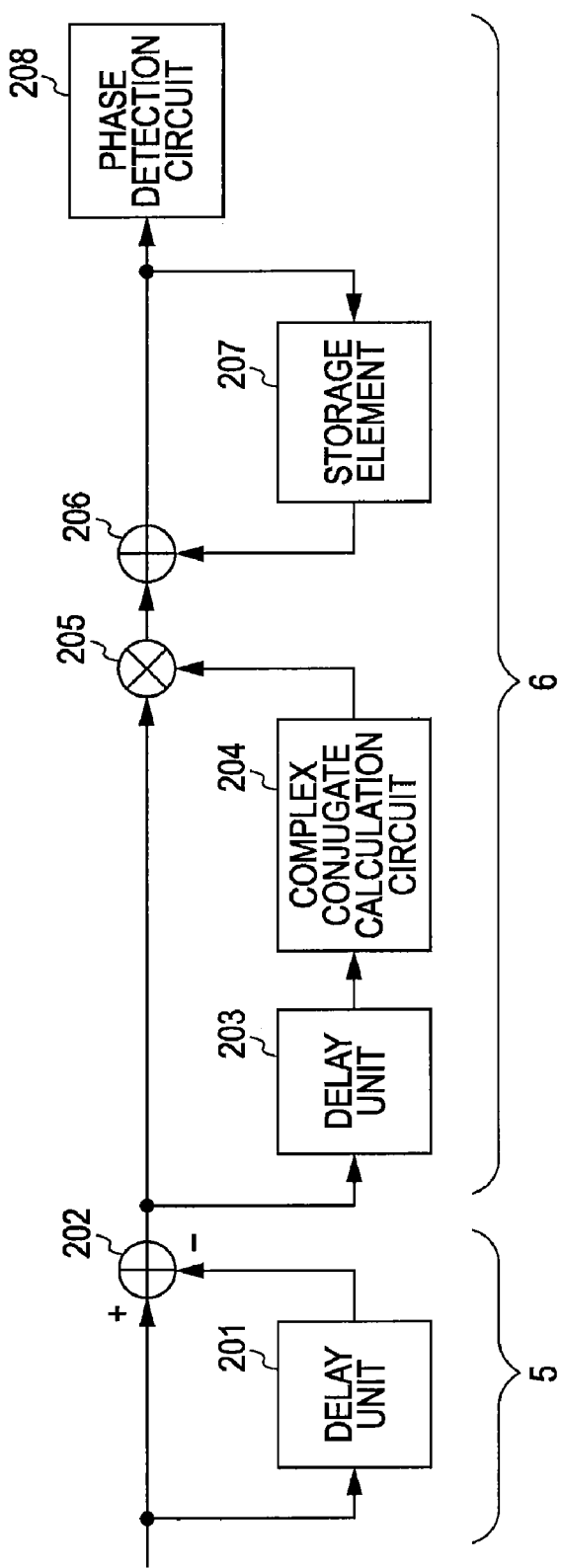
FIG. 21 is a diagram showing a specific example of the structure of a differential filter 5 and a frequency-offset estimator 6.

A predetermined period of a preamble signal in the digital baseband signal is divided and is input to a differential filter 5. After a DC-offset component is removed, the resulting signal is input to a frequency-offset estimator 6 to estimate a more accurate frequency offset from the signal from which DC offset has been removed by subtracting an estimated DC offset. FIG. 21 shows a specific example of the structure of the differential filter 5 and the frequency-offset estimator 6. The differential filter 5 includes a delay unit 201 and an adder 202. The frequency-offset estimator 6 includes a delay unit 203, a complex conjugate calculation circuit 204, a multiplier 205, an adder 206, a storage element 207, and a phase detection circuit 208.

The differential filter 5 is one type of high-pass filter with a simple circuit structure and high response. When the gain of the low-noise amplifier 2 is changed to a lower gain according to the power of the received signal at the end of the short preamble $t_4$ (as described above), the DC-offset level changes. The differential filter 5 has sufficiently high response to the change in the DC-offset level to prevent the high-frequency component from passing therethrough.

Figure 17A:
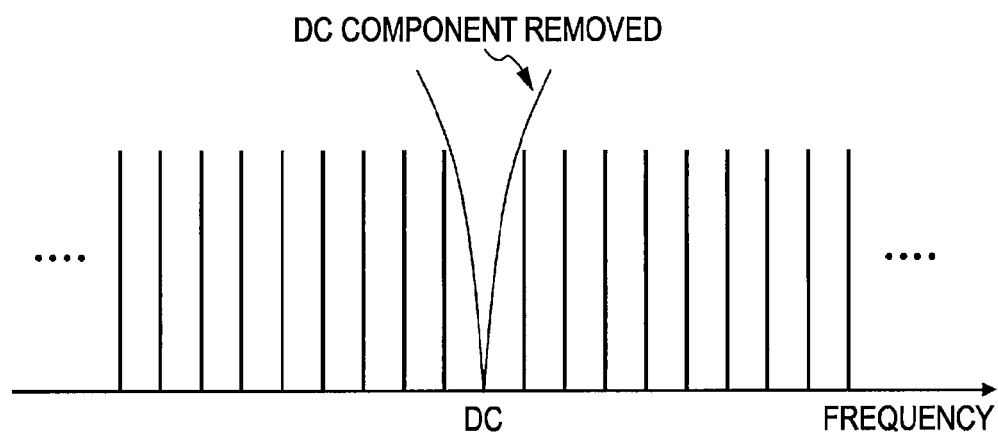
FIG. 17A is a diagram showing that the DC component of the OFDM signal is removed using an HPF with sufficiently small frequency relative to the subcarrier spacing.
Figure 17B:
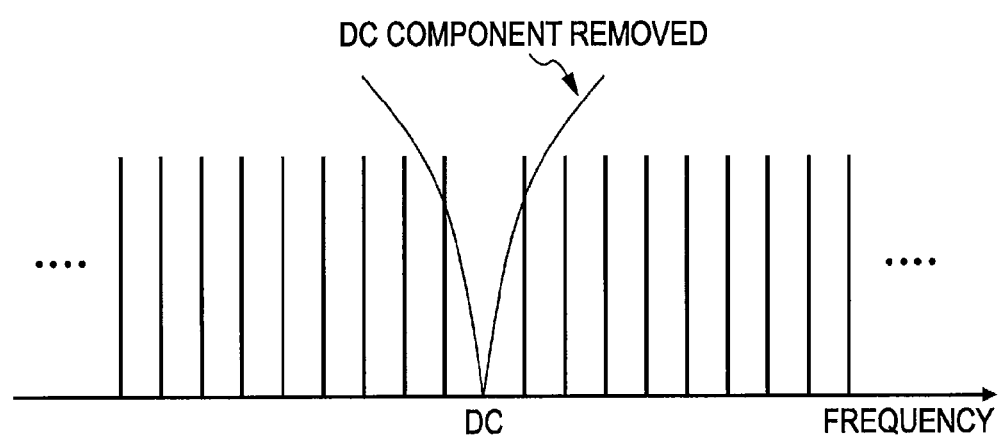
FIG. 17B is a diagram showing that the DC component of the OFDM signal removed using an HPF with large frequency relative to the subcarrier spacing to cut a near-DC signal.
Figure 18:
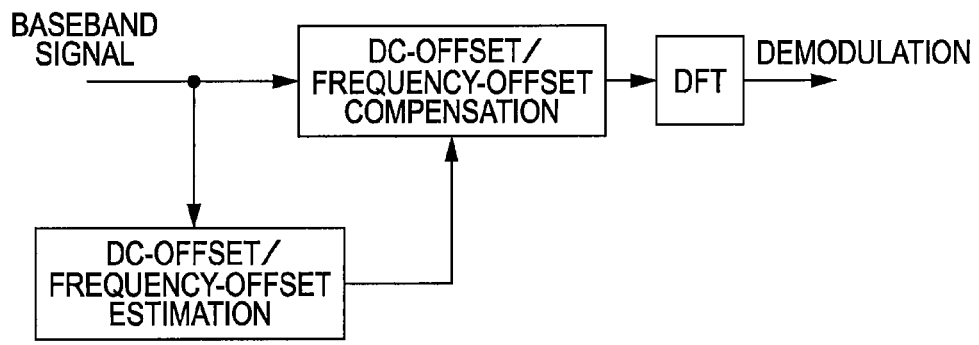
FIG. 18 is a schematic diagram showing the structure of a receiver that estimates a DC offset and a frequency offset at the same time.
Figure 19:
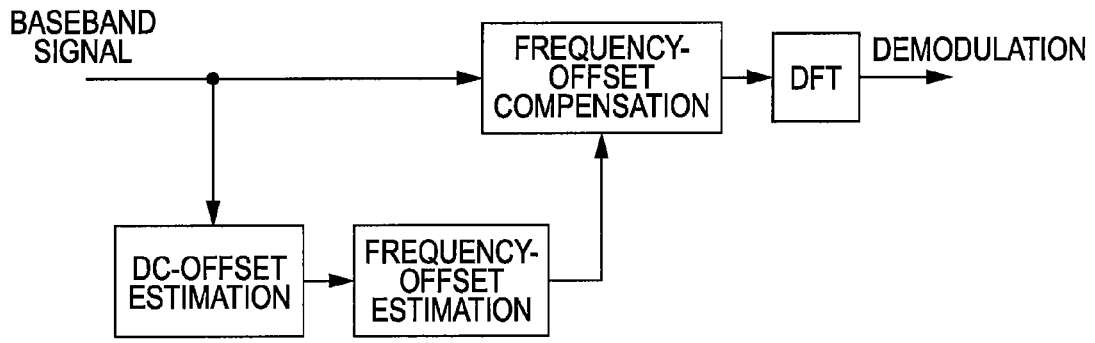
FIG. 19 is a schematic diagram showing the structure of a receiver that estimates a DC offset and a frequency offset in parallel.
Figure 20:
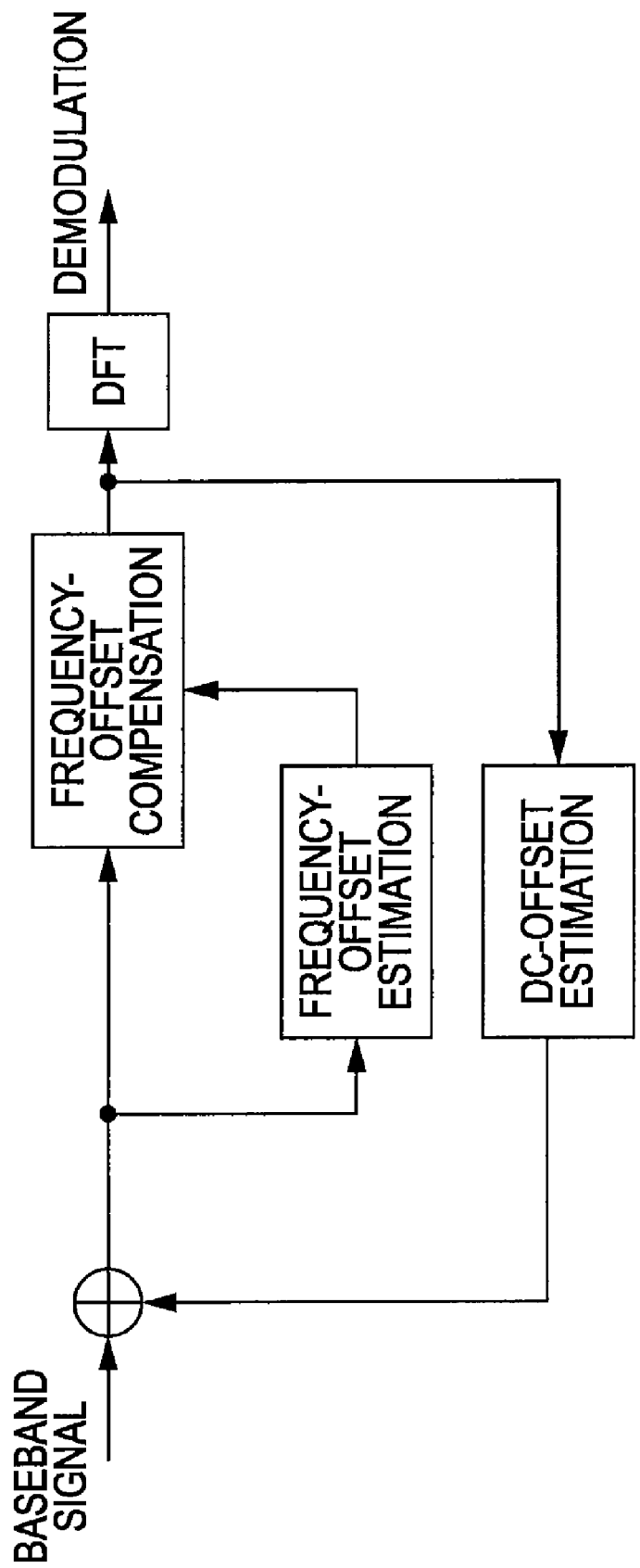
FIG. 20 is a schematic diagram showing the structure of a receiver that repeats DC-offset estimation and frequency-offset compensation.

If the cutoff frequency $f_c$ for DC-offset removal is increased, the response to changes in DC offset produced by changing the gain of the low-noise amplifier 2 is increased. However, even a near-DC signal is also cut, resulting in a problem of degradation in the demodulation characteristics (see FIG. 17B). In contrast, the receiver shown in FIG. 1 is configured such that the preamble portion used for frequency-offset estimation (i.e., the STS with a relatively large subcarrier spacing) is divided for DC-offset removal. In other words, while a DC offset is removed only for a preamble portion in which frequency-offset estimation is performed, a frequency offset is removed but a DC offset is not removed for a preamble portion subsequent to the portion used for the frequency-offset estimation and a payload portion. Therefore, there will be no adverse influence on the demodulation characteristics of the subsequent data portion (subsequent to the LTS with a short subcarrier spacing) even though the cutoff frequency $f_c$ is increased.

If a DC offset rapid changes due to a change in the gain of the low-noise amplifier 2 or the like, the DC offset may be transmitted through the differential filter 5. When such an impulse waveform is input to the frequency-offset estimator 6, the mean square error (MSE) may be increased. Therefore, upon detecting a rapid DC-offset change, the differential filter 5 inputs a detection signal to the frequency-offset estimator 6. The frequency-offset estimator 6 determines a sample output from the differential filter 5 when the detection signal is input to be a DC-offset-containing signal, and does not perform frequency-offset estimation for this sample output. Therefore, high estimation accuracy can be maintained.

A threshold value used by the differential filter 5 to detect a rapid DC-offset change can be calculated on the basis of, for example, the number of times the gain has been changed and the received signal level.

The estimated frequency-offset value is input to a frequency-offset corrector 7, and a frequency offset in the baseband signal of the OFDM symbol portion subsequent to the portion used for the frequency-offset estimation is compensated.

The output of the frequency-offset corrector 7 is input to a discrete Fourier transform (DFT) unit 8, and subcarrier signals arranged in the frequency domain are demodulated.

It is assumed that the OFDM signal input to the receiver according to the first embodiment does not include a DC subcarrier (DC corresponds to 0 Hz in the baseband signal in OFDM modulation). The frequency-offset estimator 6 estimates a frequency offset in the preamble of each packet (i.e., in the STS with a relatively large subcarrier spacing), and a preamble in which the same OFDM signal symbol is transmitted twice exist.

Figure 2:
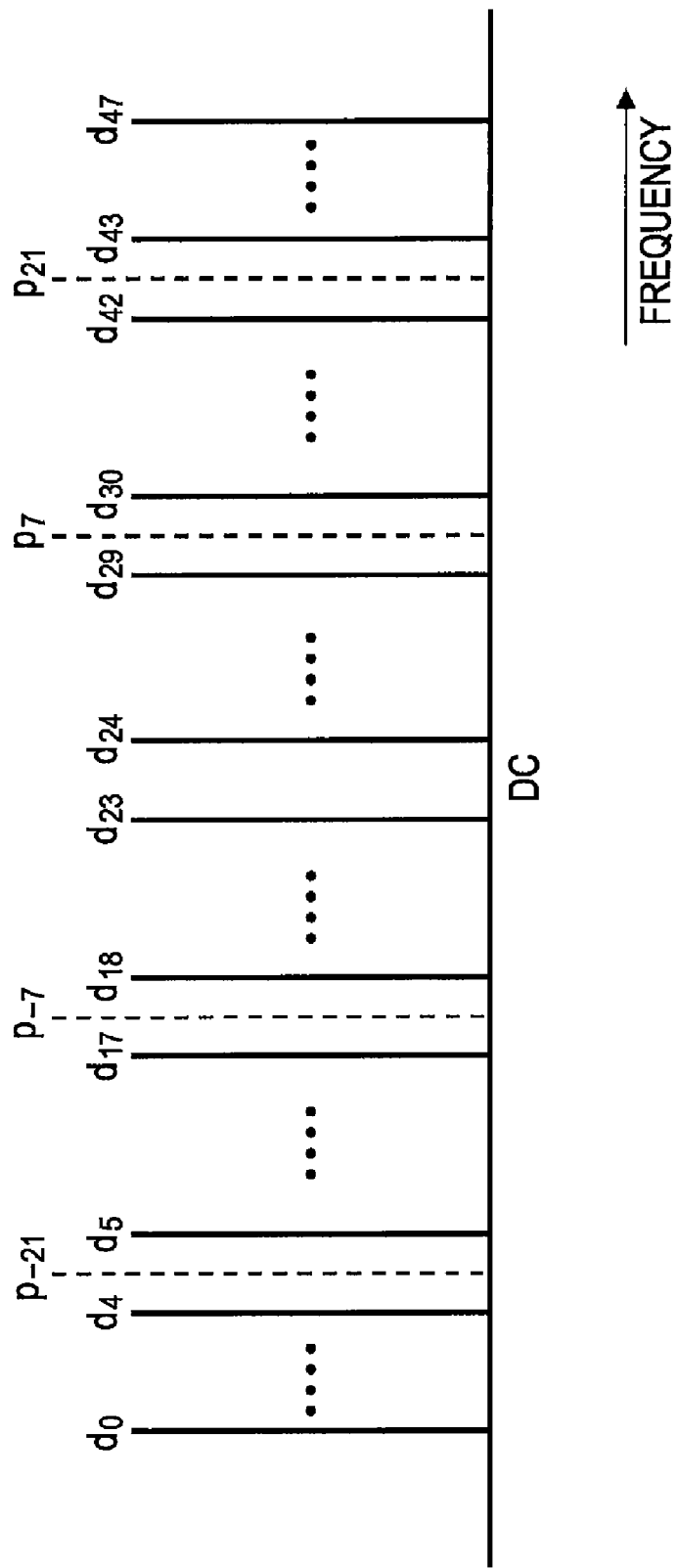
FIG. 2 is a diagram showing a subcarrier structure of OFDM symbols in a wireless LAN system complying with the IEEE 802.11a/g standard.

A wireless communication system according to an embodiment is a wireless LAN system complying with the IEEE 802.11a/g standard. FIG. 2 shows the subcarrier structure of OFDM symbols in the wireless LAN system. As shown in FIG. 2, one OFDM symbol is formed of 64 subcarriers, of which 52 subcarriers are modulated into information signals and four subcarriers are used as pilot signals. No signals are transmitted on the remaining subcarriers including a DC component (that is, the remaining subcarriers carry a null signal).

When a portion of the received baseband signal subsequent to the portion used for the frequency-offset estimation (i.e., subsequent to the LTS), which is influenced by DC offset and frequency offset, is input to the frequency-offset corrector 7, the frequency offset is accurately compensated and demodulated without degradation in the demodulation characteristics caused by the removal of DC offset by the high-pass filter.

Figure 15:
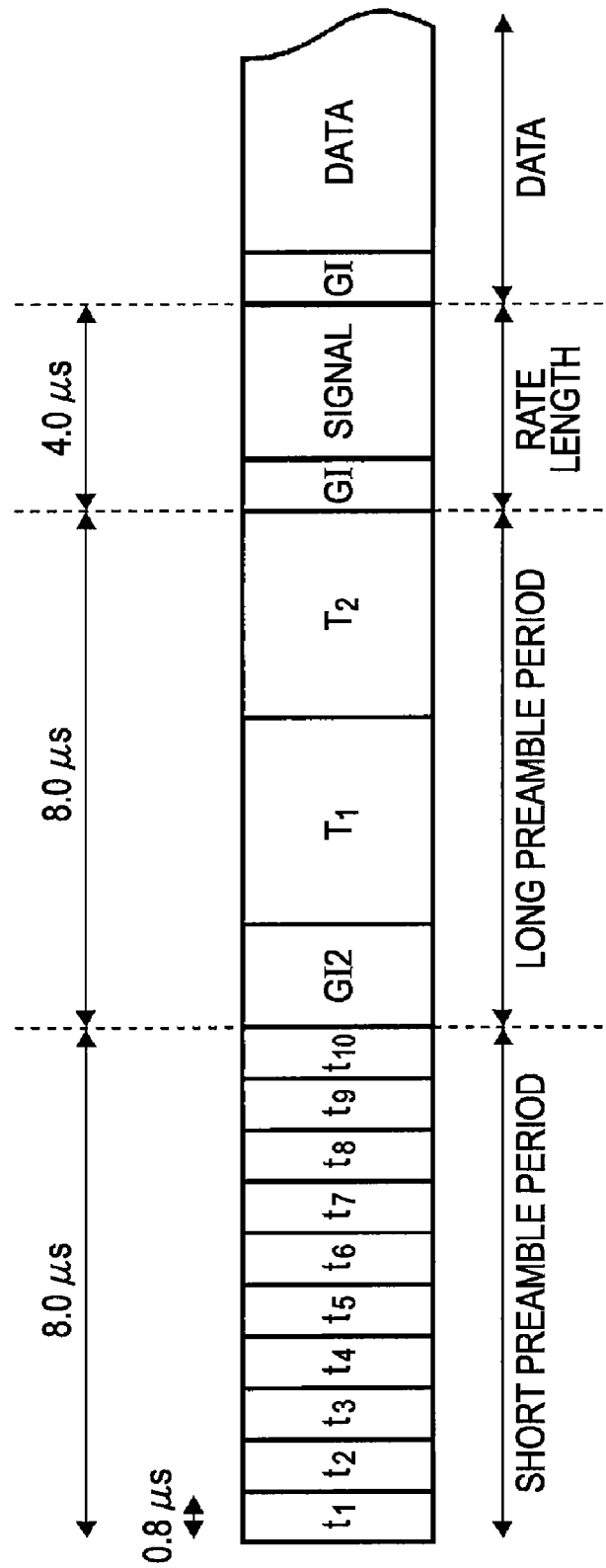
FIG. 15 is a diagram showing the preamble structure specified in IEEE 802.11a/g.
Figure 16:
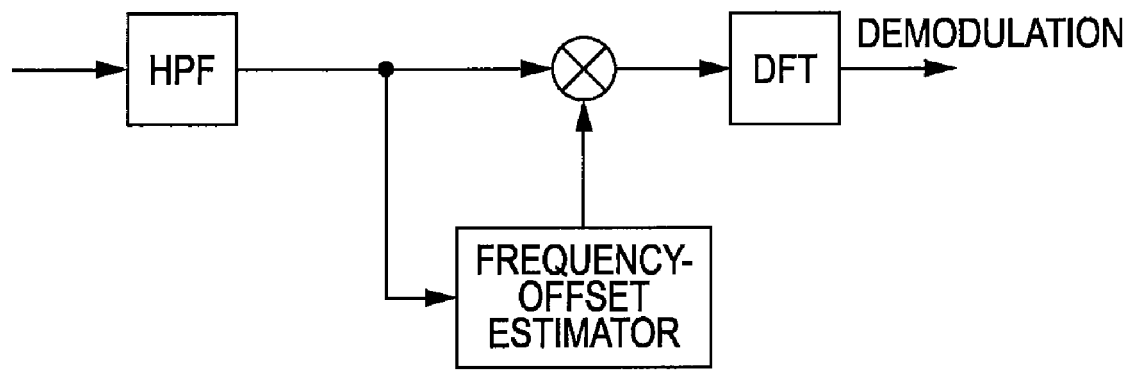
FIG. 16 is a schematic diagram showing the structure of a receiver that removes a DC offset using an HPF.

FIG. 15 shows the preamble structure specified in IEEE 802.11a/g. In the long preamble period, an OFDM symbol formed of a long training sequence (LTS) symbol of 3.2 microseconds is transmitted consecutively twice. The i-th sample of the time waveform of the OFDM symbol is denoted by s(i). The samples {s(0), s(1), . . . , s(63)} are associated with the first OFDM symbol, and the samples {s(64), s(65), . . . , s(127)} are associated with the second OFDM symbol (if the order of the discrete Fourier transform is denoted by N, the first OFDM symbol is a set of samples {s(0), s(1), . . . , s(N/4−1)}, and the second OFDM symbol is a set of samples {s(N/4), s(N/4+1), s(2N/4−1)}).

If the frequency offset at this time is denoted by Δf and the DC offset is denoted by D, the received baseband signal relative to the i-th short preamble is given by the following equation:

$$r(i)=s(i)\exp(j2\pi\Delta fi)+D \qquad (7)$$

The differential filter 5 includes the delay unit 201 and the adder 202. The AD converted signal obtained by the AD converter 4 is input to the input of the delay unit 201. The AD converted signal is also input to a first input of the adder 202, and the output of the delay unit 201 is inverted and is input to a second input of the adder 202 for subtraction therebetween. The differential filter 5 therefore processes the received baseband signal according to equation (8) as follows:

$$\begin{aligned}d(i) &= r(i+1) - r(i) \qquad (8)\\ &= s(i+1)\exp(j2\pi\Delta f(i+1)) - s(i)\exp(j2\pi\Delta fi)\end{aligned}$$

Equation (8) represents an output signal of the differential filter 5 with respect to the i-th short preamble.

The frequency-offset estimator 6 in the subsequent stage includes the delay unit 203, the complex conjugate calculation circuit 204, the multiplier 205, the adder 206, the storage element 207, and the phase detection circuit 208. The output of the adder 202 is input to the delay unit 203 and a first input of the multiplier 205. The delay unit 203 delays the input signal by N/4 (=16) samples, which correspond to the short preamble length, and outputs the delayed signal to the complex conjugate calculation circuit 204 in the subsequent stage. The output of the complex conjugate calculation circuit 204 is input to a second input of the multiplier 205. The multiplier 205 therefore performs the cross-correlation operation given by the equation below for each of the short preambles $t_1$, $t_2$, etc.

$$d(i+16)/d(i) = \frac{s(i+1+16)\exp(j2\pi f(i+1+16)) - s(i+n)\exp(j2\pi f(i+16))}{s(i+1)\exp(j2\pi f(i+1)) - s(i)\exp(j2\pi f(i))} \qquad (9)$$

$$= \exp(j2\pi\Delta f(16))$$

The output of the multiplier 205 is connected to a first of the adder 206, and an output of the storage element 207 is connected to a second input of the adder 206. The output of the adder 206 is input to the storage element 207 and the phase detection circuit 208. Consequently, the cross-correlation results determined by equation (9) above for all the short preambles are summed using the adder 206, and the frequency offset Δf is estimated.

The portion of the received baseband signal subsequent to the portion used for the frequency-offset estimation, which is influenced by frequency offset, is compensated for the frequency offset using the frequency-offset corrector 7. Specifically, the frequency offset is corrected by inverting the phase of the data according to the frequency shift. The short training sequence (STS) can also be used to perform frequency-offset estimation in a manner similar to that described above (in this case, the number of samples is 16).

Figure 3:
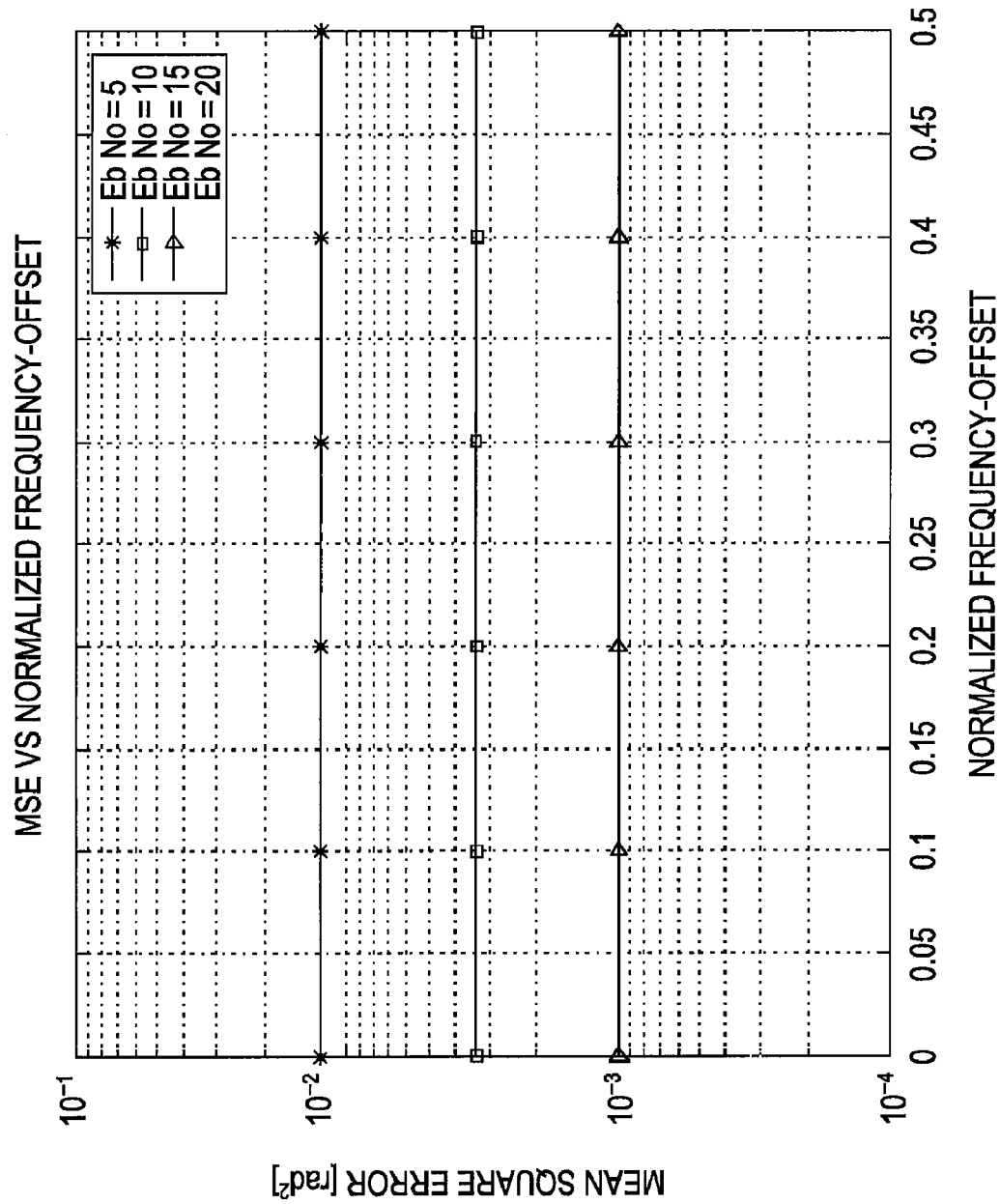
FIG. 3 is a diagram showing square error of the estimated frequency-offset values obtained when the ratio of the DC-offset power to the OFDM signal power is 30 dB, and frequency-offset values normalized by the subcarrier spacing.

FIG. 3 shows the mean square error of the estimated frequency-offset value obtained when the ratio of the DC-offset power to the OFDM signal power is 30 dB, and frequency-offset values normalized by the subcarrier spacing. As can be seen from FIG. 3, accurate frequency-offset estimation is achieved by removing a DC offset from the received preamble signal used for frequency-offset estimation using the differential filter 5. Since the STS has repetitions of the same training sequence symbol (see FIG. 15), a frequency offset can be estimated using a similar operation.

In equation (9) above, it is assumed that the DC offset is constant, or does not vary over time, and the differential filter 5 can cancel the DC offset. When the gain of the low-noise amplifier 2 is changed, however, the change in the DC-offset level appears as a high-frequency component, and the output of the differential filter 5 indicates the magnitude of the DC offset.

Figure 22:
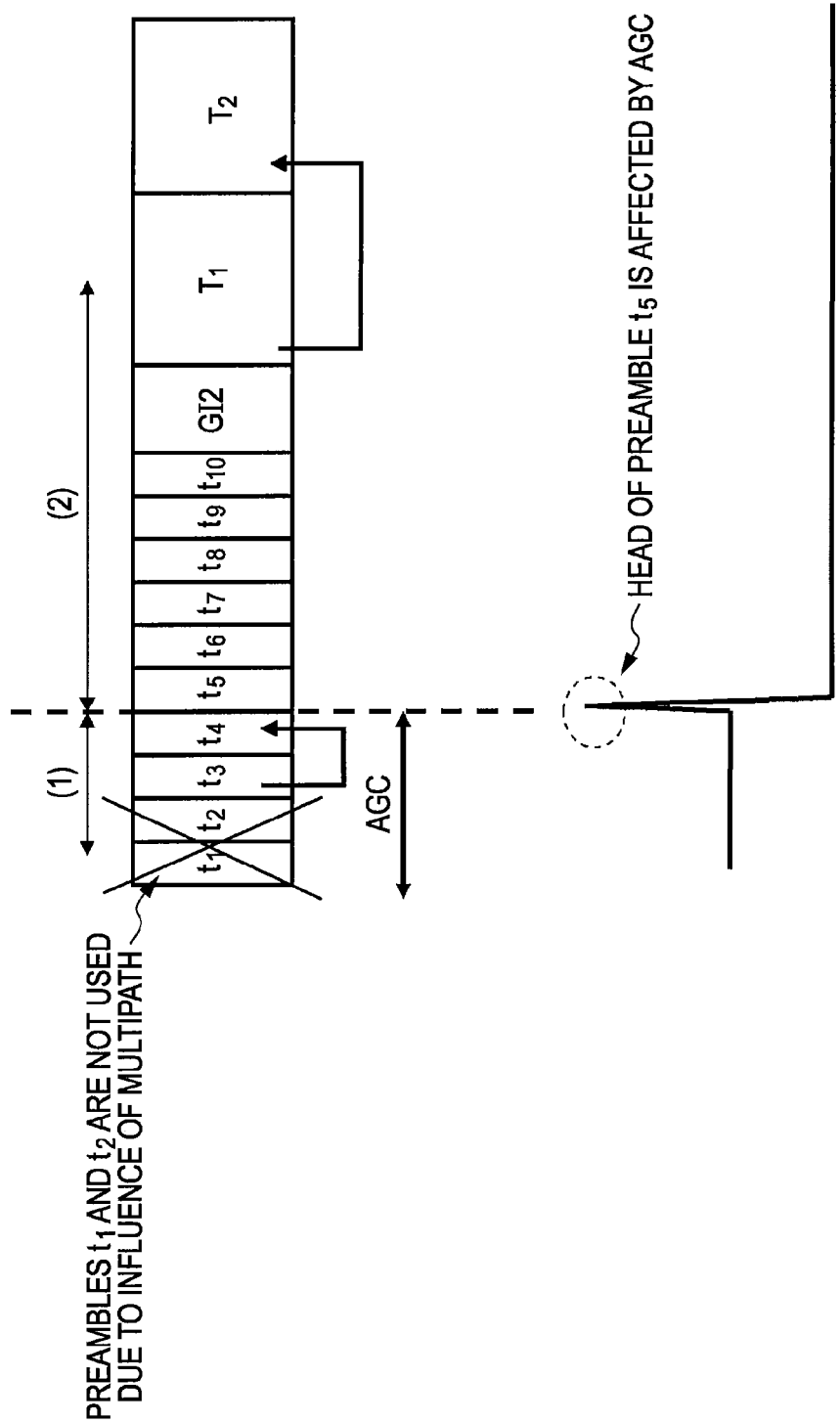
FIG. 22 is a diagram showing that the output of the differential filter 5 is influenced by changing the gain of a low-noise amplifier 2 by automatic gain control.

Specifically, the automatic gain control circuit sets a large gain for the low-noise amplifier 2 at the beginning of signal detection, and determines an appropriate gain for maintaining the power of the received signal at a constant level using the first to fourth short preambles $t_1$ to $t_4$ (where the preambles $t_1$ and $t_2$ are not used due to the influence of multipath). The gain is switched to a lower gain at the beginning of the fifth short preamble $t_5$. The gain switching level is about 20 dB. The DC-offset level also varies in accordance with the switching of the gain, which influences the output of the differential filter 5 at the beginning of the preamble $t_5$ (see FIG. 22).

If the value of the DC offset for the i-th sample is denoted by D(i), the output of the differential filter 5 is determined by equation (10) below when the DC offset is changed in the OFDM samples due to a change in the gain of the low-noise amplifier 2 or the like:

$$d(i) = r(i+1) - r(i) \quad (10)$$
$$= \{s(i+1)\exp(j2\pi\Delta f(i+1)) - s(i)\exp(j2\pi\Delta fi)\} +$$
$$\{D(i+1) - D(i)\}$$

As is understood from the equation above, when the DC offset rapidly changes, the difference {D(i+1)−D(i)} between the DC offset for the (i+1)-th sample and the DC offset for the i-th sample remains, and the absolute value of the output d(i) of the differential filter 5 increases. Accordingly, when a change in DC offset is detected, the DC offset is not removed and is transmitted through the differential filter 5.

In the receiver shown in FIG. 1, upon detecting the absolute value of the output d(i) exceeding a predetermined value, the differential filter 5 gives an instruction (detection signal) to the frequency-offset estimator 6 in the subsequent stage so that frequency-offset estimation is not performed for the i-th sample output d(i) including the influence of DC offsets. The frequency-offset estimator 6 thus estimates a frequency offset without taking account of DC offset, resulting in improved estimation accuracy. Even in a case where automatic gain control of the low-noise amplifier 2 is frequently performed, frequency-offset estimation is not performed for the transmitted-DC-offset component, thus maintaining high estimation accuracy.

As described above, since a frequency offset is estimated after DC offsets are removed using the differential filter 5, the structure of the receiver shown in FIG. 1 can achieve accurate frequency-offset estimation while addressing the presence of both DC offsets and frequency offsets. Further, since the estimated frequency-offset value obtained in a period in which the gain of the low-noise amplifier 2 is changed is excluded, high estimation accuracy can be maintained.

In the structure of the receiver shown in FIG. 1, the frequency-offset corrector 7 removes the frequency offset estimated by the frequency-offset estimator 6 from the portion of the received baseband signal subsequent to the portion used for the frequency-offset estimation (i.e., from which no DC offset has been removed). In other words, while a DC offset is removed only for a preamble portion in which a frequency offset is estimated, a frequency offset is removed but a DC offset is not removed for a preamble portion subsequent to the portion used for the frequency-offset estimation and a payload portion. In such a case, there may arise a problem in that the DC offset influences a demodulation circuit in the subsequent stage even though the frequency-offset estimation accuracy is high.

Figure 4:
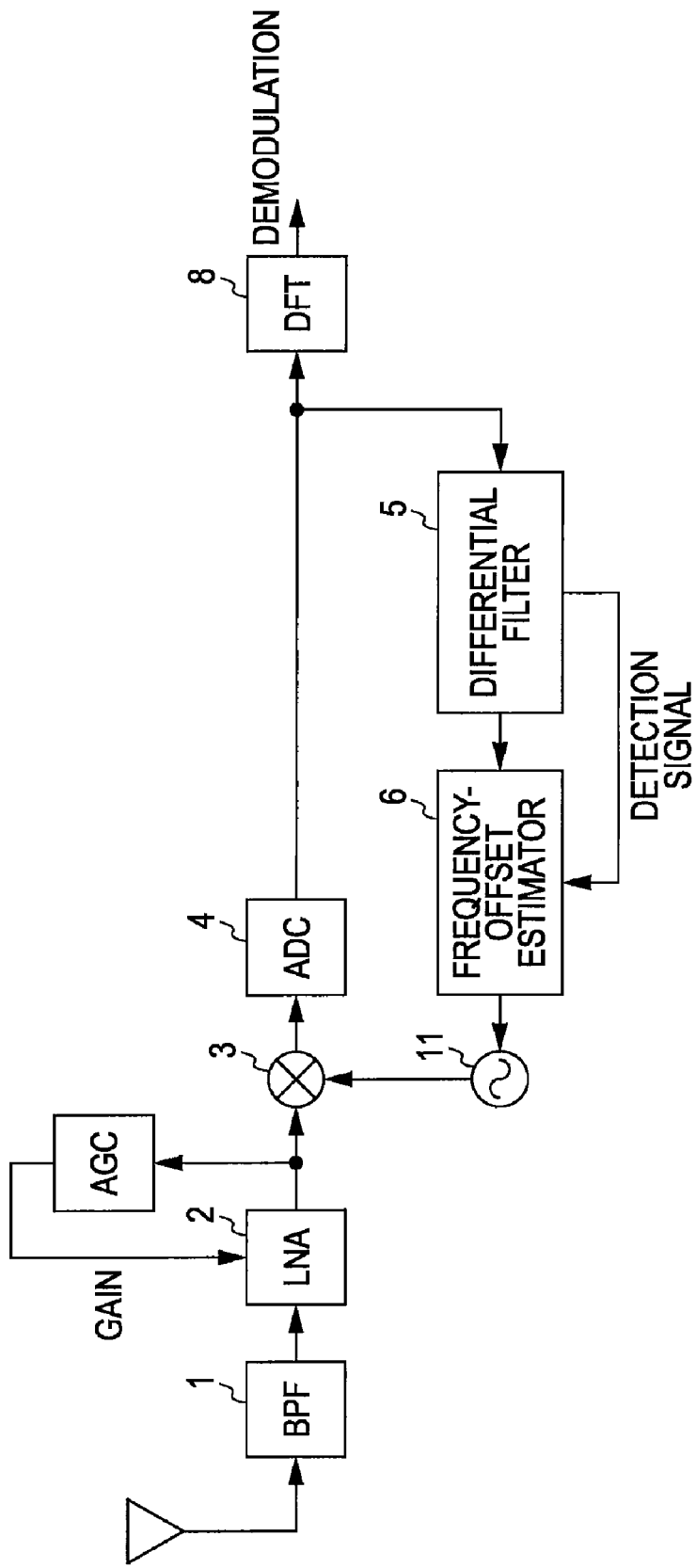
FIG. 4 is a diagram showing an example of the structure of another receiver in the wireless communication apparatus.

FIG. 4 shows an example of a receiver circuit for solving this problem. In the structure of the receiver shown in FIG. 1, after DC offsets are removed from a received baseband signal input to the differential filter 5, a DC-offset-including portion of the received baseband signal subsequent to the portion used for frequency-offset estimation is subjected to frequency-offset compensation by the frequency-offset corrector 7 using the frequency offset estimated by the frequency-offset estimator 6. In the structure of the receiver shown in FIG. 4, on the other hand, after DC offsets are removed by the differential filter 5, the phase of the local frequency oscillated by the local oscillator 11 is inverted on the basis of the frequency offset estimated by the frequency-offset estimator 6. Therefore, the influences of DC offsets and frequency offsets can be simultaneously removed from a DC-offset-including portion of the received baseband signal subsequent to the portion used for frequency-offset estimation.

Also in this case, upon detecting a rapid DC-offset change, the differential filter 5 inputs a detection signal to the frequency-offset estimator 6. The frequency-offset estimator 6 does not perform frequency-offset estimation for the sample output obtained from the differential filter 5 when the detection signal is input to avoid the influence of the DC offset transmitted through the differential filter 5, as described above.

Figure 5:
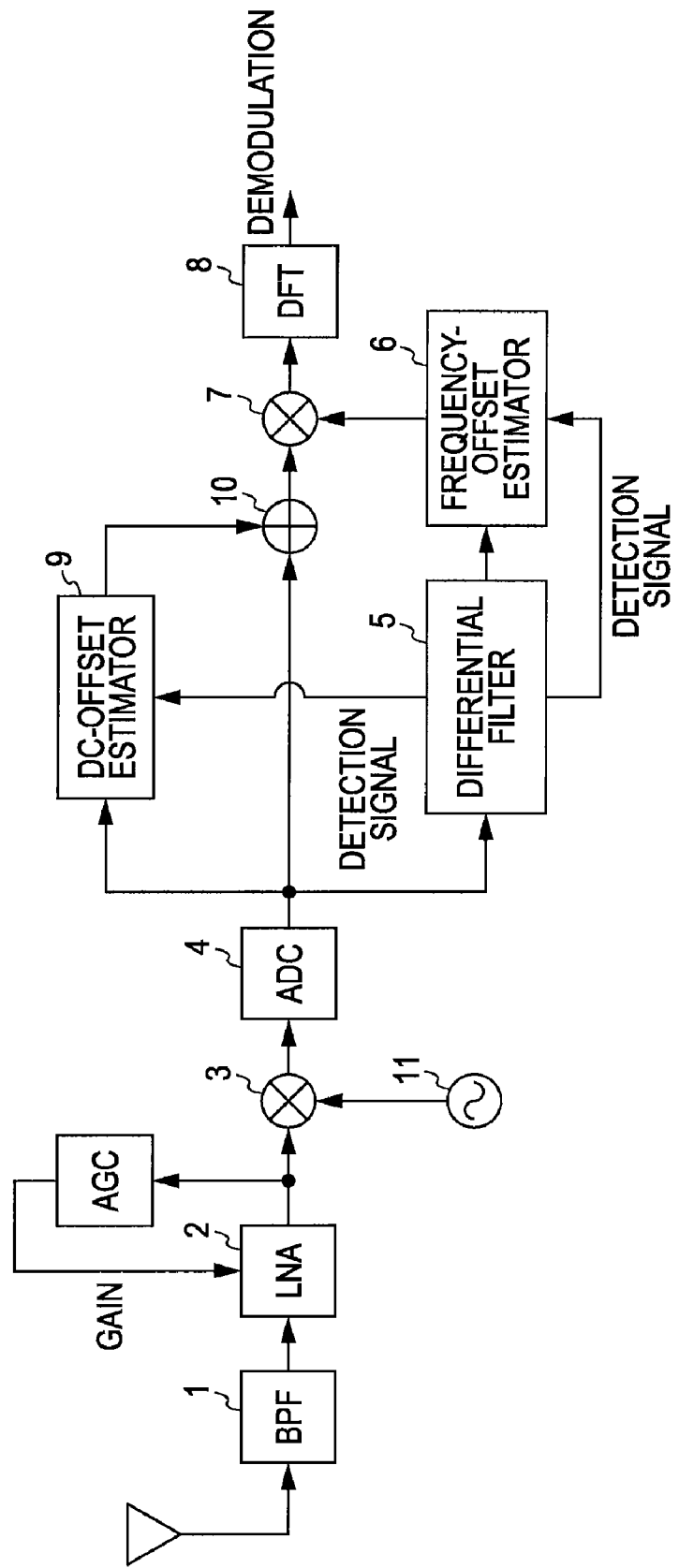
FIG. 5 is a diagram showing an example of the structure of another receiver in the wireless communication apparatus.

FIG. 5 is an example of the structure of another receiver capable of removing the influence of DC offsets from the portion of the received baseband signal subsequent to the portion used for frequency-offset estimation (subsequent to the LTS).

In the receiver shown in FIG. 5, a predetermined period of a preamble signal in the received baseband signal is divided and is input to the differential filter 5 to remove a DC offset, and the frequency-offset estimator 6 estimates a frequency offset. Upon detecting a rapid DC-offset change, the differential filter 5 inputs a detection signal to the frequency-offset estimator 6. The frequency-offset estimator 6 does not perform frequency-offset estimation for the sample output obtained from the differential filter 5 when the detection signal is input to avoid the influence of the DC offset transmitted through the differential filter 5, as described above.

In parallel to the frequency-offset estimation process, a DC-offset estimator 9 estimates a DC offset for the received baseband signal, and a DC-offset corrector 10 removes the DC offset from the received baseband signal. Then, the frequency-offset corrector 7 performs frequency-offset compensation on the portion of the received baseband signal subsequent to the portion used for frequency-offset estimation, from which the DC offset has been removed, on the basis of the high-accuracy frequency-offset value estimated after the DC offset has been removed.

A DC offset is typically estimated by averaging of a converted digital baseband signal. Therefore, if a DC offset rapidly changes due to a change in the gain of the low-noise amplifier 2 or the like, the average value is no longer useful, and continuation of DC-offset estimation would cause degradation in accuracy. Therefore, upon detecting a rapid DC-offset change, the differential filter 5 inputs a detection signal to the frequency-offset estimator 6 and the DC-offset estimator 9. The DC-offset estimator 9 excludes the estimation data estimated before the detection signal is input, and re-estimates a DC offset to prevent reduction in estimation accuracy.

Figure 6:
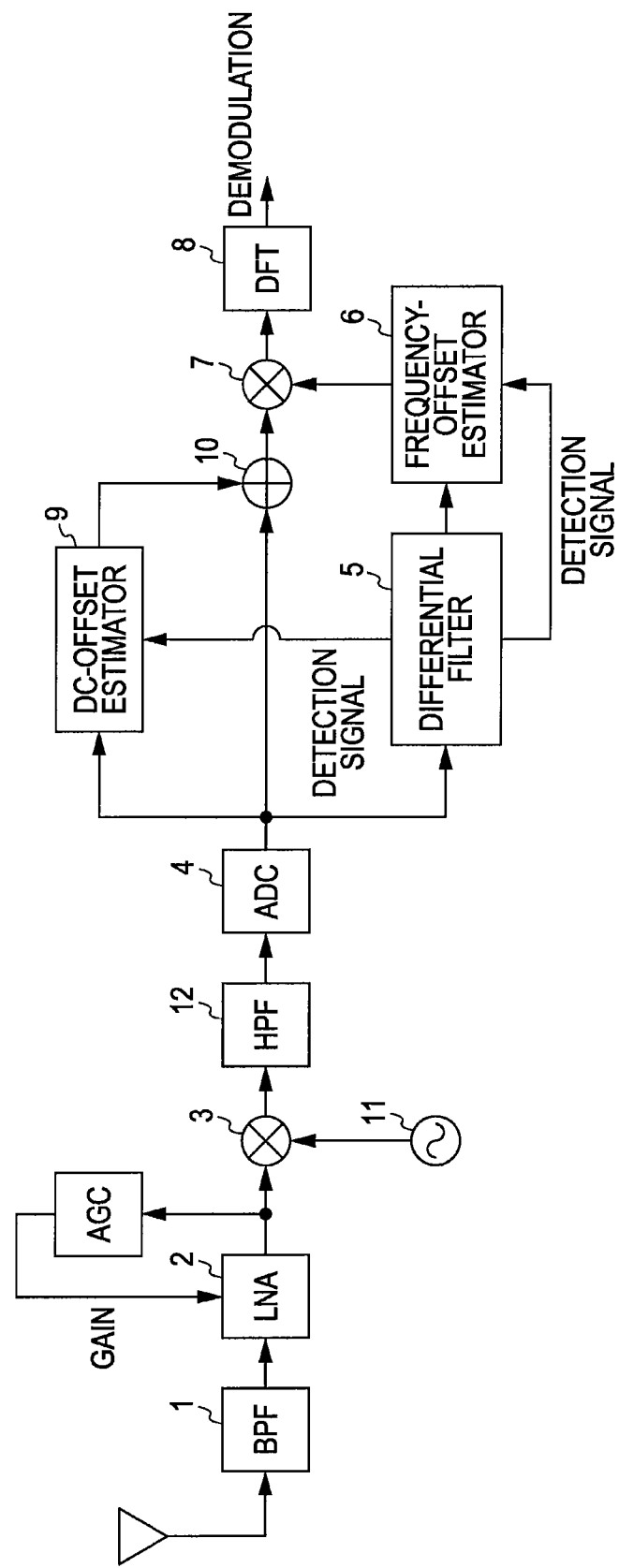
FIG. 6 is a diagram showing an example of the structure of another receiver in the wireless communication apparatus.

FIG. 6 shows an example of the structure of still another receiver capable of removing the influence of DC offsets from the portion of the received baseband signal subsequent to the portion used for frequency-offset estimation (subsequent to the LTS).

Figure 32:
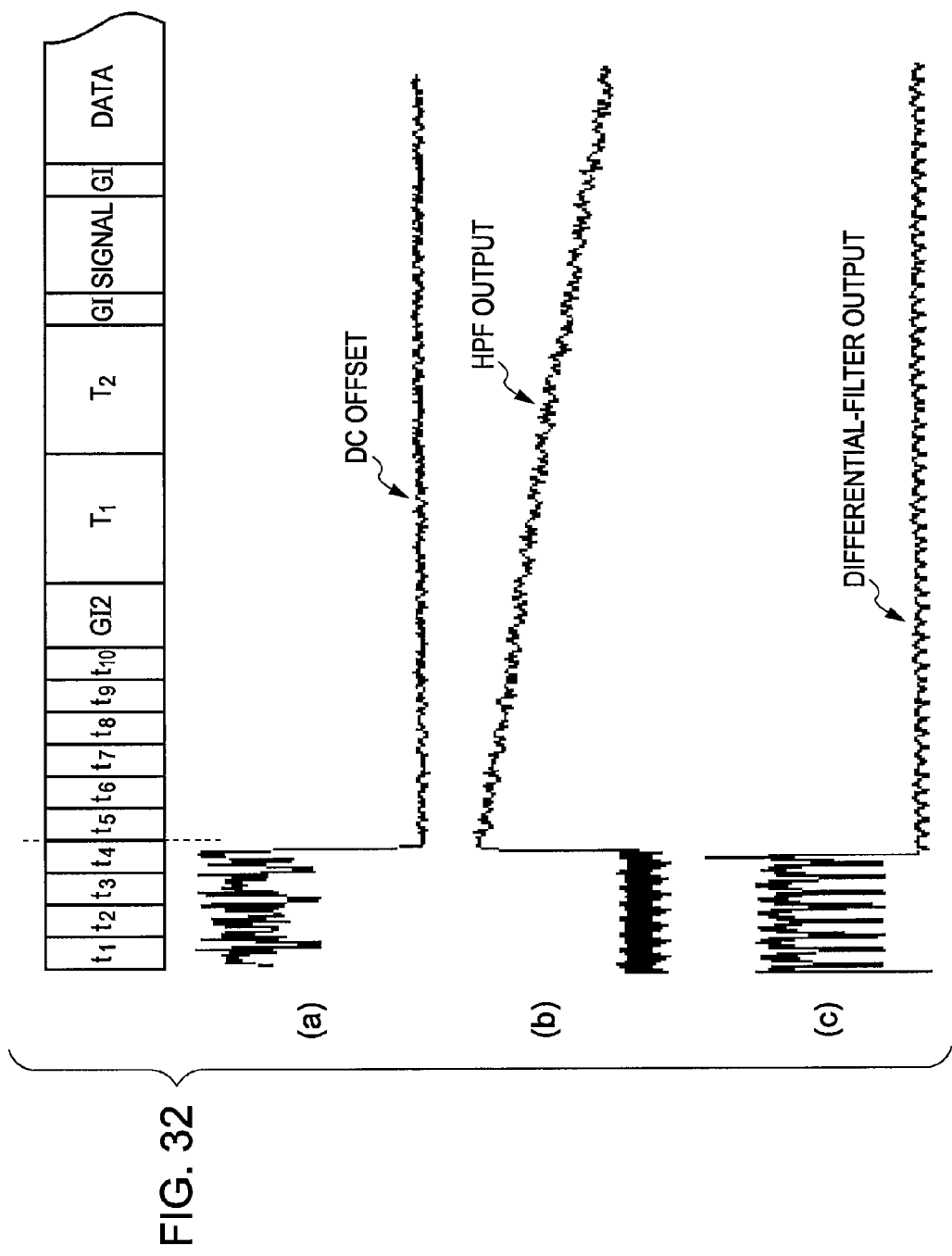
FIG. 32 is a diagram showing that a residual DC offset is removed using the differential filter 5.

In the receiver shown in FIG. 6, the mixer 3 down-converts the received signal using a direct-conversion architecture by multiplying the signal by the local frequency $f_{LO}$ generated by the local oscillator 11. The resulting received baseband signal includes a DC offset caused by self-mixing of a local signal or the like (see part (a) of FIG. 32). The DC offset is removed by passing it through a high-pass filter (HPF) 12. Since the high-pass filter 12 allows all signals to pass therethrough, the cutoff frequency of the high-pass filter 12 is set relatively low so that to a near-DC signal in the OFDM symbols may not be cut. The baseband signal transmitted through the high-pass filter 12 is converted into a digital signal by the AD converter (ADC) 4.

The high-pass filter 12 with low cutoff frequency $f_c$ ensures good demodulation characteristics in the subsequent stage but has low response to changes in DC offset. Therefore, if a DC-offset change occurs due to switching of the gain of the low-noise amplifier 2 or the like, the influence of the changes remains for a long time, and DC offsets are continuously transmitted through the high-pass filter 12 (see part (b) of FIG. 32). To address this situation, a predetermined period of a preamble signal in the received baseband signal is divided into two branches, and one of the branches is input to the differential filter 5 with higher cutoff frequency to remove the residual DC offsets. As shown in part (c) of FIG. 32, the differential filter 5 blocks the residual DC offsets, and outputs only a sharp impulse waveform at the time when the gain is changed at the head of the preamble $t_5$.

Then, the frequency-offset estimator 6 estimates a frequency offset on the basis of the autocorrelation value of the output of the differential filter 5. The frequency-offset corrector 7 removes the frequency offset from the received baseband signal.

Upon detecting a rapid DC-offset change, the differential filter 5 inputs a detection signal to the frequency-offset estimator 6. If the impulse waveform is input to the frequency-offset estimator 6, the MSE may be increased. Therefore, the frequency-offset estimator 6 does not perform frequency-offset estimation for the sample output obtained from the differential filter 5 when the detection signal is input to avoid the influence of the DC offset transmitted through the differential filter 5, as described above.

A threshold value used by the differential filter 5 to detect a rapid DC-offset change can be calculated on the basis of the number of times the gain has been changed and the received signal level, as described above. For example, a received signal strength indicator (RSSI) circuit can be provided in the subsequent stage of the high-pass filter 12 to detect the received signal level.

The DC-offset estimator 9 estimates a DC offset for the portion of the received baseband signal subsequent to the portion used for frequency-offset estimation, and the DC-offset corrector 10 removes the DC offset from the received baseband signal.

Upon detecting a rapid DC-offset change, the differential filter 5 inputs a detection signal to the DC-offset estimator 9. The DC-offset estimator 9 excludes the estimation data estimated before the detection signal is input, and re-estimates a DC offset to prevent reduction in estimation accuracy, as described above.

Then, the frequency-offset corrector 7 performs frequency-offset compensation on the portion of the received baseband signal subsequent to the portion used for frequency-offset estimation, from which the DC offset has been removed, on the basis of the high-accuracy frequency-offset value estimated after the DC offset has been removed.

Figure 7:
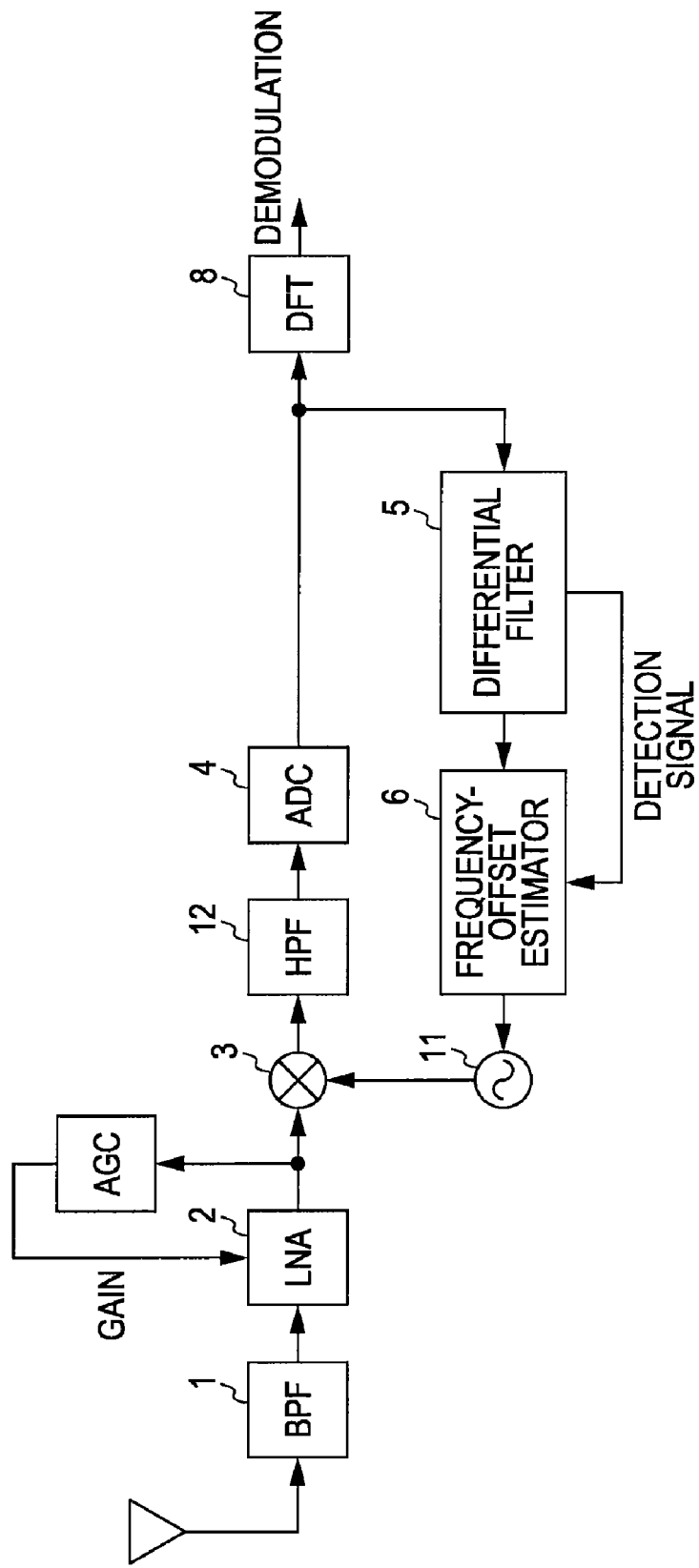
FIG. 7 is a diagram showing an example of the structure of another receiver in the wireless communication apparatus.

FIG. 7 shows an example of the structure of still another receiver capable of removing the influence of DC offsets from the portion of the received baseband signal subsequent to the portion used for frequency-offset estimation (subsequent to the LTS).

In the receiver shown in FIG. 7, the mixer 3 down-converts the received signal using a direct-conversion architecture by multiplying the signal by the local frequency $f_{LO}$ generated by the local oscillator 11. The resulting received baseband signal is transmitted through the high-pass filter 12 in the subsequent stage to remove the DC offset caused by self-mixing of a local signal or the like from the received baseband signal. Since the high-pass filter 12 allows all signals included in a packet to pass therethrough, the cutoff frequency $f_c$ of the high-pass filter 12 is set relatively low so that a near-DC signal in the OFDM symbols may not be cut. The received baseband signal is then converted into a digital signal by the AD converter (ADC) 4.

The high-pass filter 12 with low cutoff frequency $f_c$ ensures good demodulation characteristics in the subsequent stage but has low response to changes in DC offset. Therefore, if a DC-offset change occurs due to switching of the gain of the low-noise amplifier 2 or the like, the influence of the change remains for a long time, and DC offsets are continuously transmitted through the high-pass filter 12 (see part (b) of FIG. 32). To address this situation, a predetermined period of a preamble signal in the received baseband signal is divided into two branches, and one of the branches is input to the differential filter 5 with higher cutoff frequency to remove the residual DC offsets. As shown in part (c) of FIG. 32, the differential filter 5 blocks the residual DC offsets, and outputs only a sharp impulse waveform at the time when the gain is changed at the head of the preamble $t_5$.

The phase of the local frequency oscillated by the local oscillator 11 is inverted on the basis of the estimated frequency offset. Therefore, the influence of DC offsets and frequency offsets can be simultaneously removed from a DC-offset-including portion of the received baseband signal subsequent to the portion used for frequency-offset estimation.

Upon detecting a rapid DC-offset change, the differential filter 5 inputs a detection signal to the frequency-offset estimator 6. If the impulse waveform is input to the frequency-offset estimator 6, the MSE is increased. Therefore, the frequency-offset estimator 6 does not perform frequency-offset estimation for the sample output obtained from the differential filter 5 when the detection signal is input to avoid the influence of the DC offset transmitted through the differential filter 5, as described above.

A threshold value used by the differential filter 5 to detect a rapid DC-offset change can be calculated on the basis of the number of times the gain has been changed and the received signal level. For example, an RSSI circuit can be provided in the subsequent stage of the high-pass filter 12 to detect the received signal level, as described above.

In the first embodiment, a frequency offset is estimated using a preamble in which the same OFDM signal symbol is transmitted repeatedly twice. In the preamble structure shown in FIG. 15, signal processing for packet detection, coarse timing detection, and frequency-offset estimation and correction is performed using the STS. In this signal processing, the characteristic degradation is largely sensitive to DC offsets.

In the receiver shown in FIG. 6, the influence of DC offsets is removed by using the output signal of the differential filter 5, which is one type of high-pass filter, to ensure high-accuracy frequency-offset estimation. Packet detection and coarse timing detection can also be performed using an output signal of a high-pass filter to prevent characteristic degradation due to DC offset.

Figure 8:
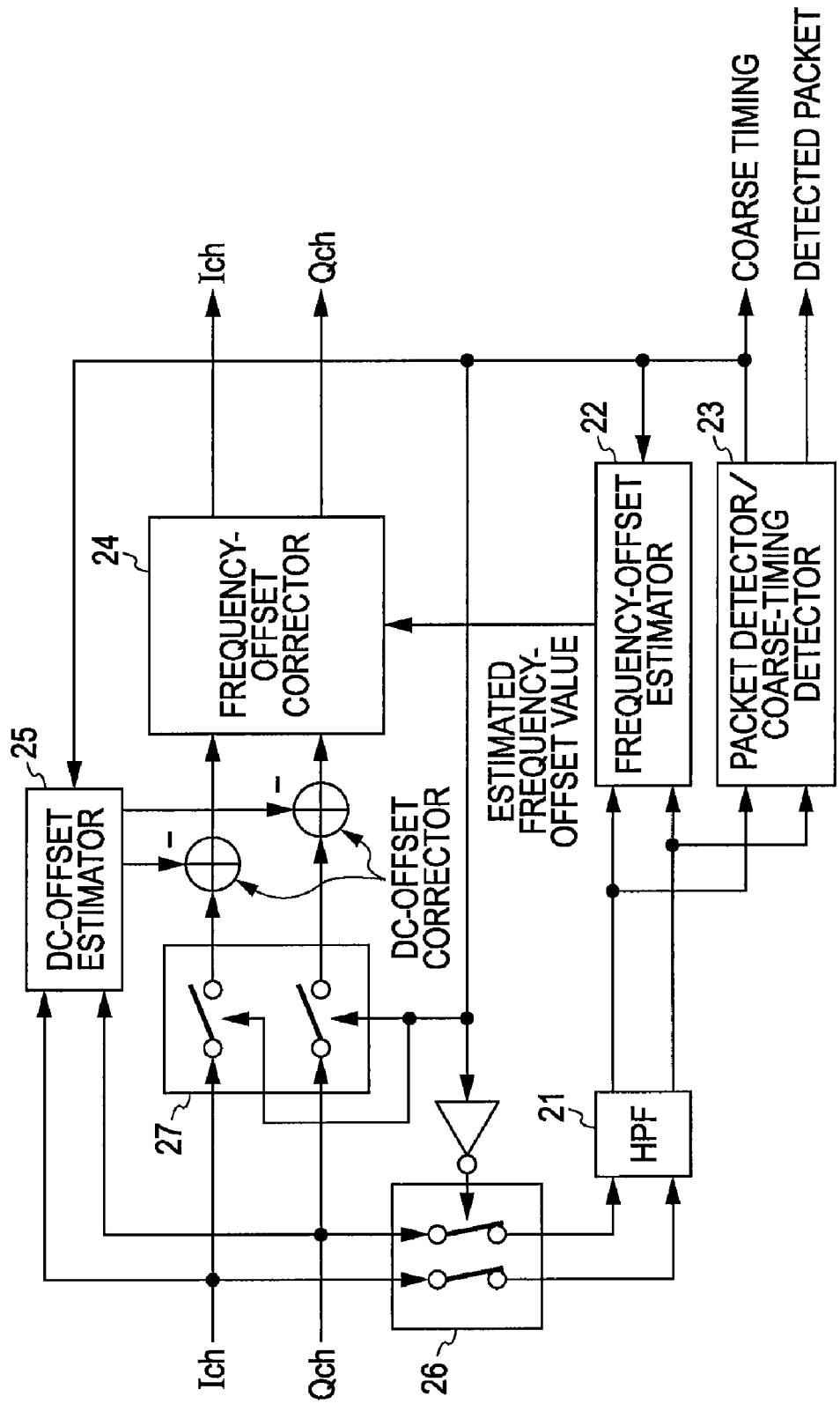
FIG. 8 is a diagram showing an example of the structure of a peripheral synchronous circuit that performs frequency-offset estimation and correction, packet detection, and coarse timing detection using an output of a high-pass filter.

FIG. 8 shows an example of the structure of a peripheral synchronous circuit that performs frequency-offset estimation and correction, packet detection, and coarse timing detection using an output of a high-pass filter.

The synchronous circuit shown in FIG. 8 includes paths directed to a high-pass filter 21 and a DC-offset estimator 25 for each of I-axis and Q-axis input signals, and two switches 26 and 27 are exclusively turned on or off to switch between the paths.

STS has a relatively large subcarrier spacing of 1.25 MHz between nearest-DC subcarriers. In view of this point, the cutoff frequency of the high-pass filter 21 is set high to ensure a desired response characteristic to changes in DC offset. Therefore, the influence of DC offsets can be suppressed with minimum SNR loss.

During synchronous processing, the DC-offset estimator 25 estimates a DC offset from the received baseband signal. The STS has a periodicity of 0.8 μs, and a DC offset can be estimated using a moving average or the like. If the first four symbols $t_1$ to $t_4$ of the STS are utilized for automatic gain control, DC-offset processing, or the like, the synchronous circuit can obtain an estimation time of the six symbols $t_5$ to $t_{10}$, i.e., 4.8 microseconds, at maximum, and ensures high-accuracy DC-offset estimation.

During the period until the end of the STS, the IQ input terminals are connected to the path directed to the high-pass filter 21, and a frequency-offset estimator 22 and a packet detector and coarse-timing detector 23 perform frequency-offset estimation, and packet detection and coarse timing detection, respectively, with high accuracy from the received baseband signal from which the DC offset has been removed.

At the end of the STS, the on/off state of the switches 26 and 27 is switched, and the IQ input terminals are switched from the path directed to the high-pass filter 21 to the path directed to DC-offset correctors. The output signal of the coarse-timing detector 23 is used at the end of the STS.

The DC-offset estimator 25 performs DC-offset estimation using a sufficiently long time until the end of the STS, thus achieving high-accuracy DC-offset correction. After the end of the STS, the path directed to the high-pass filter 21 does not exist. That is, DC-offset removal is not performed on the portion of the received baseband signal subsequent to the LTS with a short subcarrier spacing using the high-pass filter 21 with high cutoff frequency, and no degradation in SNR is taken into account.

During the period until the end of the STS, further, a frequency-offset corrector 24 performs frequency-offset correction on the portion of the received baseband signal subsequent to the end of the STS using the frequency offset estimated by the frequency-offset estimator 22.

In the structure of the synchronous circuit shown in FIG. 8, the switching time between the path directed to the high-pass filter 21 and the path directed to the frequency-offset corrector 24 is determined using a coarse-timing-detection signal. In view of a processing delay of digital circuitry, the paths may be switched earlier than the end of the STS.

Figure 9:
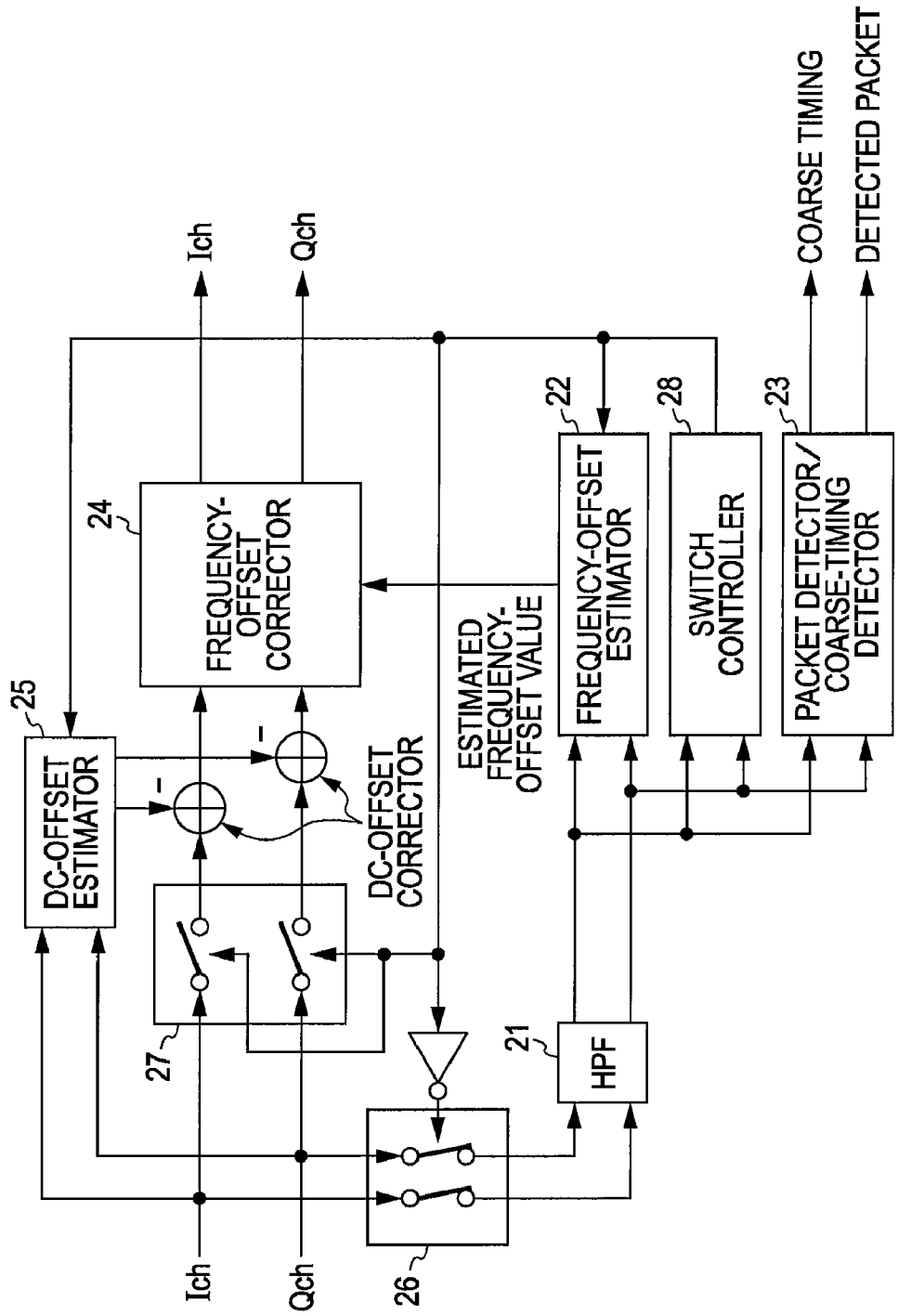
FIG. 9 is a diagram showing an example of the structure of another peripheral synchronous circuit that performs frequency-offset estimation and correction, packet detection, and coarse timing detection using an output of a high-pass filter.
Figure 10:
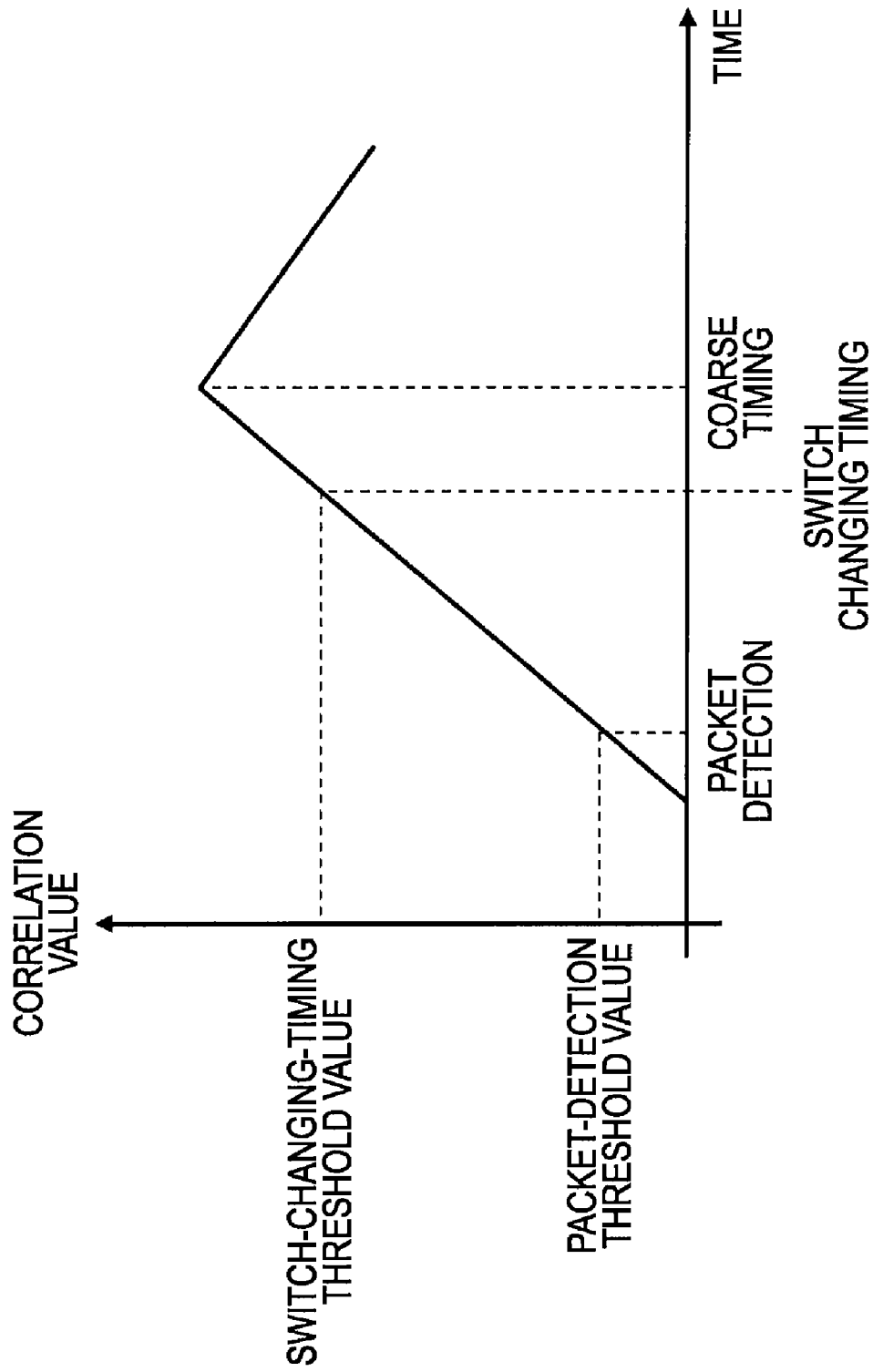
FIG. 10 is a diagram showing an example of a method for adjusting a switching timing by a switch controller 28.

In the structure of a synchronous circuit shown in FIG. 9, the switches 26 and 27 are not directly switched in response to a detection signal of the coarse-timing detector 23, but a switch controller 28 that controls the switching of the switches 26 and 27 is further provided. FIG. 10 shows an example of a method for adjusting a switching timing using the switch controller 28.

The switch controller 28 determines a switching timing using a moving average value of the correlation value of input signals. The switch controller 28 sets a predetermined threshold value, and outputs, as a control signal, a timing when the moving average value exceeds the threshold value to the switches 26 and 27. As shown in FIG. 10, by setting the threshold value, the switching timing can be flexibly adjusted for a period from the packet detection to the coarse timing.

Figure 11A:
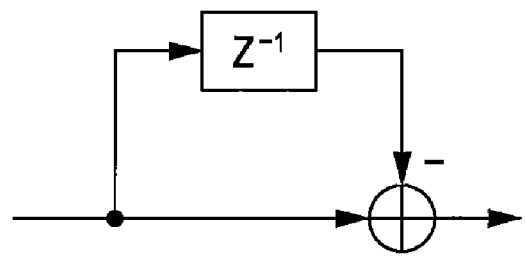
FIG. 11A is a diagram showing an example of the structure of a high-pass filter 21 using a difference filter.
Figure 11B:
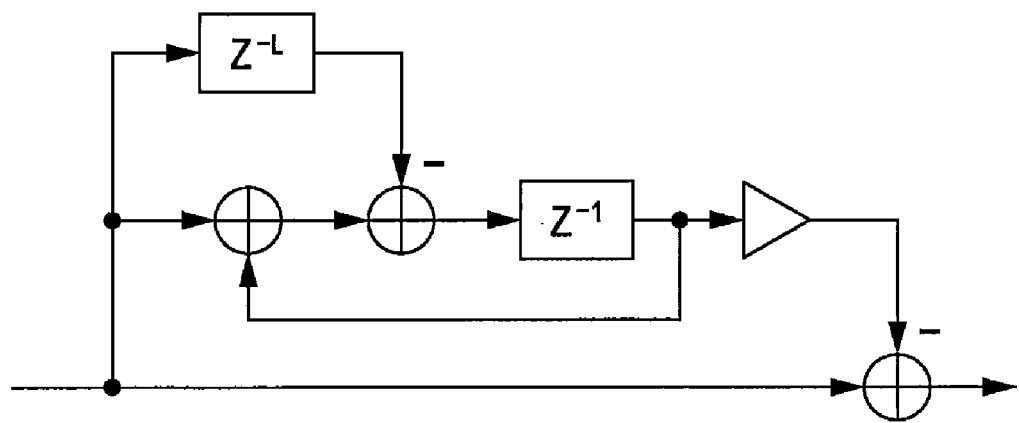
FIG. 11B is a diagram showing another example of the structure of the high-pass filter 21 using a moving-average-based DC-offset estimator and corrector.

FIGS. 11A and 11B show examples of the structure of the high-pass filter 21. FIG. 11A shows the structure using a difference filter, and FIG. 11B shows the structure using a moving-average-based DC-offset estimator and corrector.

Figure 12:
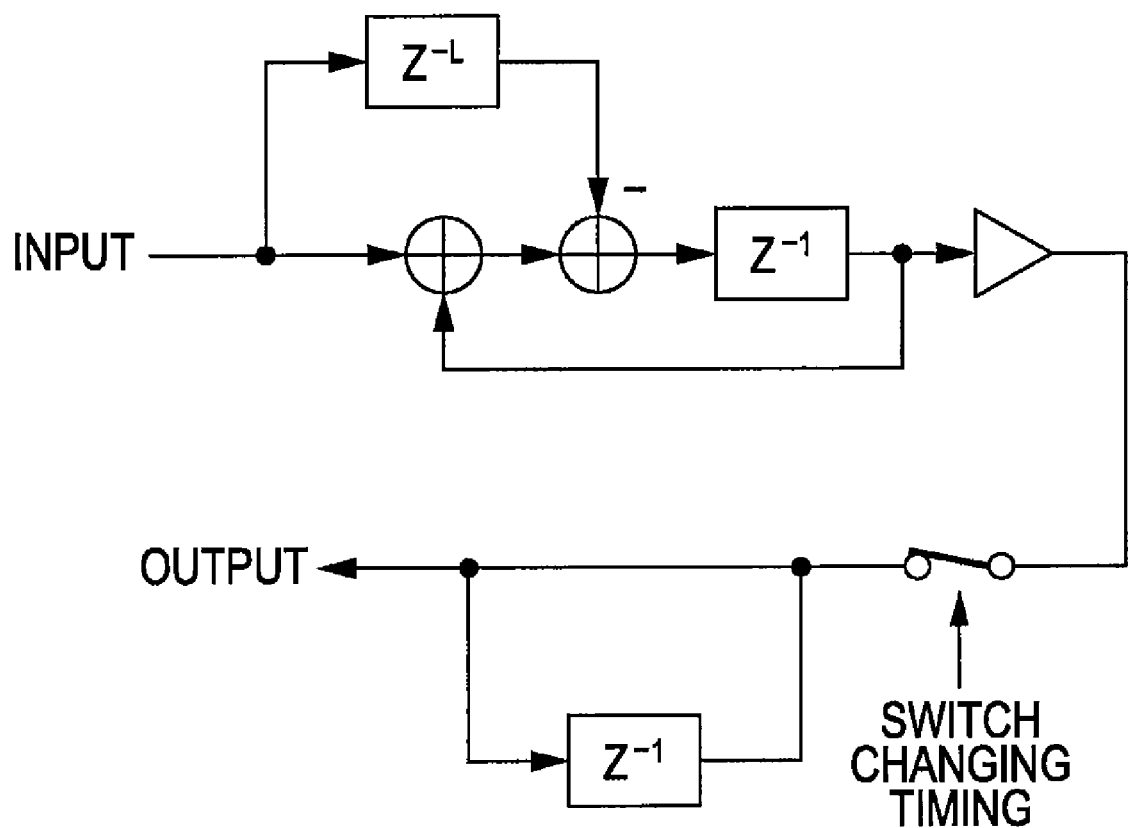
FIG. 12 is a diagram showing an example of the structure of a DC-offset estimator 25.

FIG. 12 shows an example of the structure of the DC-offset estimator 25. In the structure shown in FIG. 12, the estimated DC-offset value obtained at the switching timing of the switches 26 and 27 can be held using the output signal of the switch controller 28 or the coarse-timing detector 23. Therefore, the DC-offset correctors can perform DC-offset correction on the portion of the received baseband signal subsequent to the end of the STS using a high-accuracy DC-offset value estimated at the end of the STS.

The synchronous circuits shown in FIGS. 8 and 9 are configured to perform frequency-offset correction taking DC offsets into account using only the STS in the preamble structure specified in IEEE 802.11a, and the LTS subsequent to the end of the STS can be arbitrarily used.

In general, after coarse frequency-offset correction is performed using the STS, fine frequency-offset correction and channel estimation are performed using the LTS. Therefore, an accurate frequency offset is estimated in the STS to achieve more accurate channel estimation.

Figure 13:
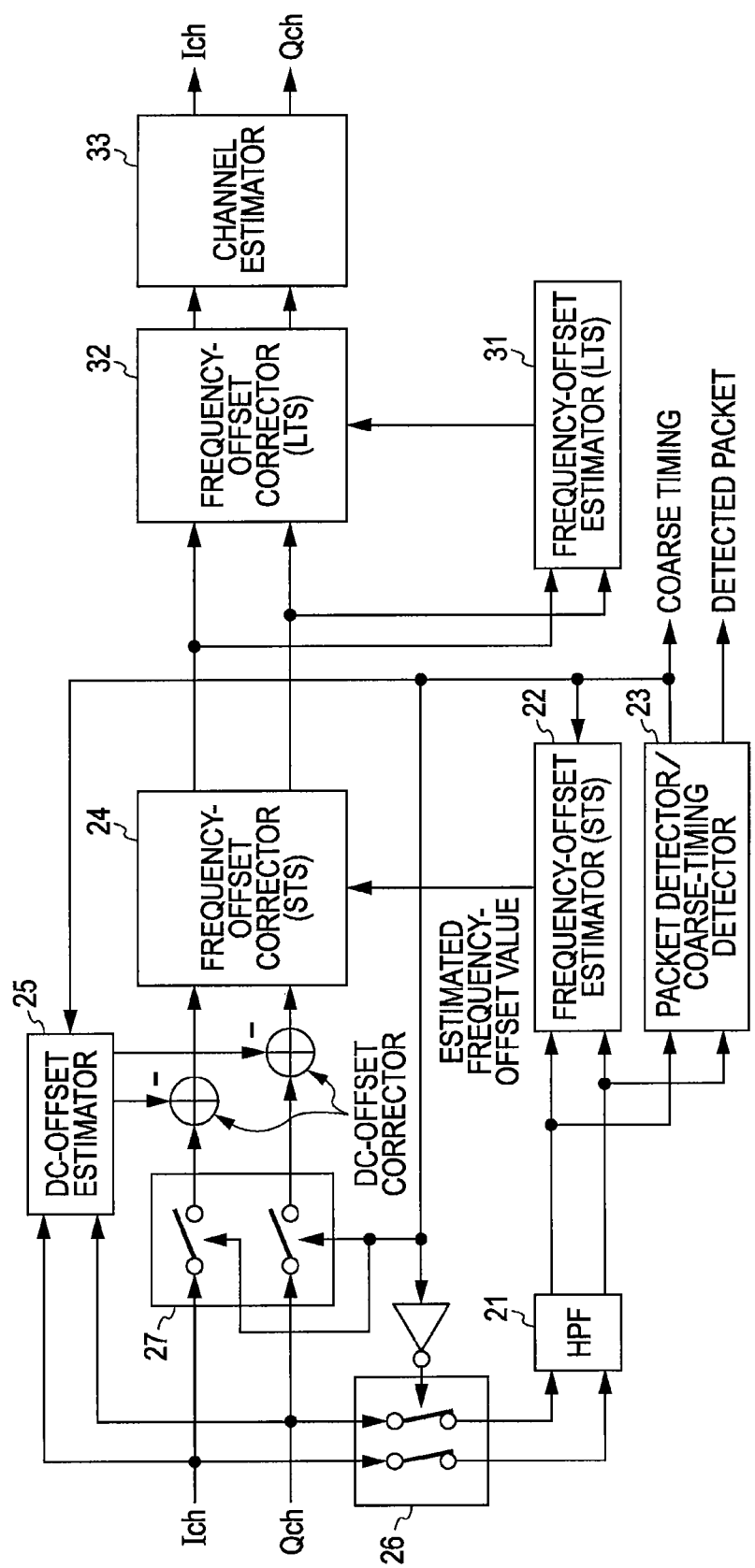
FIG. 13 is a diagram showing an example of the structure of a peripheral synchronous circuit including a circuit module that performs frequency-offset correction and channel estimation in the LTS.

FIG. 13 shows an example of the structure of a peripheral synchronous circuit including a circuit module that performs frequency-offset correction and channel estimation in a long preamble period. In the example shown in FIG. 13, a frequency-offset estimator 31 and frequency-offset corrector 32 for the LTS are provided separately to the frequency-offset estimator 22 and frequency-offset corrector 24 for the STS, and a channel estimator 33 is further provided in the subsequent stage. The frequency-offset estimator 22 performs coarse frequency-offset estimation using the short preambles (wherein the third and following short preambles $t_3$ to $t_{10}$ are used for the estimation because the first and second short preambles $t_1$ and $t_2$ may be affected by the influence of multipath). The frequency-offset estimator 31 performs fine frequency-offset estimation using the long preambles $T_1$ and $T_2$.

At the end of the short preamble period, the IQ input terminals are switched from the path directed to the high-pass filter 21 to the path directed to the DC-offset correctors. After the LTS, each of the DC-offset correctors subtracts an accurate DC offset estimated using a sufficiently long time until the end of the STS from each of the IQ input signals to correct a DC offset. Then, the frequency-offset corrector 24 corrects the frequency offset estimated by the frequency-offset estimator 22 during the period until the end of the STS.

Upon receiving the portion of the received baseband signal subsequent to the LTS, from which the DC offset and frequency offset estimated using the STS have been removed, the frequency-offset estimator 31 performs fine frequency-offset estimation. The frequency-offset corrector 32 removes the frequency offset estimated by the frequency-offset estimator 31 from the portion of the received baseband signal subsequent to the LTS.

The channel estimator 33 performs channel estimation with higher accuracy using the received baseband signal, from which the secondary (residual) frequency offset has been removed using the LTS.

Figure 14:
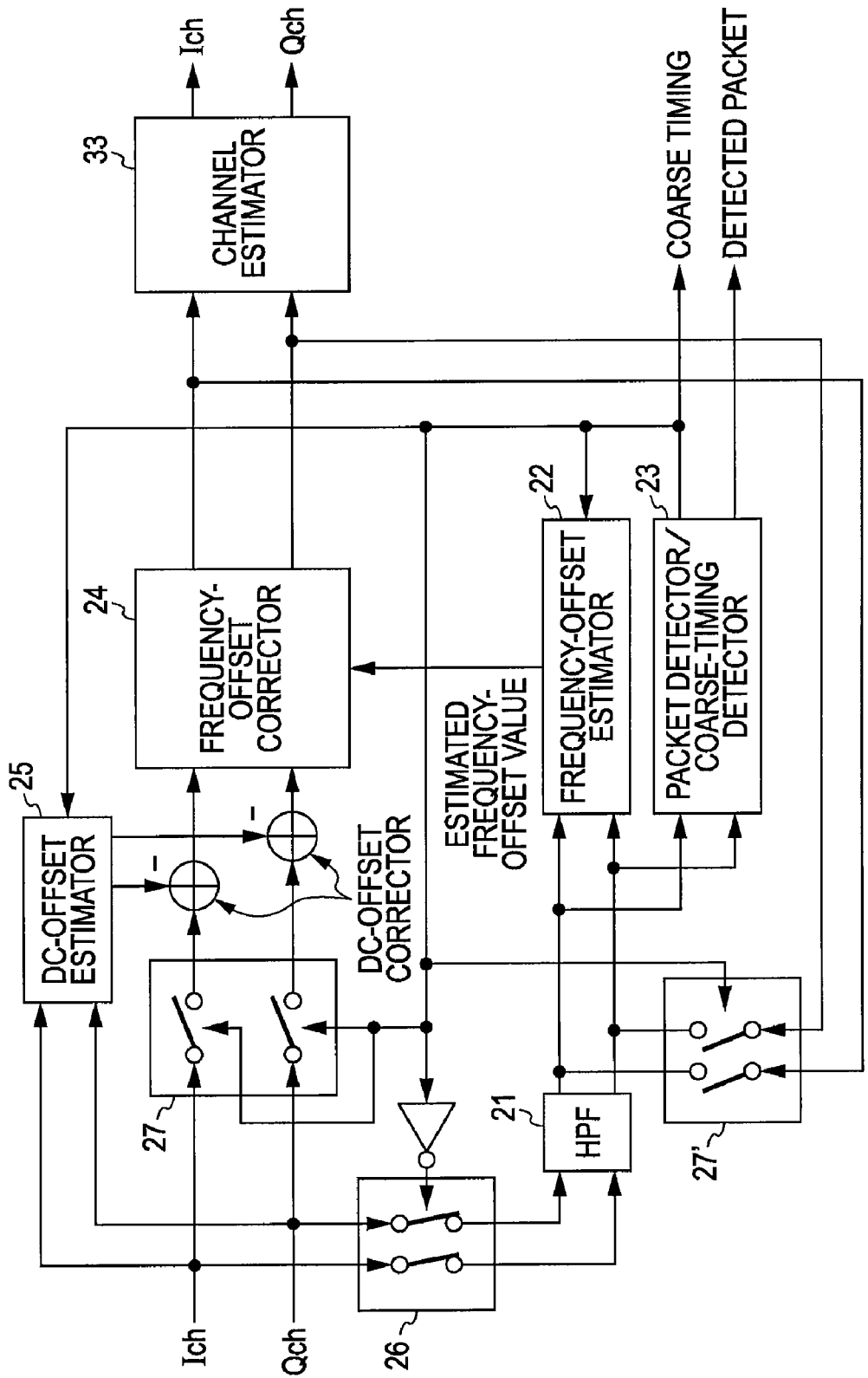
FIG. 14 is a diagram showing an example of the structure of a peripheral synchronous circuit configured such that a frequency-offset estimator 22 and a frequency-offset corrector 24 estimate and remove a frequency offset of a portion of a received baseband signal subsequent to LTS, respectively.

In the circuit structure shown in FIG. 13, circuit modules that performs frequency-offset estimation and removal on the portion of the received baseband signal subsequent to the LTS are additionally provided. Alternatively, the frequency-offset estimator 22 and the frequency-offset corrector 24 may be configured to estimate and remove a frequency offset in the portion of the received baseband signal subsequent to the LTS, respectively. FIG. 14 shows an example of the structure of a peripheral synchronous circuit in the latter case.

At the end of the STS, the IQ input terminals are switched from the path directed to the high-pass filter 21 to the path directed to the DC-offset correctors. After the LTS, each of the DC-offset correctors subtracts an accurate DC offset estimated using a sufficiently long time until the end of the STS from each of the IQ input signals to correct a DC offset. Then, the frequency-offset corrector 24 corrects the frequency offset estimated by the frequency-offset estimator 22 during the period until the end of the STS.

At the end of the STS, further, a switch 27' is turned on to produce the path for returning an output terminal of the frequency-offset corrector 24 to the frequency-offset estimator 22.

The frequency-offset estimator 22 receives the portion of the received baseband signal subsequent to the LTS, from which the DC offset and frequency offset estimated using the STS have been removed, and further estimates a frequency offset. The frequency-offset corrector 24 removes the frequency offset estimated by the frequency-offset estimator 22 from the portion of the received baseband signal subsequent to the LTS.

The channel estimator 33 performs channel estimation with higher accuracy using the received baseband signal from which the secondary (residual) frequency offset has been removed using the LTS.

A method for, in an OFDM direct-conversion receiver, reducing the influence of varying DC offsets in the frequency-offset estimation process when DC offsets are varied in accordance with a change in the gain of a low-noise amplifier has been described.

The OFDM direct-conversion receiver also has a problem of IQ imbalance as well as DC offset caused by self-mixing of a local signal. The IQ imbalance is caused by a phase difference between local signals input to I-axis and Q-axis mixers and an amplitude difference between the mixers. Like DC offsets, IQ imbalances cause degradation in frequency-offset estimation accuracy, and also affect the decoding characteristics. A method for estimating a frequency offset in the presence of IQ imbalance and time-varying DC offset will be described in detail.

In the structure of the receiver shown in FIG. 1, the DC-offset level is varied in accordance with a change in the gain of the low-noise amplifier 2. Frequency-offset estimation is not performed for the symbol output from the differential filter 5 when the varying DC offset is equal to or more than a predetermined value (see FIG. 22) to reduce the influence of the varying DC offset in the frequency-offset estimation process. However, the receiver shown in FIG. 1 does not take sufficient account of the influence of IQ imbalances.

An OFDM direct-conversion receiver has a problem of IQ imbalance as well as DC offset caused by self-mixing of a local signal. The direct conversion architecture does not use IF signals in the digital domain, and IQ quadrature demodulation is not performed in the digital domain but is performed in the analog domain. IQ imbalance is thus caused by imbalance between in-phase (I) components and quadrature-phase (Q) components. In particular, IQ phase imbalance is caused by non-90-degree phase difference between local signals input to I-channel and Q-channel mixers, and IQ gain imbalance is caused by gain difference between signals in the I channel and Q channel.

Figure 23:
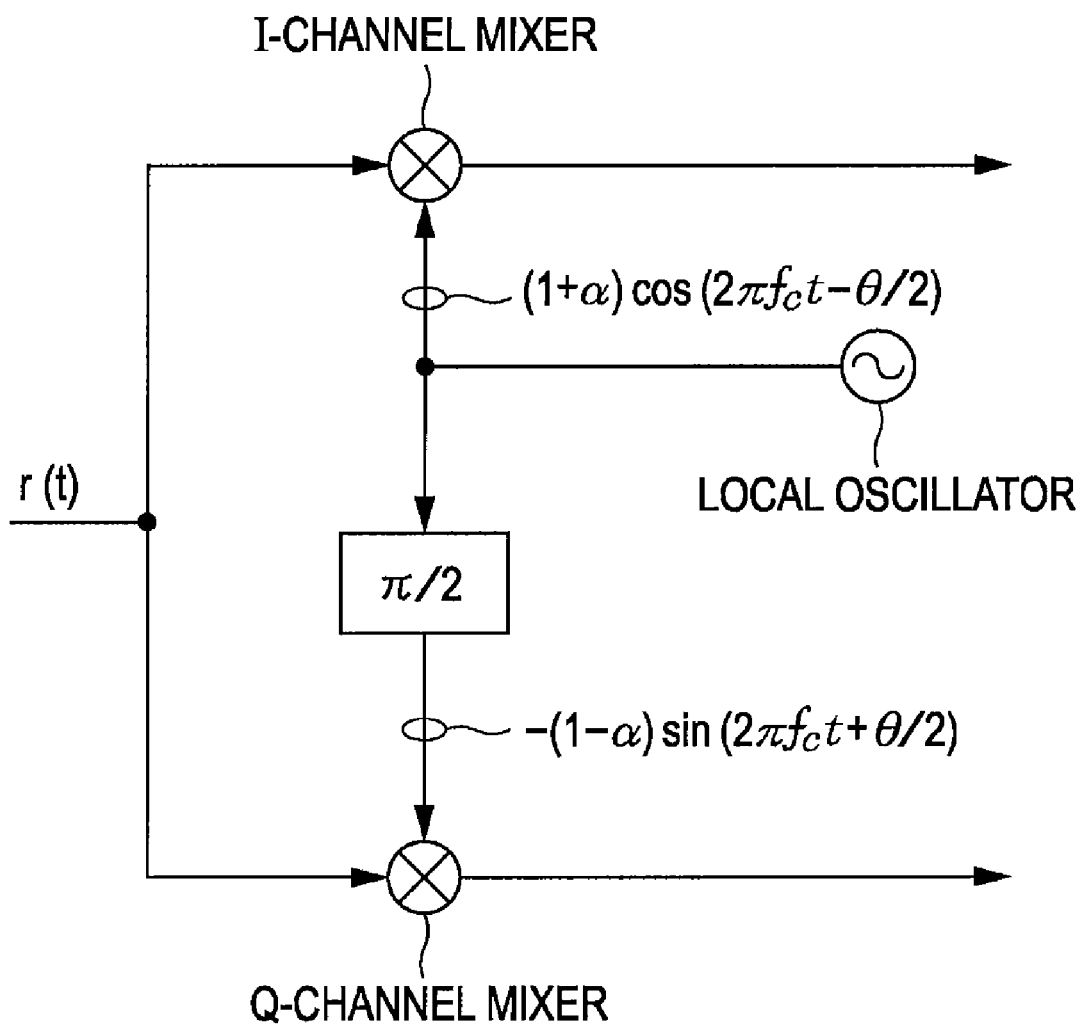
FIG. 23 is a diagram showing the cause of an IQ imbalance.

FIG. 23 illustrates the cause of an IQ imbalance. In FIG. 23, a local signal from a single local oscillator is divided into two branches, and the phase of one of the branches is shifted by 90° to generate a cosine signal and a sine signal. If the two signals have a phase difference of more than 90° or have different amplitudes, the frequency-converted baseband signal is distorted. This phenomenon is called an IQ imbalance. The influence of the distortion is transmitted through a differential filter, and thus an IQ imbalance causes degradation in frequency-offset estimation accuracy.

If the phase difference between the cosine signal and the sine signal is denoted by θ and the amplitude difference is denoted by λ (expressed in decibel (dB)), the I component and Q component of the local signal of the local frequency $f_c$ are represented by formulae below, and are input to the corresponding mixers:

I component: $(1+\alpha)\cos(2\pi f_c t - \theta/2)$

Q component: $-(1-\alpha)\sin(2\pi f_c t + \theta/2)$ where α is represented by the equation below using the amplitude difference λ:

$$\alpha = \frac{10^{\lambda/20} - 1}{10^{\lambda/20} + 1}$$

Those components of the local signal are frequency-multiplied by the received signal r(i) using the corresponding mixers. The complex transmission symbol is set to $X_n = a_n + jb_n$.

$$r(t)(1+\alpha)\cos\left(2\pi f_c t - \frac{\theta}{2}\right) =$$

$$\frac{(1+\alpha)}{2} \sum_{n=-N/2}^{N/2} \left[ (a_n - b_n) \left\{ \cos\left(2\pi(2f_c + nf_0)t - \frac{\theta}{2}\right) + \cos\left(2\pi nf_0 t + \frac{\theta}{2}\right) \right\} - \right.$$

$$\left. (a_n + b_n) \left\{ \sin\left(2\pi(2f_c + nf_0)t - \frac{\theta}{2}\right) + \sin\left(2\pi nf_0 t + \frac{\theta}{2}\right) \right\} \right]$$

$$r(t)\left\{ -(1-\alpha)\sin\left(2\pi f_c t + \frac{\theta}{2}\right) \right\} = -\frac{(1+\alpha)}{2}$$

$$\sum_{n=-N/2}^{N/2} \left[ (a_n - b_n) \left\{ \sin\left(2\pi(2f_c + nf_0)t + \frac{\theta}{2}\right) - \sin\left(2\pi nf_0 + \frac{\theta}{2}\right) \right\} + \right.$$

$$\left. (a_n + b_n) \left\{ \cos\left(2\pi(2f_c + nf_0)t + \frac{\theta}{2}\right) - \cos\left(2\pi nf_0 - \frac{\theta}{2}\right) \right\} \right]$$

While the received baseband signal without taking account of IQ imbalance is determined by equation (7) above, the received complex baseband signal under the influence of IQ imbalances is determined by equation (11) as follows:

$$\hat{r}(i) = \left(\cos\frac{\theta}{2} + j\alpha\sin\frac{\theta}{2}\right)r(i) + \left(\alpha\cos\frac{\theta}{2} - j\sin\frac{\theta}{2}\right)r^*(i) \quad (11)$$

$$\hat{r}(i) = \phi r(i) + \psi^* r^*(i)$$

where $$\phi = \cos\frac{\theta}{2} + j\alpha\sin\frac{\theta}{2}$$

$$\psi = \alpha\cos\frac{\theta}{2} + j\sin\frac{\theta}{2}$$

In equation (11), i denotes the sample number in the short preambles, and the superscript asterisk (*) indicates the complex conjugate.

Therefore, the difference signal output from the differential filter 5 under the influence of IQ imbalances is determined by equation (12) as follows:

$$d(i) = \hat{r}(i+1) - \hat{r}(i) \quad (12)$$

$$= \phi(r(i+1) - r(i)) + \psi^*(r^*(i+1) - r^*(i))$$

The frequency-offset estimator 6 estimates a frequency offset on the basis of the difference signal determined by equation (12) above. The multiplier 205 multiplies the difference signal by a difference signal delayed by N/4 samples to obtain a frequency-offset-estimation vector for each sample. The autocorrelation value (i.e., the frequency-offset-estimation vector) including an IQ imbalance, which is output from the differential filter 5, is represented by equation (13) as follows:

$$\hat{d}\left(i+\frac{N}{4}\right)\hat{d}^*(i) = |\phi|^2 |r(i+1) - r(i)|^2 \exp(j2\pi\Delta f\, N/4) + \quad (13)$$

$$\phi^*\psi^*(r^*(i+1) - r^*(i))^2 \exp(-j2\pi\Delta f\, N/4) +$$

$$\phi\psi(r(i+1) - r(i))^2 \exp(j2\pi\Delta f\, N/4) +$$

$$|\psi|^2 |r(i+1) - r(i)|^2 \exp(-j2\pi\Delta f\, N/4)$$

Figure 24:
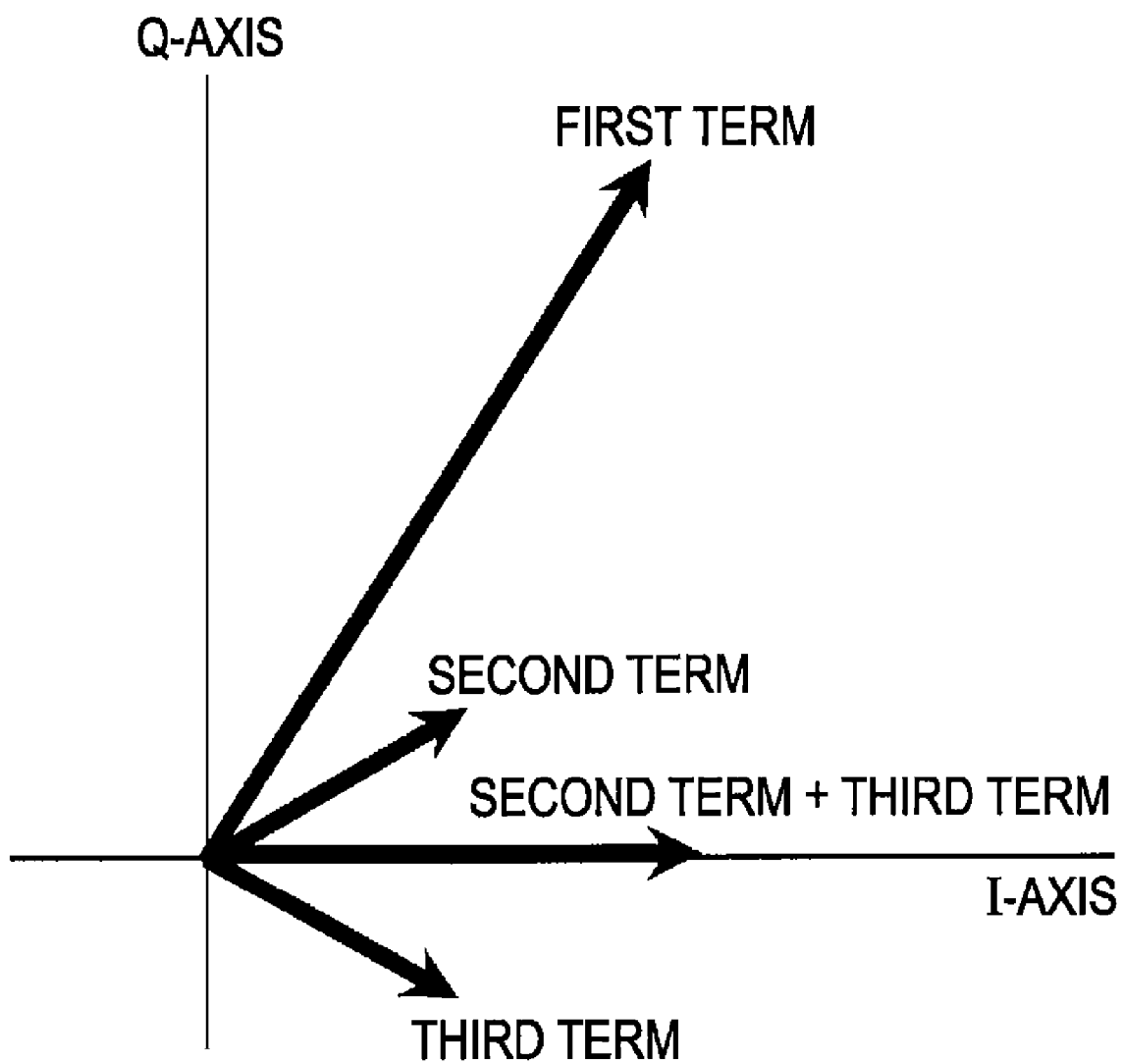
FIG. 24 is a diagram showing a vector representation of frequency-offset information in a complex space.

The frequency-offset information represented by equation (13) above has four terms. Those terms are expressed as vectors in a complex space, as shown in FIG. 24.

The first term in equation (13) is a vector depending only on frequency offsets. That is, when the received baseband signal includes no IQ imbalances, only the first term is output from the multiplier 205, and the frequency offset can be estimated from the angle of the vector.

The second to fourth terms in equation (13) are terms generated by an IQ imbalance, and those terms cause degradation in frequency-offset estimation accuracy. In the fourth term, the value $|\psi|^2$ is as small as negligible (it is to be understood that $\psi$ is small because α is about 0.1 and θ is about 0.05°). The second and third terms are complex conjugate pairs, and those two terms are summed to produce only a real-number component, which is considered to be the main cause of degradation in frequency-offset estimation accuracy.

The multiplier 205 determines a cross-correlation result for each short preamble, and the cross-correlation results for all the short preambles are summed using the adder 206 to estimate a frequency offset Δf. A distortion included in the total sum of the cross-correlation results depends on a total number of samples or preamble signal patterns.

Figure 25:
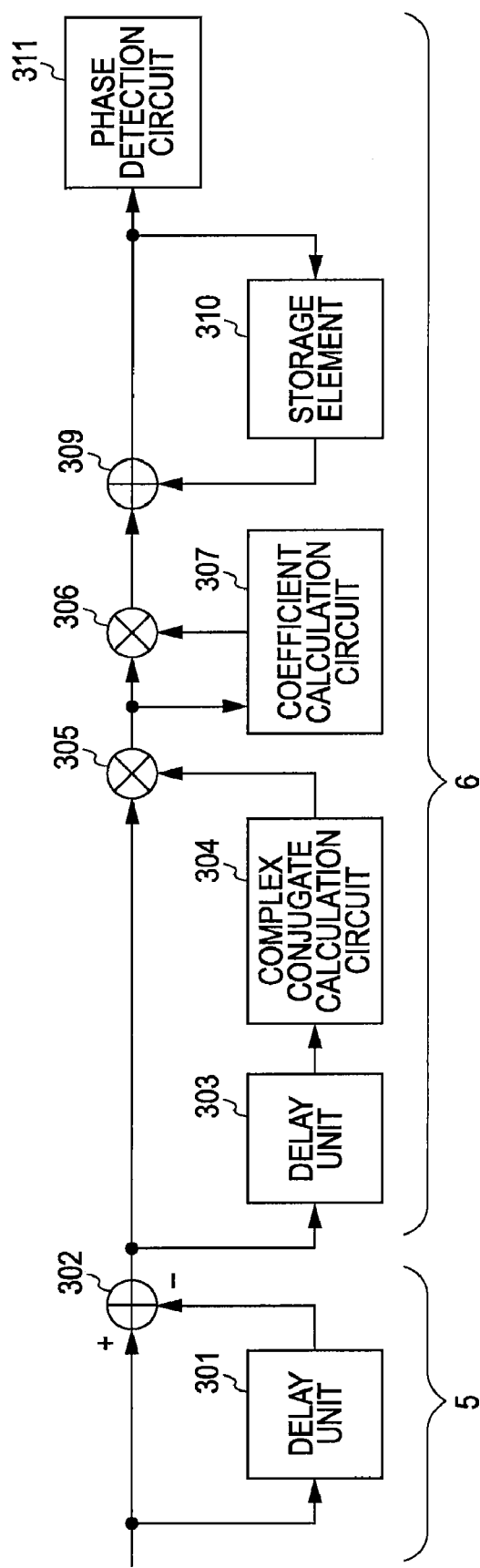
FIG. 25 is a diagram showing a specific example of the structure of the differential filter 5 and the frequency-offset estimator 6.

FIG. 21 shows an example of the structure of the differential filter 5 and the frequency-offset estimator 6, in which time-varying DC offsets are taken into account although the influence of IQ imbalances in the frequency-offset estimation process is not sufficiently taken into account. FIG. 25 shows an example of the structure of the differential filter 5 and the frequency-offset estimator 6 in which the influence of IQ imbalances is suppressed. In FIG. 25, the differential filter 5 includes a delay unit 301 and an adder 302. The frequency-offset estimator 6 includes a delay unit 303, a complex conjugate calculation circuit 304, multipliers 305 and 306, a coefficient calculation circuit 307, an adder 309, a storage element 310, and a phase detection circuit 311.

An operation for performing more-accurate frequency-offset estimation by suppressing the influence of IQ imbalances and time-varying DC offsets in the frequency-offset estimation process will be described with reference to FIG. 25.

A signal received by the antenna is transmitted through the band-pass filter 1, and only the desired OFDM signal is amplified by the low-noise amplifier 2. The amplified signal is multiplied using the mixer 3 by the local signal from the local oscillator 11, and is converted into a baseband signal. The received baseband signal is converted into a digital signal by the AD converter 4. If the amplitude difference and phase difference caused by an IQ imbalance are denoted by α and θ, respectively, the received baseband signal is represented by equation (11) above.

The differential filter 5 includes the delay unit 301 and the adder 302. The AD converted signal obtained by the AD converter 4 is input to the input of the delay unit 301. The AD converted signal is also input to a first input of the adder 302, and the output of the delay unit 301 is inverted and is input to a second input of the adder 302 for subtraction therebetween. The differential filter 5 therefore processes the received baseband signal according to equation (12) above.

The frequency-offset estimator 6 in the subsequent stage includes the delay unit 303, the complex conjugate calculation circuit 304, the multipliers 305 and 306, the coefficient calculation circuit 307, the adder 309, the storage element 310, and the phase detection circuit 311. The output of the adder 302 is input to the delay unit 303 and a first of the multiplier 305. The delay unit 303 delays the input signal by N/4 (=16) samples, which correspond to the short preamble length, and outputs the delayed signal to the complex conjugate calculation circuit 304 in the subsequent stage. The output of the complex conjugate calculation circuit 304 is input to a second input of the multiplier 305. In the frequency-offset estimator 6, therefore, the operation given by equation (13) above is performed for each of the short preambles $t_1$, $t_2$, etc.

The first term in equation (13) is a vector including a frequency offset Δf. The vectors are summed using the adder 309 and the storage element 310, and the angle of rotation of the summed vector is detected by the phase detection circuit 311. Therefore, the value of the frequency-offset value Δf is estimated.

As described previously, the second to fourth terms in equation (13) are terms generated by an IQ imbalance, and those terms cause degradation in frequency-offset estimation accuracy. In the fourth term, the absolute value of the value ψ is as small as negligible, as described above. The second and third terms are complex conjugate pairs, and those two terms are summed to produce only a real-number component, which will be the main cause of degradation in frequency-offset estimation accuracy.

The second and third terms are vectors depending on the pattern of the short preamble r(i) and frequency offsets, and the direction of the vectors is not fixed. The estimated frequency-offset values for the preamble symbols, which are output from the multiplier 305, are summed using the storage element 310 and the adder 309 over a sufficient number of samples, thereby increasing the first term in equation (13) while decreasing the distortion components in the second to fourth terms relatively to the first term. The phase of the vector is detected by the phase detection circuit 311 in the subsequent stage. Therefore, a more accurate frequency offset can be estimated.

If the gain of the low-noise amplifier 2 is changed during the frequency-offset estimation performed by the frequency-offset estimator 6, the IQ imbalance component included in the frequency offset estimated when a large gain is set increases. Therefore, if the frequency offsets estimated over a plurality of preamble symbols are simply summed, it may be difficult to sufficiently reduce the proportion of IQ imbalance component.

In receivers, generally, a large gain is determined for the low-noise amplifier 2 at the beginning of signal detection, and thereafter the gain is changed to a lower gain according to the power of the received signal. Specifically, the automatic gain control circuit sets a large gain for the low-noise amplifier 2 at the beginning of signal detection, and determines a desired gain using the first to fourth short preambles $t_1$ to $t_4$. The gain is switched to a lower gain at the beginning of the fifth short preamble $t_5$. The gain switching level is about 20 dB.

It is assumed that the first to second short preambles $t_1$ to $t_2$ are not used for frequency-offset estimation in view of the influence of multipath. In this case, the magnitudes of the frequency-offset-estimation vectors representing, in the complex space, frequency offsets (output from the multiplier 305) before and after changing the gain of the low-noise amplifier 2 are significantly different from each other, as shown in, for example, FIG. 26. That is, the absolute values of the outputs of the multiplier 305 for the short preamble symbols $t_3$ and $t_4$ are large while the absolute values of the outputs of the multiplier 305 for the short preamble symbols $t_5$ and $t_{10}$ are small. The outputs of the multiplier 305 for the preambles $t_3$ and $t_4$ are only 15 samples. Therefore, the composite vector of the second and third terms in equation (13) included in the outputs of the multiplier 305 for the preambles $t_3$ and $t_4$ remains in the storage element 310 as having a larger value than that of the first term.

Figure 27:
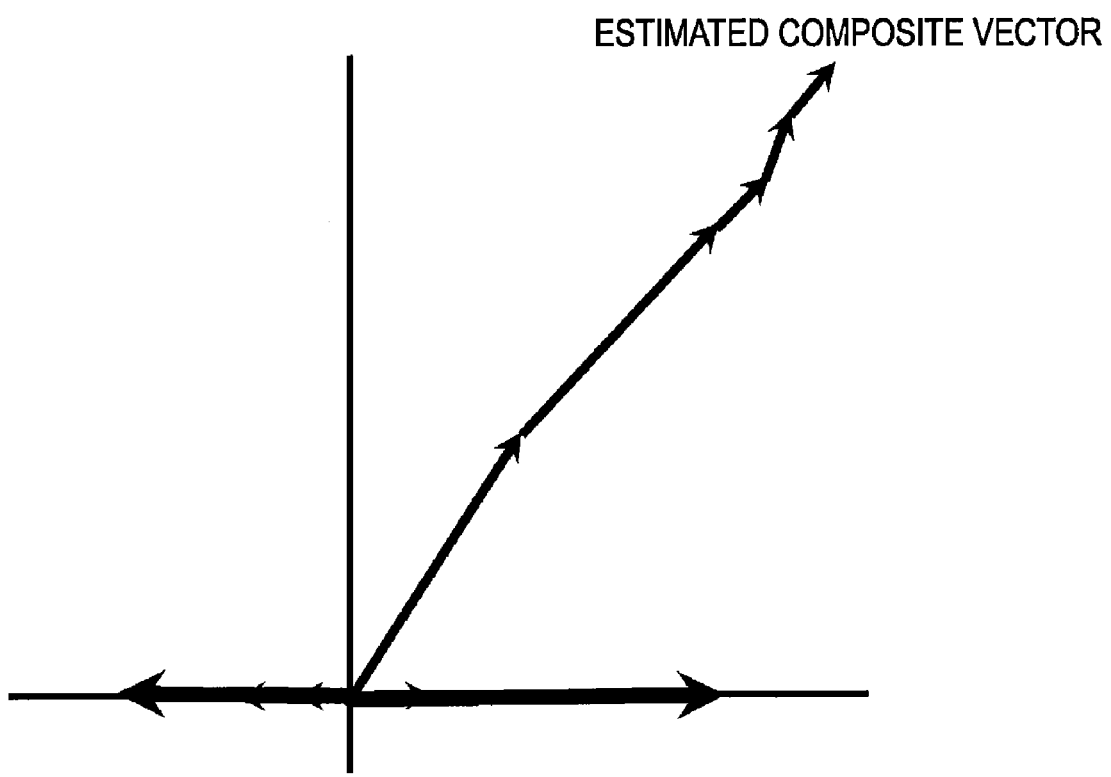
FIG. 27 is a diagram showing an estimated composite vector obtained by sequentially adding to the output of a storage element 310 15 sample outputs of a multiplier 305 corresponding to short preamble symbols $t_3$ and $t_4$ and 79 sample outputs of the multiplier 305 corresponding to short preamble symbols $t_5$ and $t_{10}$.

In the structure shown in FIG. 21, the sum of the cross-correlation results for all the short preambles $t_3$ to $t_{10}$ is used for frequency-offset estimation. The larger the number of samples used to calculate the cross correlation, the less the distortion depending on the second and third terms in equation (13). However, if the gain of the low-noise amplifier 2 is changed, the distortion component depending on the second and third terms remains in the estimated vector because the amplitude of the samples regarding the short preamble symbols $t_3$ and $t_4$ is significantly larger than that of the other preamble symbols. As a result, an estimated composite vector (see FIG. 27) obtained by sequentially adding 79 samples corresponding to the outputs of the multiplier 205 for the short preamble symbols $t_5$ and $t_{10}$ to the output of the storage element 310 causes degradation in frequency-offset estimation accuracy.

In the structure of the frequency-offset estimator 6 shown in FIG. 25, in contrast, a frequency offset estimated for each preamble symbol is weighted according to the gain set in the low-noise amplifier 2 when the corresponding preamble symbol is received, and the weighted frequency offsets are summed to obtain a final frequency-offset value. Therefore, the IQ imbalance component included in the estimated frequency-offset value can be relatively reduced by weighting samples after the change in the gain of the low-noise amplifier 2 by a larger factor (or without using samples before the change in the gain for frequency-offset estimation), and a more accurate frequency offset can finally be obtained.

Specifically, the absolute value of the output signal of the multiplier 305 is input to the coefficient calculation 307, and the corresponding coefficient is input to the multiplier 306. The coefficient calculation circuit 307 calculates a weighting factor corresponding to the absolute value of the output signal of the multiplier 305 using either a first or second method described below. The calculation of the weighting factor corresponding to the absolute value of the output signal of the multiplier 305 is substantially equivalent to the calculation of the weighting factor corresponding to the magnitude of the gain set in the low-noise amplifier 2.

The first method will be described.

A threshold value is determined. If the absolute value of the output signal of the multiplier 305 exceeds the threshold value, the coefficient is set to 0. If the absolute value does not exceed the threshold value, the coefficient is set to 1. For example, the threshold value is determined from the received signal strength indicator (RSSI). In this case, the frequency offset is estimated according to equation (14) as follows:

$$\Delta f = \arg\left\{ \sum_{i=5N/4+1}^{10N} \hat{d}\left(i+\frac{N}{4}\right)\hat{d}^*(i) \right\} \bigg/ (2\pi N/4) \qquad (14)$$

In other words, in the first method, a frequency offset is estimated from the short preambles $t_5$ $t_{10}$ after the change in the gain of the low-noise amplifier 2. In this case, the number of samples used to calculate the cross correlation increases, and the number of distortion terms depending on an IQ imbalance can be reduced.

The second method will be described.

The reciprocal of the absolute value of the output signal of the multiplier 305 is used as a coefficient. In this case, the frequency offset is estimated according to the following equation:

$$\Delta f = \arg\left\{\sum_{i=2N/4+1}^{3N} \frac{\hat{d}\left(i+\frac{N}{4}\right)\hat{d}^*(i)}{\left|\hat{d}\left(i+\frac{N}{4}\right)\hat{d}^*(i)\right|} + \sum_{j=5N/4+1}^{10N} \hat{d}\left(j+\frac{N}{4}\right)\hat{d}^*(j)\right\} / (2\pi N/4) \quad (15)$$

Figure 26:
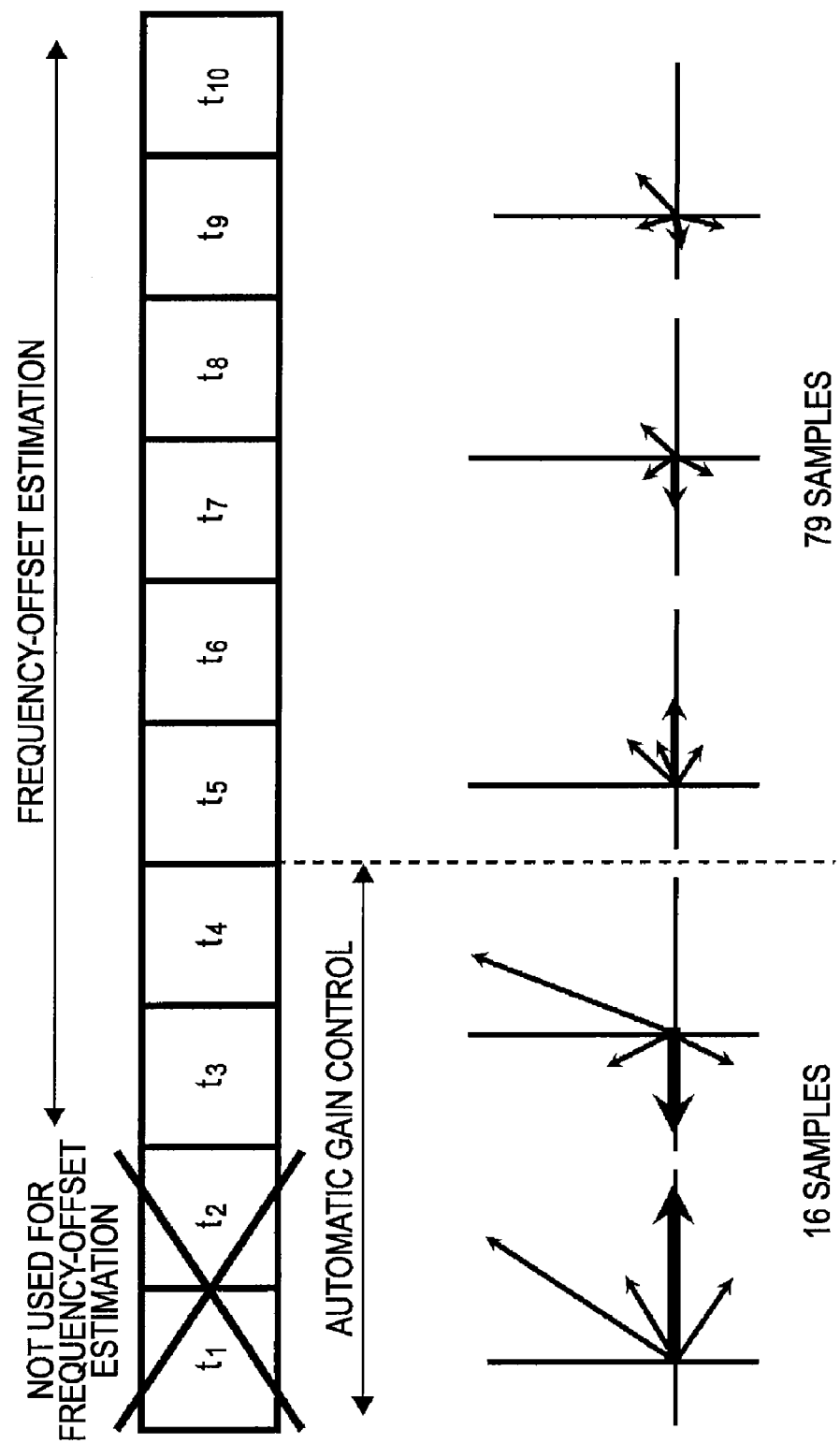
FIG. 26 is a diagram showing estimated vectors of frequency offsets before and after a change in the gain of the low-noise amplifier 2.

It is assumed here that, as shown in FIG. 26, the gain of the low-noise amplifier 2 is instantaneously changed between the short preambles $t_4$ and $t_5$. With this processing, the influence of the distortion component appearing in the output of the adder 302 due to the IQ imbalance can be reduced.

Figure 28:
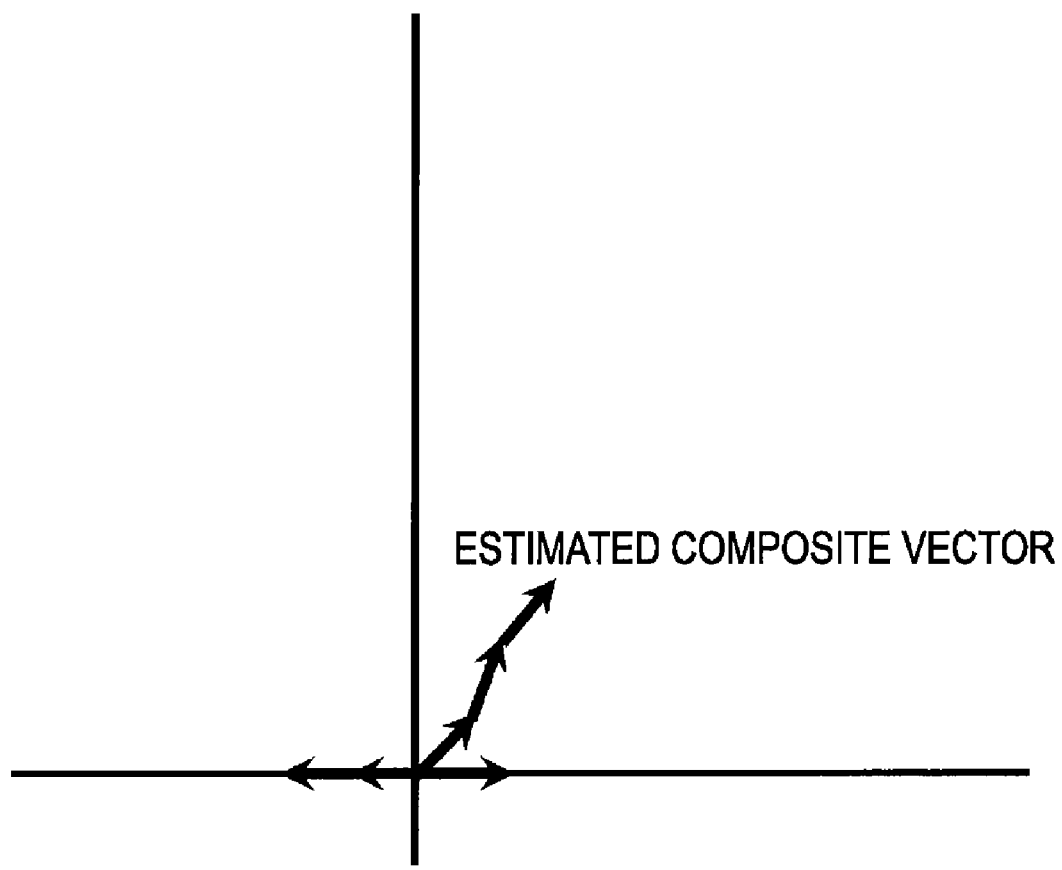
FIG. 28 is a diagram showing an estimated composite vector obtained by weighting frequency offsets by weighting factors according to the absolute value of output signals of the multiplier 305 and summing the weighted frequency offsets.

FIG. 28 shows an estimated composite vector obtained by the frequency-offset estimator 6 using the first method. As shown in FIG. 28, the estimated vectors obtained using the short preamble symbols $t_3$ and $t_4$ before the gain of the low-noise amplifier 2 is reduced are canceled. Therefore, unlike the example shown in FIG. 27, the estimated vectors are summed for a sufficient number of samples, thereby increasing the first term in equation (13) while decreasing the distortion component in the second to fourth terms relatively to the first term.

Figure 29:
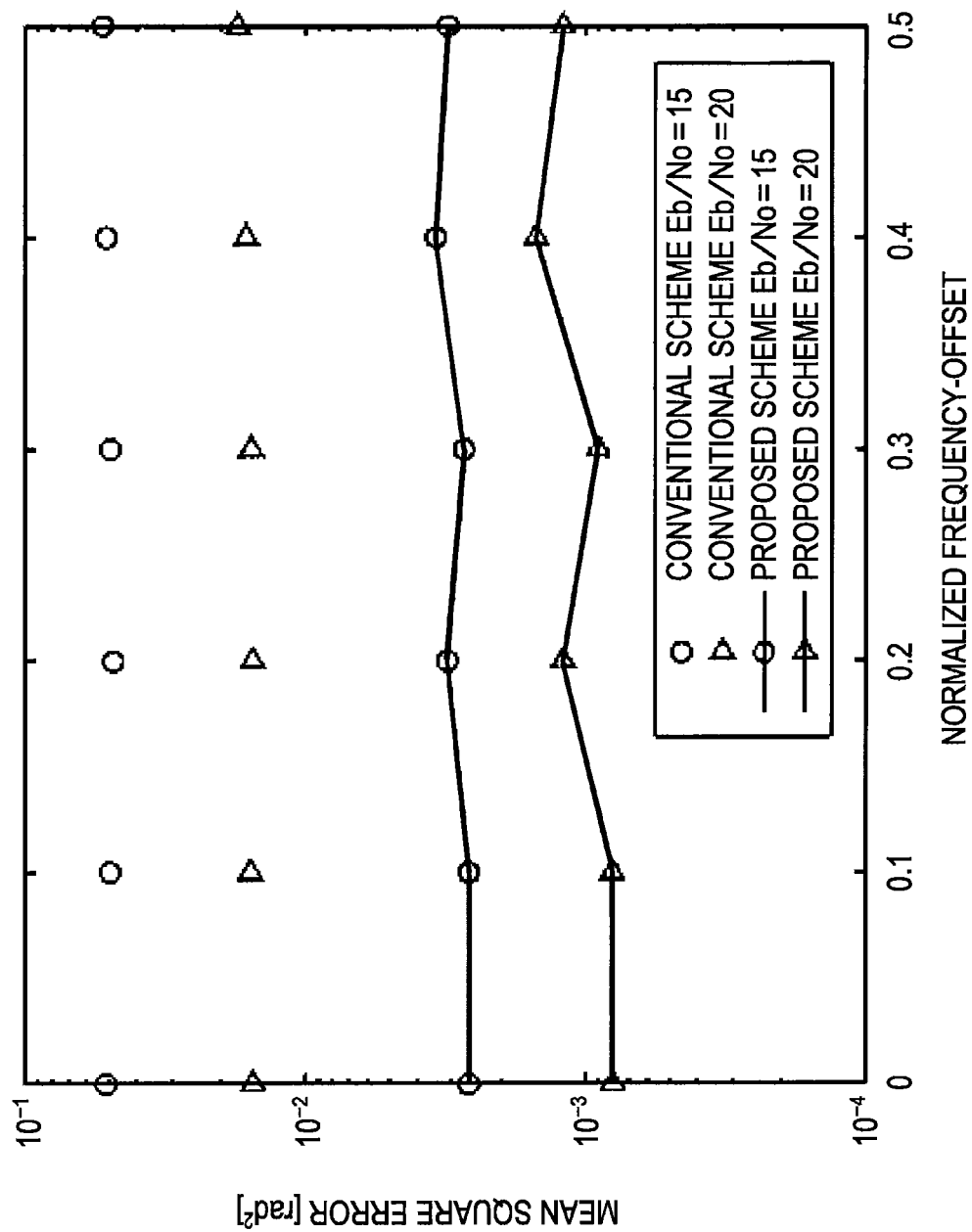
FIG. 29 is a diagram showing values of frequency-offset estimation accuracy (mean square error versus normalized frequency-offset values) using methods of the related art and the proposed methods.
Figure 30:
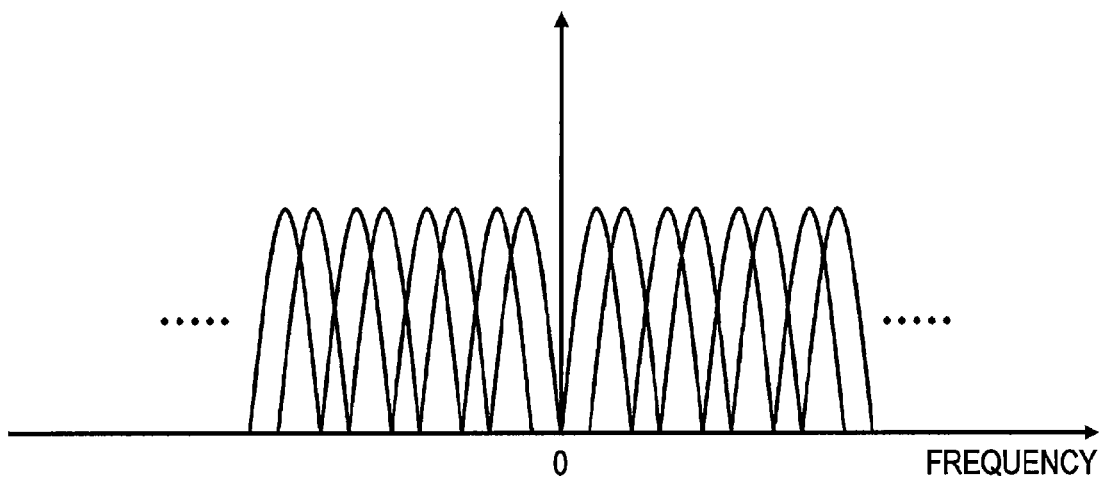
FIG. 30 is a diagram showing the subcarrier arrangement as specified in IEEE 802.11a/g.
Figure 31:
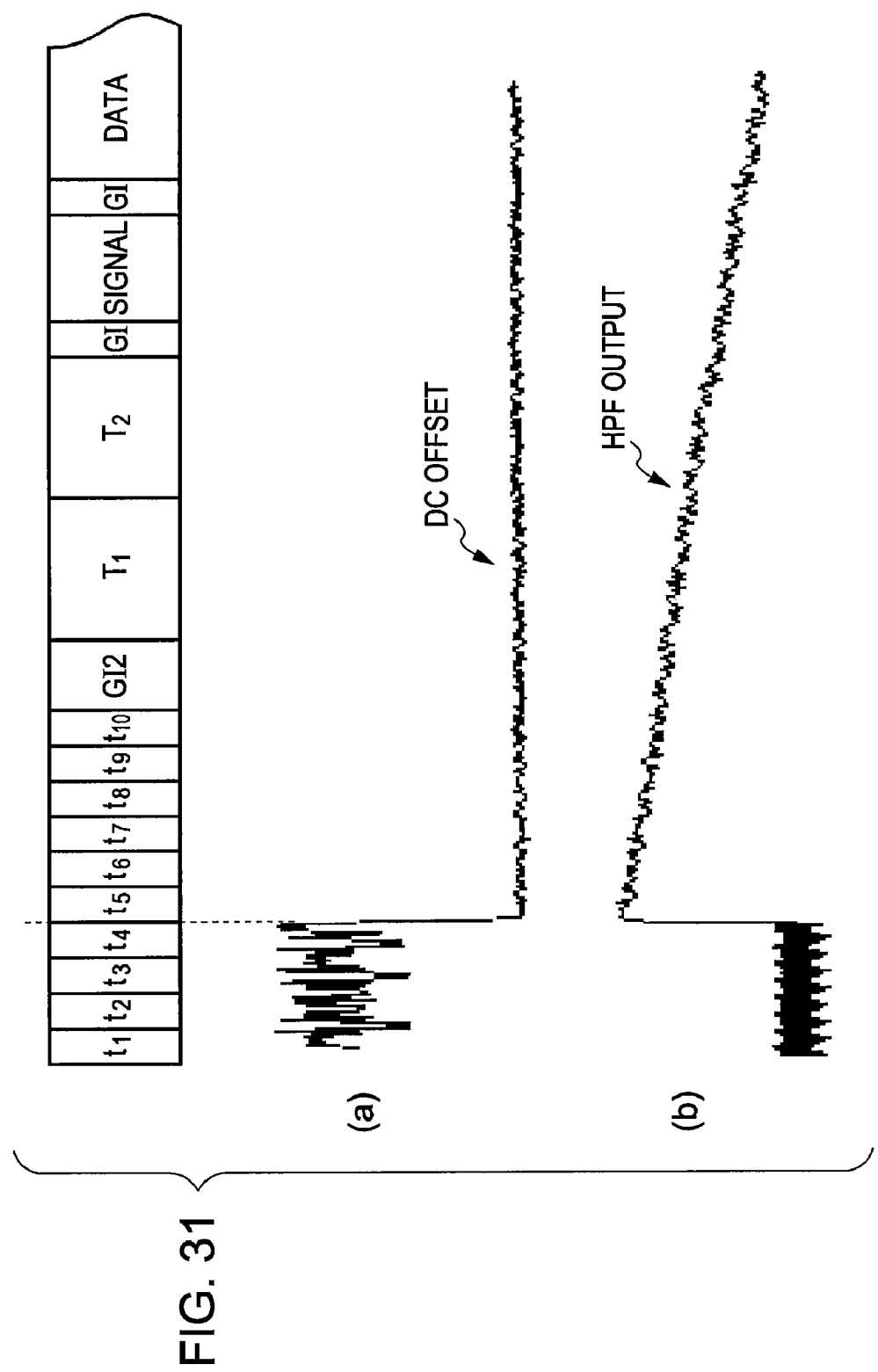
FIG. 31 is a diagram showing the influence of DC offsets on frequency offsets.

FIG. 29 shows values of frequency-offset estimation accuracy (the mean square error versus the normalized frequency-offset values) obtained using the first method in comparison with those obtained using the structure shown in FIG. 21.

In the receiver shown in FIG. 1, the differential filter 5 and the frequency-offset estimator 6 are configured in the manner shown in FIG. 25. Therefore, accurate frequency-offset estimation can be realized with simple signal processing in the presence of IQ imbalances and time-varying DC offsets.

Second Embodiment

The direct-conversion OFDM receiving apparatus according to the first embodiment uses a technique for accurately estimating a frequency offset with simple signal processing even in the presence of IQ imbalances and time-varying DC-offsets. The apparatus according to the first embodiment is intended to provide appropriate frequency-offset estimation, but is not intended to perform IQ-imbalance correction together with frequency-offset correction.

However, IQ-imbalance correction as well as simple frequency-offset correction basically falls within the scope. An OFDM receiving apparatus for correcting an IQ imbalance without departing from the scope will now be described.

Figure 33:
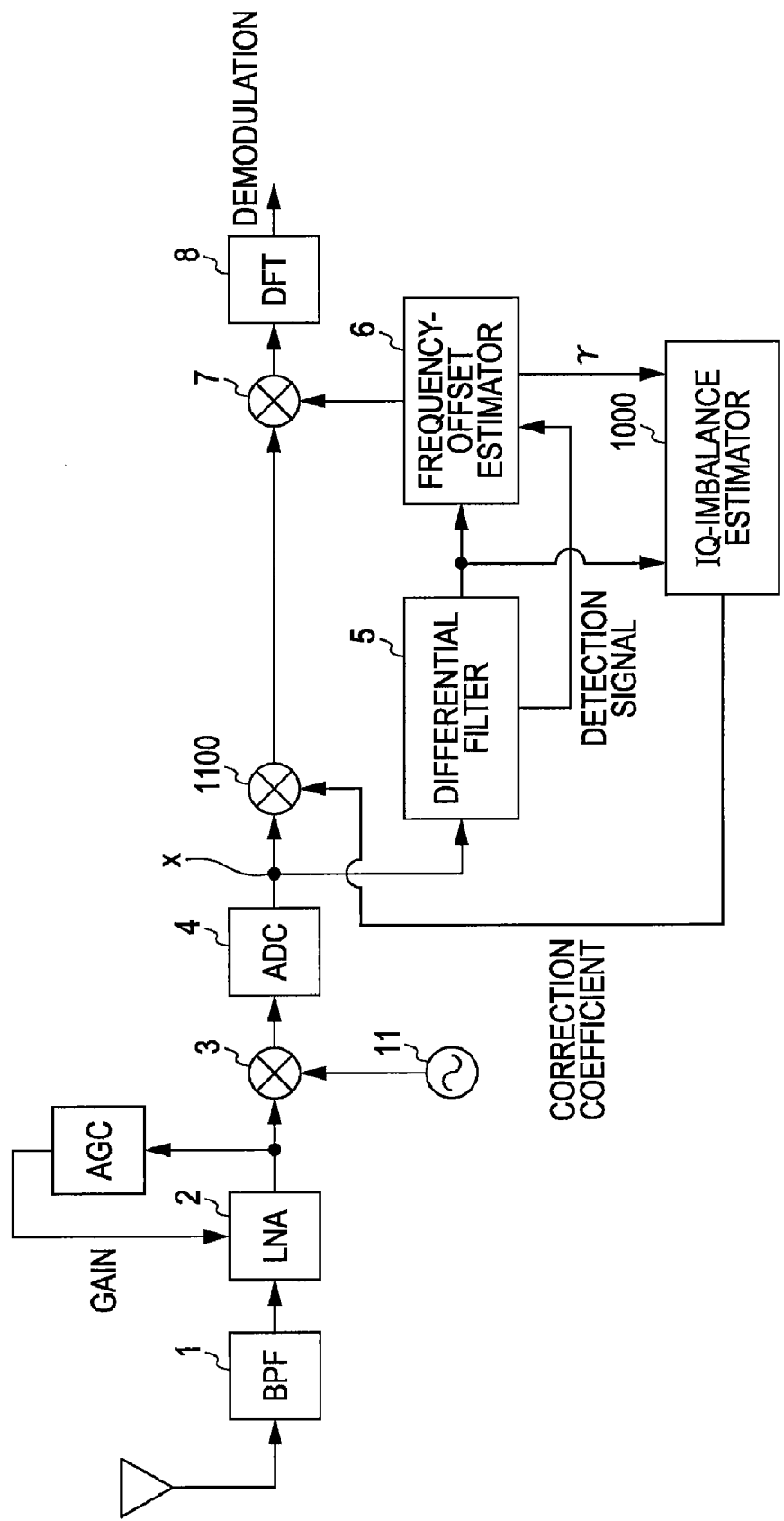
FIG. 33 is a diagram showing the structure of a receiver in a wireless communication apparatus according to another embodiment.
Figure 34:
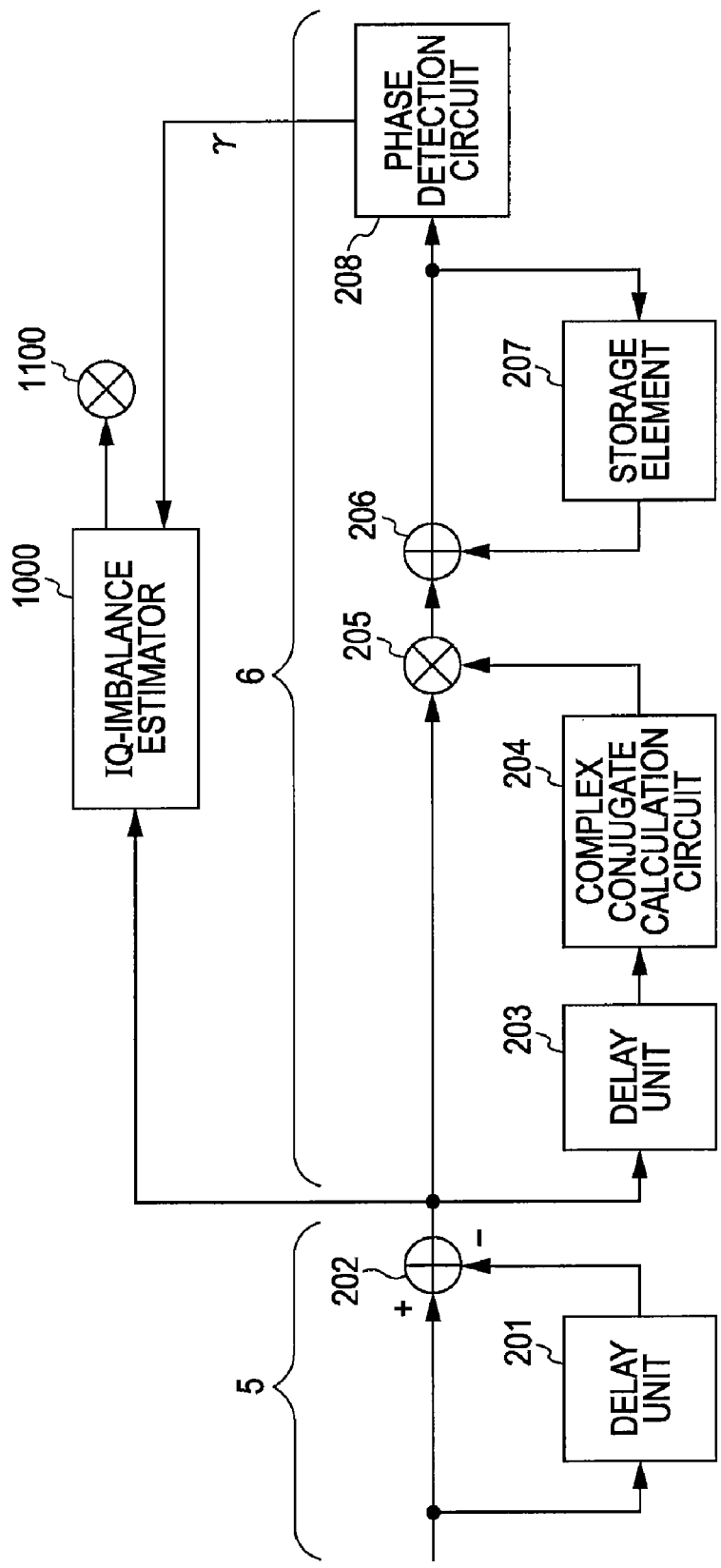
FIG. 34 is a diagram showing a specific example of the structure of a differential filter 5, a frequency-offset estimator 6, and an IQ-imbalance estimator 1000 in the receiver shown in FIG. 33.

FIGS. 33 and 34 show the structure of an OFDM receiving apparatus for achieving the above-described function according to a second embodiment. FIGS. 33 and 34 correspond to FIGS. 1 and 21, respectively, and similar components to those shown in FIGS. 1 and 21 are represented by the same reference numerals.

As shown in FIGS. 33 and 34, the OFDM receiving apparatus according to the second embodiment is configured such that an output signal from the differential filter 5 is input to the frequency-offset estimator 6 and an IQ-imbalance estimator 1000.

The output signal from the differential filter 5 is represented by equation (12) above, and a signal delayed by N/4 (=16) samples relative to the output signal is determined by the following equation:

$$d\left(i+\frac{N}{4}\right) = \phi\left(r\left(i+\frac{N}{4}\right) - r\left(i+\frac{N}{4}-1\right)\right) + \quad (16)$$
$$\psi^*\left(r\left(i+\frac{N}{4}\right) - r\left(i+\frac{N}{4}-1\right)\right)^*$$
$$= \phi(r(i) - r(i-1))\exp\left(j2\pi\Delta f\frac{N}{4}\right) +$$
$$\psi^*(r(i) - r(i+1))^*\exp\left(-j2\pi\Delta f\frac{N}{4}\right)$$
$$= \phi\eta\gamma + \psi^*\eta^*\gamma^{-1}$$

where $\eta = (r(i) - r(i-1))$ and $\gamma = \exp(j2\pi\Delta f(N/4))$.

A signal advanced by N/4 samples relative to the signal determined by equation (12) is represented by the following equation:

$$d\left(i-\frac{N}{4}\right) = \phi\left(r\left(i-\frac{N}{4}\right) - r\left(i-\frac{N}{4}-1\right)\right) + \quad (17)$$
$$\psi^*\left(r\left(i-\frac{N}{4}\right) - r\left(i-\frac{N}{4}-1\right)\right)^*$$
$$= \phi(r(i) - r(i-1))\exp\left(-j2\pi\Delta f\frac{N}{4}\right) +$$
$$\psi^*(r(i) - r(i+1))^*\exp\left(j2\pi\Delta f\frac{N}{4}\right)$$
$$= \phi\eta\gamma^{-1} + \psi^*\eta^*\gamma$$

In equations (16) and (17), the value $\gamma$ is obtained from equation (13) above, and is determined by the operation of the phase detection circuit 208 in the frequency-offset estimator 6. The value determined by the phase detection circuit 208 is fed back to the IQ-imbalance estimator 1000 to reduce the number of unknowns by one from equations (16) and (17), and equations (16) and (17) can be used as functions of the values d, $\phi$, and $\eta$. As a result, it is to be understood that three equations (i.e., equations (12), (16), and (17)) are obtained with respect to three unknown variables ($\phi$, $\eta$, and d) and the solution for all variables can be derived.

The three samples corresponding to each of equations (12), (16), and (17) are subjected to the operation given by equations (18) and (19) as follows:

$$\frac{d\left(i-\frac{N}{4}\right) - d(i)\gamma^{-1}}{\gamma - \gamma^{-1}} = \psi^*\eta^* \quad (18)$$

$$\frac{d\left(i+\frac{N}{4}\right) - d(i)\gamma}{\gamma - \gamma^{-1}} = \phi\eta \quad (19)$$

Therefore, a relation represented by equation (20) below can be obtained from equations (18) and (19):

$$\frac{\psi^*}{\phi^*} = \frac{d\left(i-\frac{N}{4}\right) - d(i)\gamma^{-1}}{\left(d(i)\gamma - d\left(i+\frac{N}{4}\right)\right)^*} = \varepsilon \quad (20)$$

Since the values φ and ψ are represented by the equations below from equation (11) above:

$$\phi = \cos\frac{\theta}{2} + j\alpha\sin\frac{\theta}{2}$$

$$\psi = \alpha\cos\frac{\theta}{2} + j\sin\frac{\theta}{2}$$

Therefore, by approximating the above equations, the values φ and η are represented by the following equations:

$$\phi = \cos\frac{\theta}{2} + j\alpha\sin\frac{\theta}{2} \approx 1 + j\alpha\frac{\theta}{2}$$

$$\psi = \alpha\cos\frac{\theta}{2} + j\sin\frac{\theta}{2} \approx \alpha + j\frac{\theta}{2}$$

In the above equations, as described above, α and θ denote:

(i) α=the amplitude value of the I component and Q component; and (ii) θ=the phase difference between the cosine signal and the sine signal.

An IQ imbalance occurs when the I component and Q component of a signal have the following two relations:

(a) A local signal input to the mixer 3 for frequency conversion (that is, an output signal of the local oscillator 11) is generated by dividing an output signal from a phase-locked loop (PLL) into two signals and one of the signals is passed to a 90° phase shifter. If the output signal from the PLL is a high-frequency signal, the phase shifter does not exactly have a phase shift of 90° (that is, the I component and Q component of the signal are not orthogonal to each other), resulting in occurrence of a phase difference θ.

(b) An amplitude difference occurs between the I component and the Q component at the input of the A/D converter due to the loss caused by the phase shifter, the gain error between the amplifiers for the I and Q components, or the like, and the value α is not 0.

From those relations, the values of α and θ are determined on the basis of the three samples d(i−N/4), d(i), and d(i+N/4), and the received complex baseband signal is corrected on the basis of the determined values α and θ to correct the IQ imbalance. In the OFDM receiving apparatus according to the second embodiment, the IQ-imbalance estimator 1000 determines the values α and θ (that is, the IQ-imbalance estimator 1000 estimates an IQ imbalance), and an IQ-imbalance corrector 1100 multiplies the received complex baseband signal by the correction coefficient corresponding to the determined values to implement IQ-imbalance correction.

A specific technique for determining the values α and θ using the IQ-imbalance estimator 1000 will be described. Substituting the approximate expressions of θ and ψ into equation (20) yields the following equation:

$$\varepsilon = (\varepsilon_I + j\varepsilon_Q) = \frac{\left(\alpha + j\frac{\theta}{2}\right)^*}{\left(1 + j\alpha\frac{\theta}{2}\right)^*} = \frac{\left(\alpha - j\frac{\theta}{2}\right)}{\left(1 - j\alpha\frac{\theta}{2}\right)} \quad (21)$$

Solving equation (21) for the real and imaginary parts yields the following equation:

$$\alpha = \varepsilon_I + \varepsilon_Q \alpha\frac{\theta}{2} \quad (22)$$

$$\frac{\theta}{2} = -\varepsilon_Q + \varepsilon_I \alpha\frac{\theta}{2} \quad (23)$$

From equations (22) and (23), the values α and θ are determined as satisfying the following relations:

$$\varepsilon_I \alpha^2 + (-\varepsilon_I^2 - \varepsilon_Q^2 - 1)\alpha + \varepsilon_I = 0 \quad (24)$$

$$\alpha = \frac{-(-\varepsilon_I^2 - \varepsilon_Q^2 - 1) - \sqrt{(-\varepsilon_I^2 - \varepsilon_Q^2 - 1)^2 - 4\varepsilon_I^2}}{2\varepsilon_I}$$

$$\theta = 2\left(\frac{-\varepsilon_Q}{1 - \varepsilon_I \alpha}\right) \quad (25)$$

where ε is determined by equation (20), and the variable d in equation (20) is obtained as an output signal from the differential filter 5. Since the value γ is determined by the phase detection circuit 208, it is to be understood that the value ε is determined from the output signal from the differential filter 5 (i.e., the value d) and the signal fed back from the phase detection circuit 208 (i.e., the value γ) and the values α and θ are therefore determined.

In the second embodiment, the IQ-imbalance estimator 1000 performs the above operations to determine the values α and θ, and outputs the correction coefficient corresponding to the determined values to the IQ-imbalance corrector 1100. As a result, the received complex baseband signal is multiplied by the correction coefficient using the IQ-imbalance corrector 1100, and the IQ imbalance caused in the received complex baseband signal is corrected.

The IQ-imbalance corrector 1100 may be disposed at any position between the ADC 4 and the DFT 8. It is experimentally found that the IQ-imbalance corrector 1100 disposed upstream the frequency-offset corrector 7 provides improved reception characteristics. Further, it is experimentally demonstrated that when IQ-imbalance correction is performed upstream relative to a branch point x toward the differential filter 5 and the corrected signal is branched to the differential filter 5, the reception characteristics are improved compared with when IQ-imbalance correction is performed downstream relative to the branch point x. From this viewpoint, although the OFDM receiving apparatus according to the second embodiment is configured such that the IQ-imbalance corrector 1100 is disposed between the ADC 4 and the branch point x (see FIG. 33), desired advantages can be achieved if the position of the IQ-imbalance corrector 1100 is changed. Therefore, the present invention can be established regardless of the position of the IQ-imbalance corrector 1100.

Any method can be used to determine a correction coefficient based on the values α and θ. For example, the IQ-imbalance estimator 1000 may experimentally determine a correction coefficient corresponding to the determined values α and θ, and a table having the correspondence between the experimental value and the values α and θ may be stored in the IQ-imbalance estimator 1000. Alternatively, a correction coefficient can directly be determined from the values α and θ. In this case, the following methods can be used. That is, the received complex baseband signal is determined by the equation below according to equation (11) above:

$$\hat{r}(i) = \hat{r}_I(i) + j\hat{r}_Q(i)$$
$$= \left(\cos\frac{\theta}{2} + j\alpha\sin\frac{\theta}{2}\right)(r_I(i) + jr_Q(i)) + \left(\alpha\cos\frac{\theta}{2} - j\sin\frac{\theta}{2}\right)(r_I(i) - jr_Q(i))$$
$$= \left(\cos\frac{\theta}{2} + \alpha\cos\frac{\theta}{2}\right)r_I(i) + \left(-\sin\frac{\theta}{2} - \alpha\sin\frac{\theta}{2}\right)r_Q(i) +$$
$$j\left(-\sin\frac{\theta}{2} + \alpha\sin\frac{\theta}{2}\right)r_I(i) + j\left(\cos\frac{\theta}{2} - \alpha\cos\frac{\theta}{2}\right)r_Q(i)$$

Therefore, a correction coefficient satisfying the expressions below is determined, and the received complex baseband signal is multiplied by the determined correction coefficient to correct the IQ imbalance:

$$\begin{pmatrix}\hat{r}_I(i)\\\hat{r}_Q(i)\end{pmatrix} = \begin{pmatrix}\cos\frac{\theta}{2} + \alpha\cos\frac{\theta}{2} & -\sin\frac{\theta}{2} - \alpha\sin\frac{\theta}{2}\\ -\sin\frac{\theta}{2} + \alpha\sin\frac{\theta}{2} & \cos\frac{\theta}{2} - \alpha\cos\frac{\theta}{2}\end{pmatrix}\begin{pmatrix}r_I(i)\\r_Q(i)\end{pmatrix} \quad (26)$$

$$\begin{pmatrix}r_I(i)\\r_Q(i)\end{pmatrix} = \begin{pmatrix}\cos\frac{\theta}{2} + \alpha\cos\frac{\theta}{2} & -\sin\frac{\theta}{2} - \alpha\sin\frac{\theta}{2}\\ -\sin\frac{\theta}{2} + \alpha\sin\frac{\theta}{2} & \cos\frac{\theta}{2} - \alpha\cos\frac{\theta}{2}\end{pmatrix}^{-1}\begin{pmatrix}\hat{r}_I(i)\\\hat{r}_Q(i)\end{pmatrix}$$

The structure and operation of the other components are similar to those of the first embodiment.

In the OFDM receiving apparatus according to the second embodiment, therefore, the IQ-imbalance estimator 1000 determines a correction coefficient on the basis of the received complex baseband signal from the differential filter 5, and the IQ-imbalance corrector 1100 multiplies the received complex baseband signal by the determined correction coefficient to correct the IQ imbalance included in the received complex baseband signal.

Figure 35:
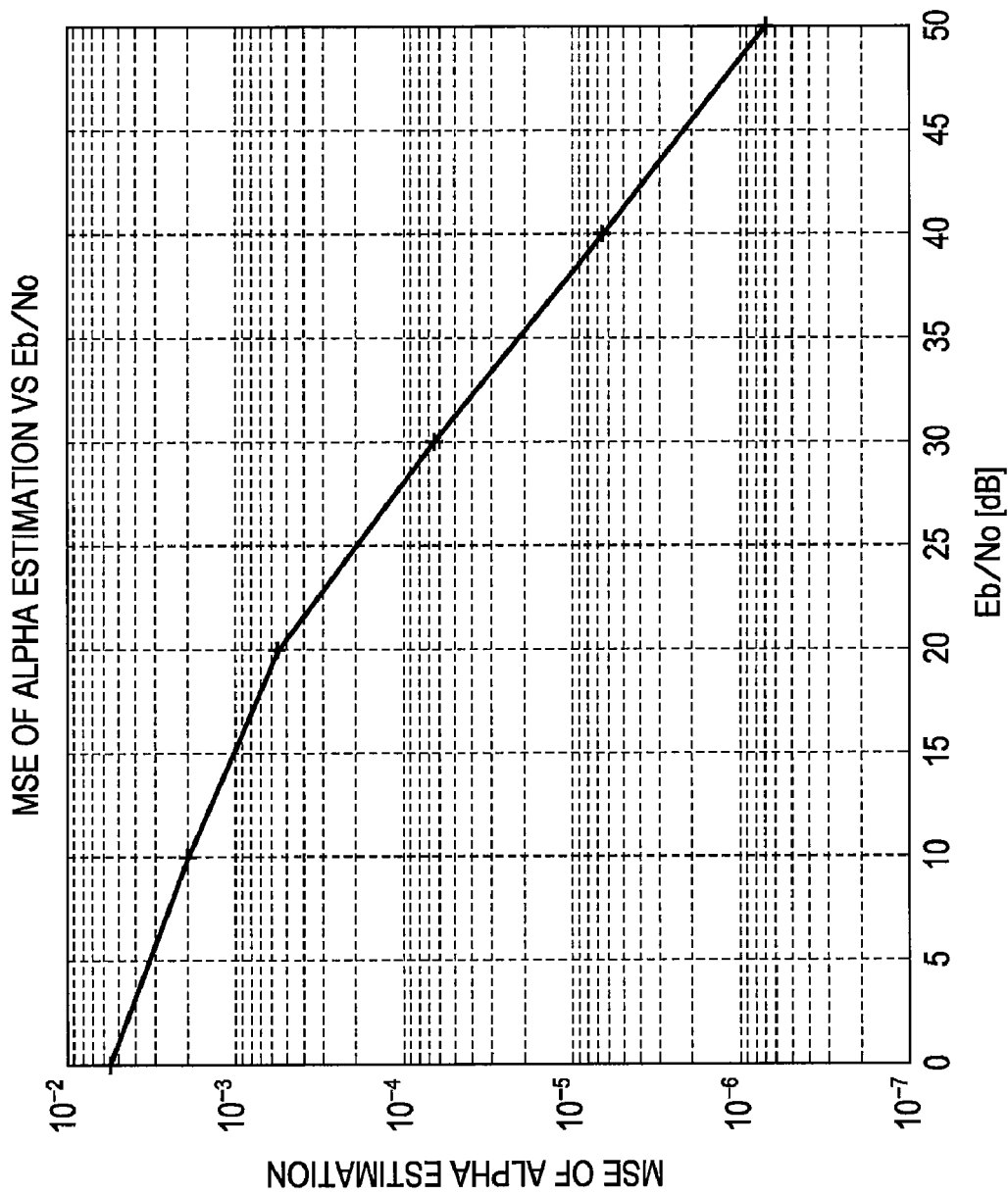
FIG. 35 is a diagram showing the MSE in estimation of $\alpha$ in an environment where the gain of an LNA has not been changed, where $\alpha=0.05$ and $\theta=5°$.
Figure 36:
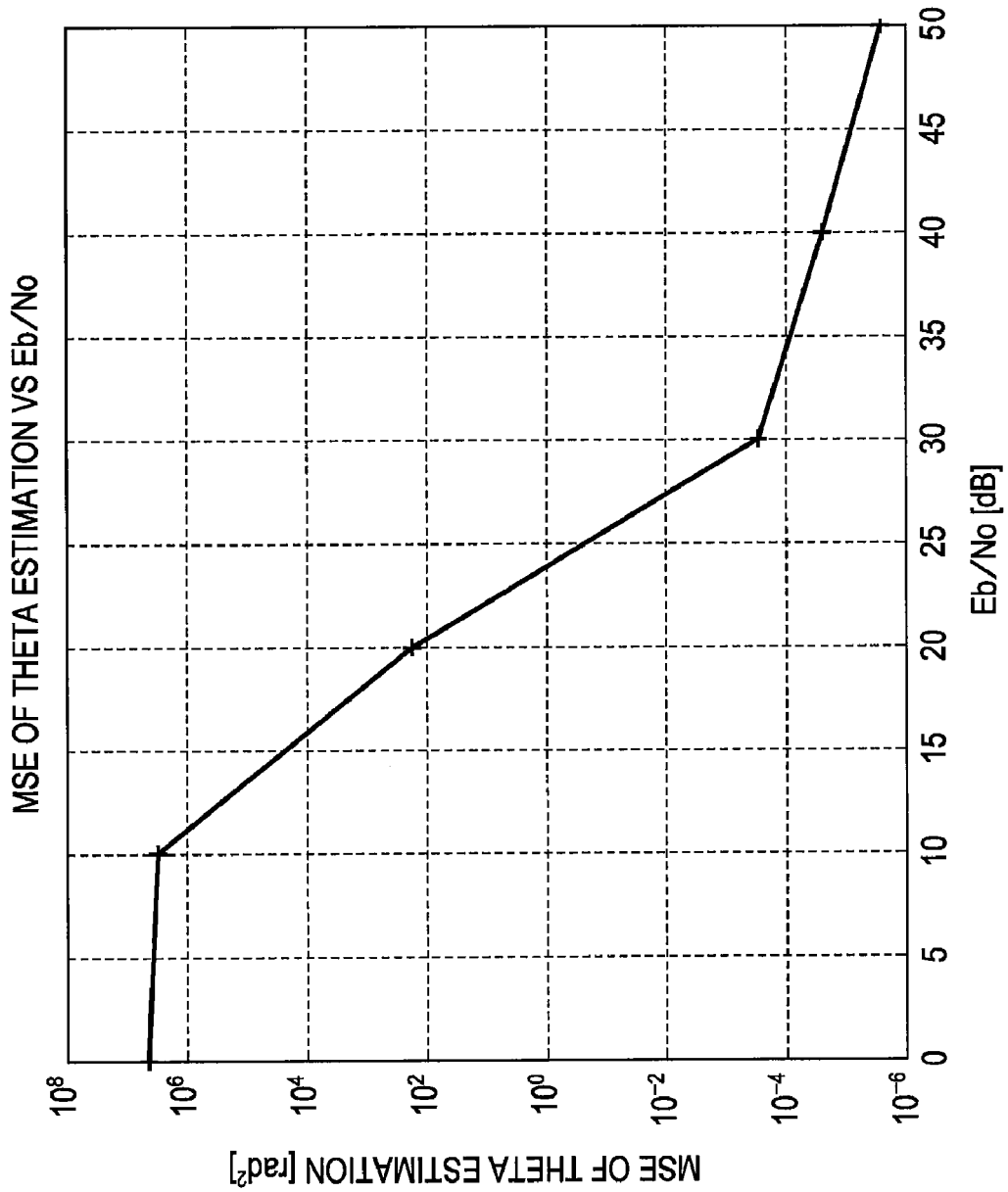
FIG. 36 is a diagram showing the MSE in estimation of $\theta$ in an environment where the gain of the LNA has not been changed, where $\alpha=0.05$ and $\theta=5°$.

With the use of this method, the OFDM receiving apparatus achieves the desired MSE characteristics shown in FIGS. 35 and 36. The experimental values shown in FIGS. 35 and 36 represent the MSE obtained when $\alpha=0.05$ and $\theta=5°$ in an environment where the gain of the LNA 2 has not been changed. FIG. 35 shows the MSE in estimation of the value $\alpha$, and FIG. 36 shows the MSE in estimation of the value $\theta$.

While the IQ-imbalance correction method used for the structure shown in FIGS. 1 and 21 of the first embodiment has been described, IQ-imbalance correction can also be implemented in other apparatus arrangements. Other examples of the structure of the differential filter 5 and the frequency-offset estimator 6 will now be described.

Figure 37:
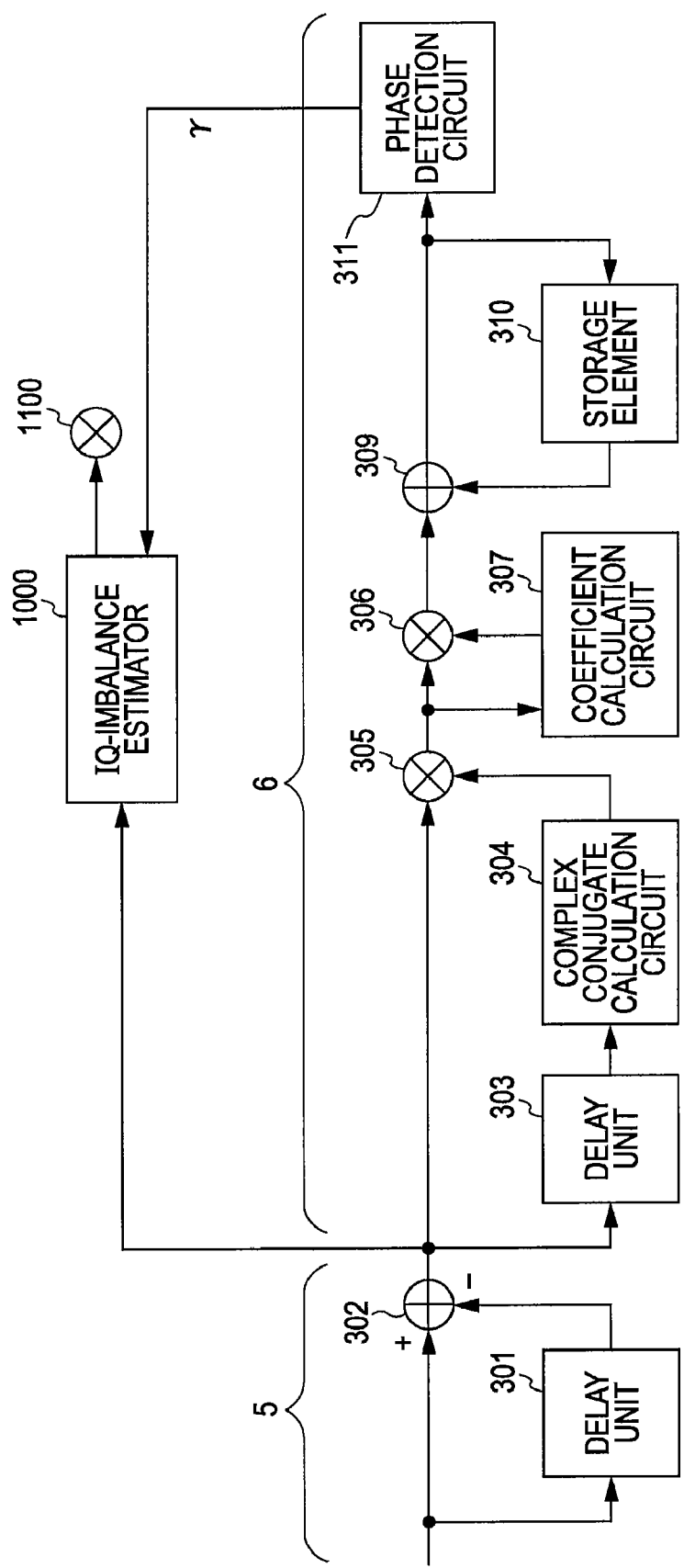
FIG. 37 is a diagram showing a specific example of the structure of the differential filter 5, the frequency-offset estimator 6, and the IQ-imbalance estimator 1000.

FIG. 37 shows another example of the structure of the differential filter 5 and the frequency-offset estimator 6. In the structure shown in FIG. 37, the IQ-imbalance estimator 1000 is added to the structure of the differential filter 5 and the frequency-offset estimator 6 shown in FIG. 25. In FIG. 37, similar components to those shown in FIG. 25 are represented by the same reference numerals.

As shown in FIG. 37, according to the second embodiment, as in the structure shown in FIG. 34, an output signal from the differential filter 5 (that is, the delay unit 301 and the adder 302) is input to the IQ-imbalance estimator 1000, and the signal from the phase detection circuit 311 corresponding to the value $\gamma$ is fed back to the IQ-imbalance estimator 1000. The IQ-imbalance estimator 1000 performs the operations given by equations (16) to (25) on the basis of the input signals, and determines an IQ-imbalance correction coefficient. The IQ-imbalance corrector 1100 multiplies the received complex baseband signal by the determined correction coefficient to correct the IQ imbalance caused in the received complex baseband signal. The operation of the other components is similar to that shown in FIG. 25, and a detailed description thereof is thus omitted.

Modifications of Second Embodiment

First Modification

Figure 38:
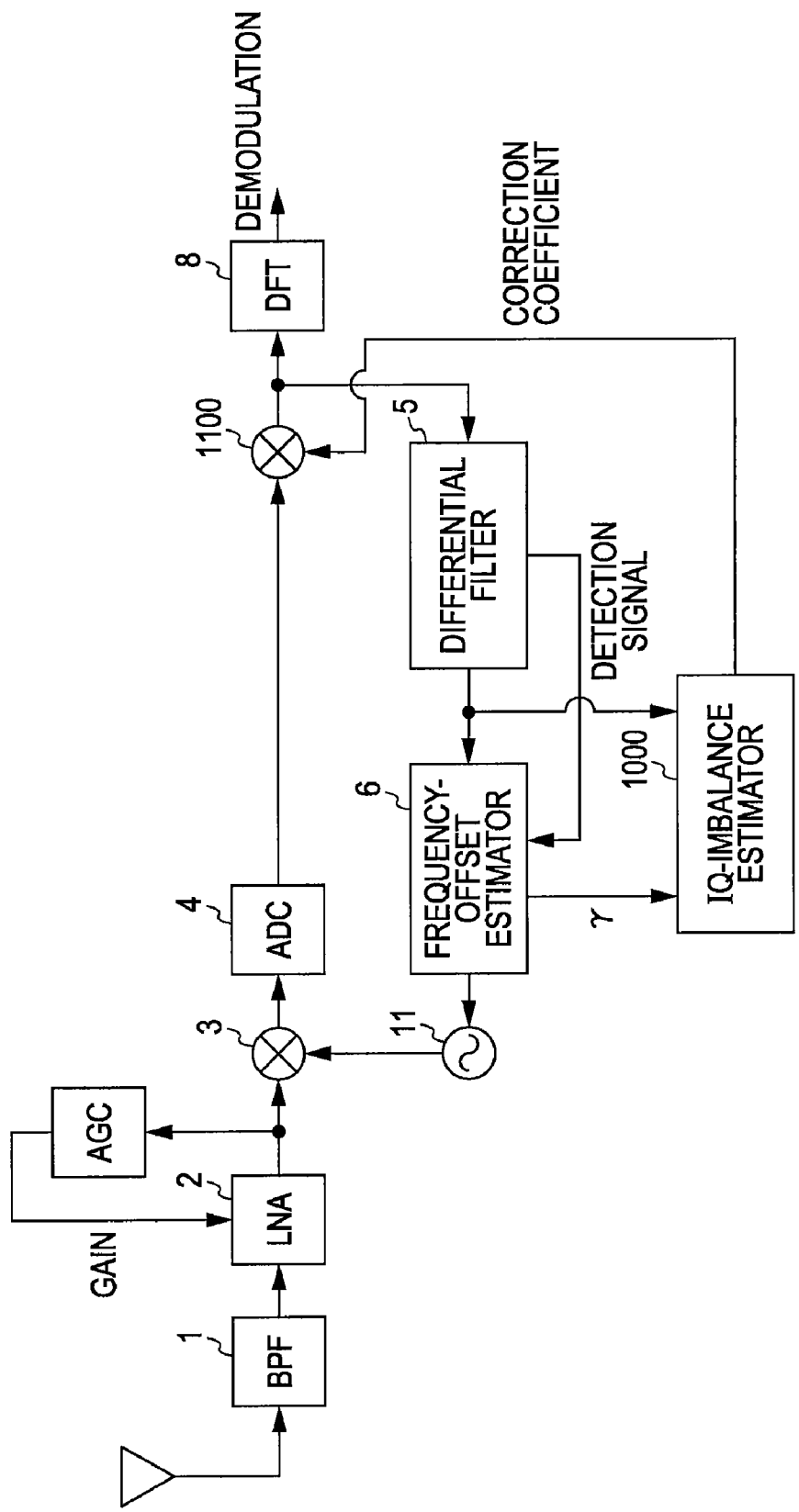
FIG. 38 is a diagram showing an example of the structure of another receiver in the wireless communication apparatus.
Figure 39:
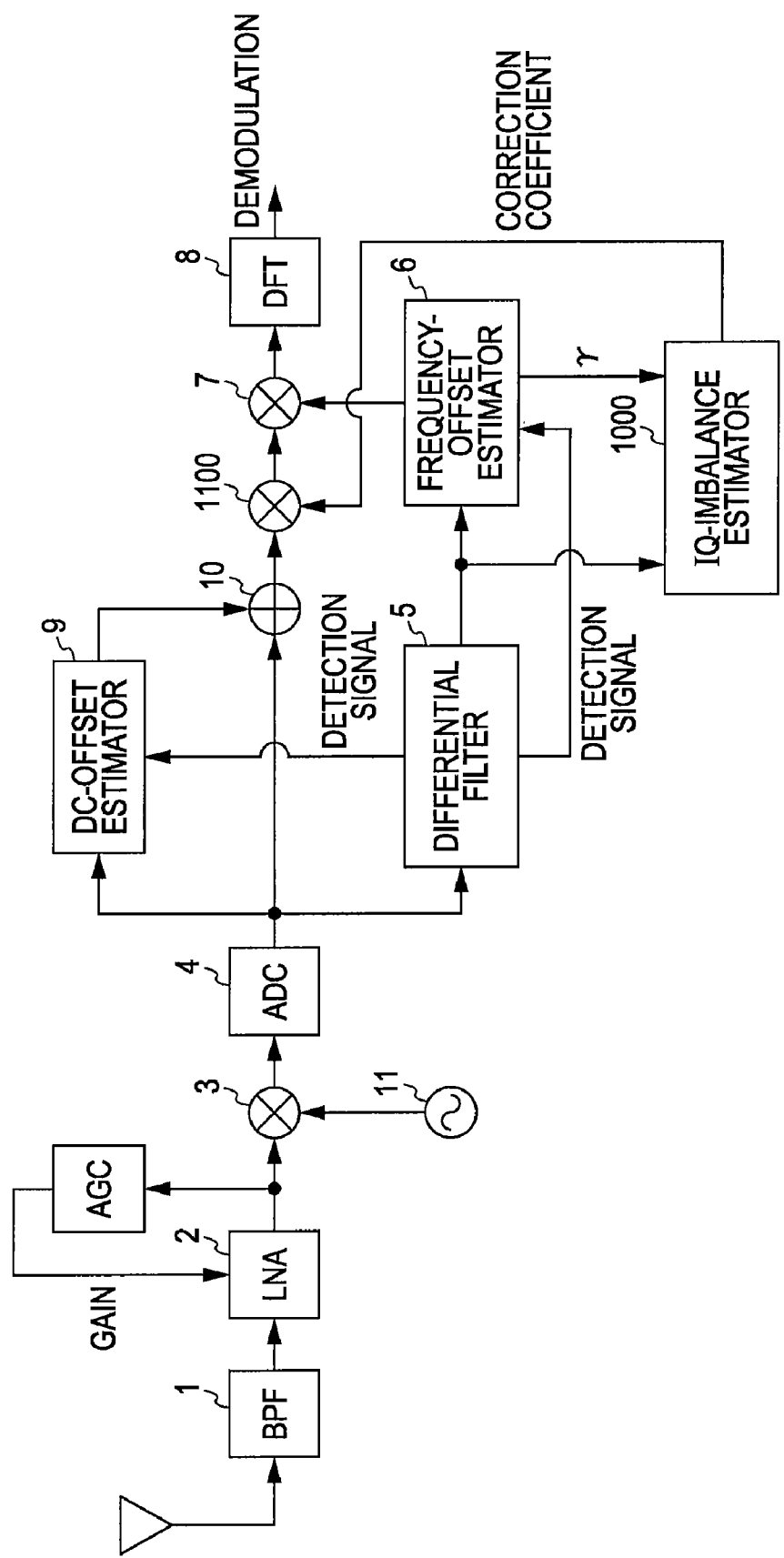
FIG. 39 is a diagram showing an example of the structure of another receiver in the wireless communication apparatus.
Figure 40:
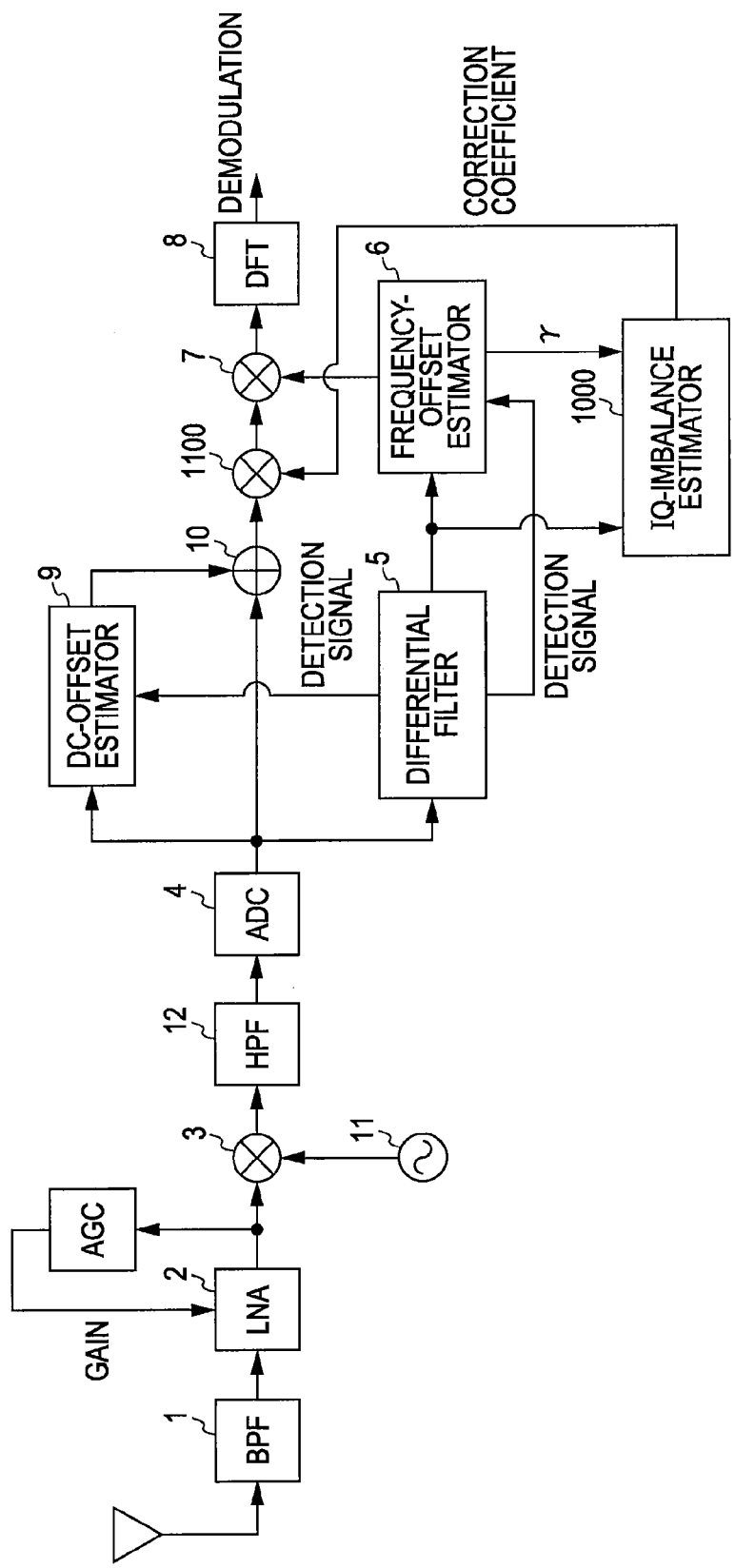
FIG. 40 is a diagram showing an example of the structure of another receiver in the wireless communication apparatus.
Figure 41:
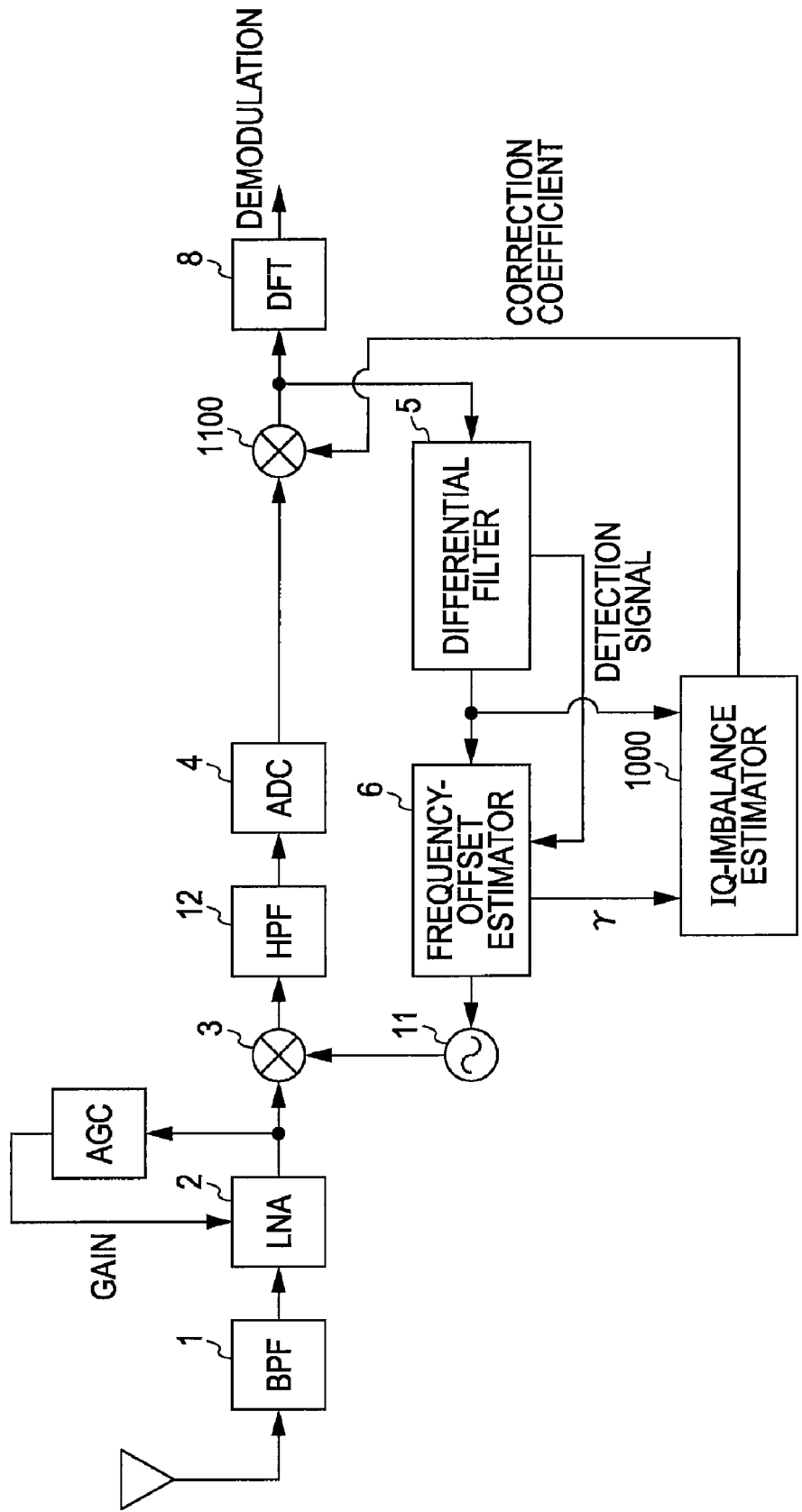
FIG. 41 is a diagram showing an example of the structure of another receiver in the wireless communication apparatus.

As shown in FIGS. 38 to 41, various modifications can be made to the OFDM receiving apparatus shown in FIG. 33. FIG. 38 shows an OFDM receiving apparatus configured such that a structure for IQ-imbalance correction is added to the OFDM receiving apparatus shown in FIG. 4. FIGS. 39, 40, and 41 show OFDM receiving apparatuses configured such that a structure for IQ-imbalance correction is added to the OFDM receiving apparatuses shown in FIGS. 5, 6, and 7, respectively.

In any of the structures shown in FIGS. 38 to 41, (i) an output signal from the differential filter 5 (see FIG. 34) is input to the IQ-imbalance estimator 1000, and (ii) the signal corresponding to the value y is fed back to the IQ-imbalance estimator 1000 from the phase detection circuit 208. The IQ-imbalance estimator 1000 performs the operations given by equations (16) to (25) on the basis of the input signals to determine a correction coefficient. The IQ-imbalance corrector 1100 corrects the IQ imbalance caused in the received complex baseband signal on the basis of the correction coefficient. Since the structure for IQ-imbalance correction is added to the OFDM receiving apparatuses shown in FIG. 4, the other structure and operation of the OFDM receiving apparatuses shown in FIGS. 38, 39, 40, and 41 are similar to those in the OFDM receiving apparatuses shown in FIGS. 4, 5, 6, and 7, respectively.

As described above, in any of the structures shown in FIGS. 38 to 41, the IQ-imbalance corrector 1100 may be disposed at any position between the ADC 4 and the DFT 8. In the structures shown in FIGS. 38 to 41, however, the following methods are used to improve the reception characteristics.

In the OFDM receiving apparatuses shown in FIGS. 38 and 41, the IQ-imbalance corrector 1100 is disposed between the ADC 4 and the branch point toward the differential filter 5 so that the signal subjected to IQ-imbalance correction can be input to the differential filter 5.

In the OFDM receiving apparatuses shown in FIGS. 39 and 40, for the following two reasons, the output signal from the DC-offset corrector 10 is subjected to IQ-imbalance correction followed by frequency-offset correction.

The first reason is that when IQ-imbalance correction is performed after DC-offset correction is performed, the reception characteristics are improved compared with when IQ-imbalance correction is performed before DC-offset correction is performed.

The second reason is that when frequency-offset correction is performed after IQ-imbalance correction is performed, the reception characteristics are improved compared with when frequency-offset correction is performed before IQ-imbalance correction is performed.

Figure 42:
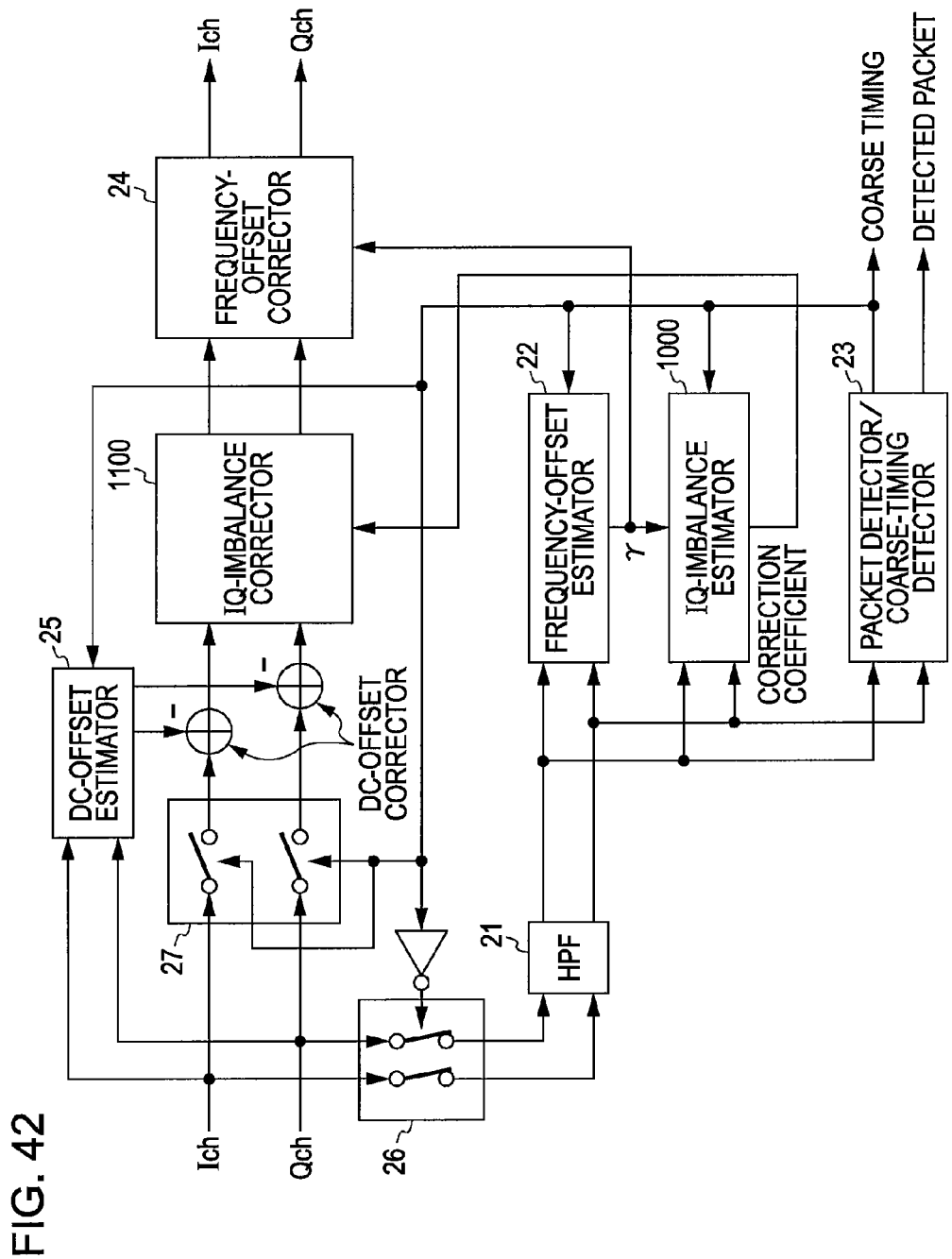
FIG. 42 is diagram showing an example of the structure of a peripheral synchronous circuit that performs frequency-offset estimation and correction, packet detection, and coarse timing detection using an output of a high-pass filter.
Figure 43:
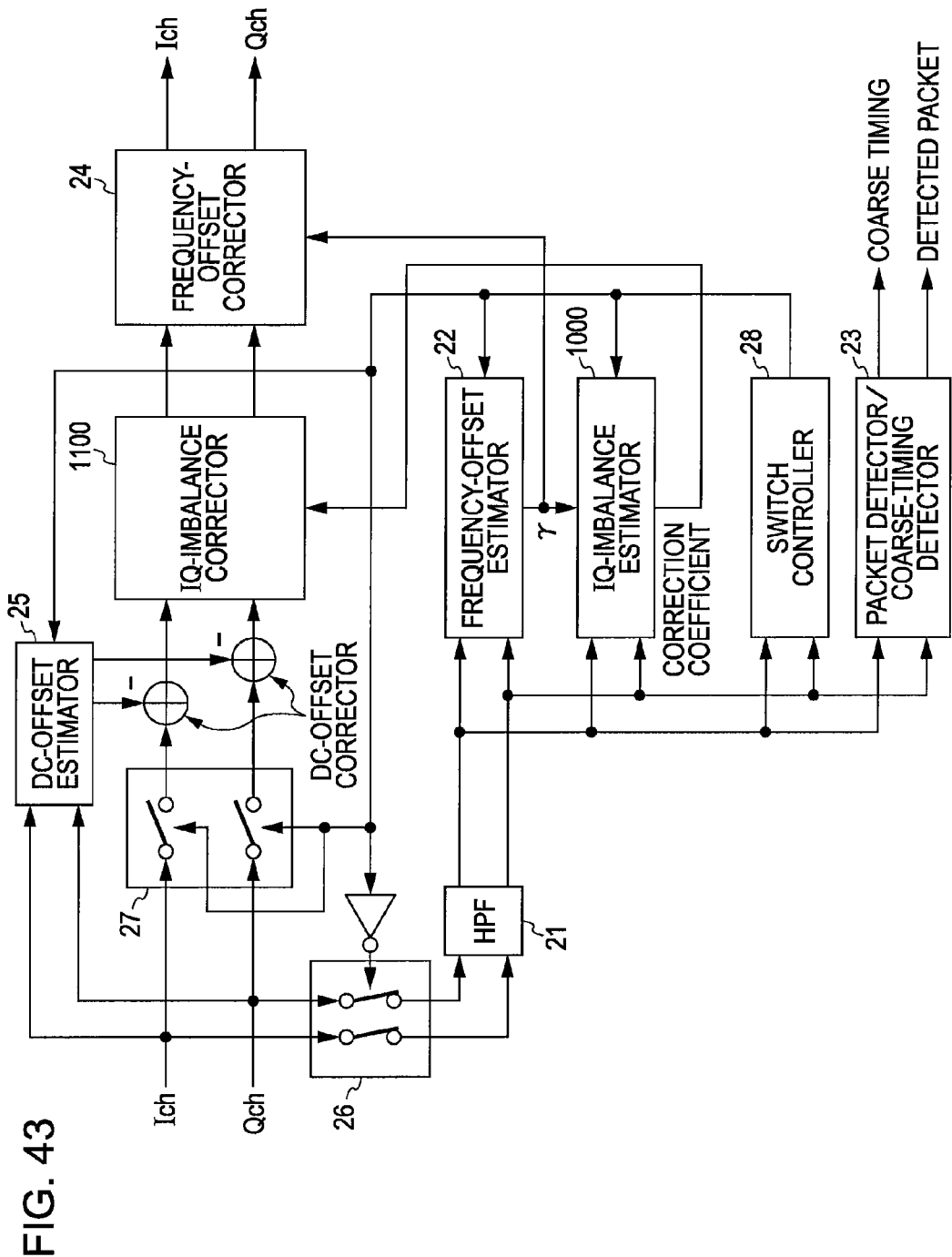
FIG. 43 is diagram showing an example of the structure of another peripheral synchronous circuit that performs frequency-offset estimation and correction, packet detection, and coarse timing detection using an output of the high-pass filter.

The synchronous circuits shown in FIGS. 8 and 9 can also be modified so as to add a structure for IQ-imbalance correction. FIGS. 42 and 43 show the circuit structure of synchronous circuits configured such that the structure for IQ-imbalance correction is added to the synchronous circuits shown in FIGS. 8 and 9, respectively. In FIGS. 42 and 43, components performing the same function and operation as those of the components shown in FIGS. 8 and 9 are represented by the same reference numerals as those shown in FIGS. 8 and 9. The synchronous circuits shown in FIGS. 42 and 43 will now be described.

In the synchronous circuit shown in FIG. 42, the IQ-imbalance corrector 1100 is disposed between the DC-offset corrector and the frequency-offset corrector 24. An output signal from the HPF 21 is input to the frequency-offset estimator 22 and the packet detector and coarse-timing detector 23 and is also input to the IQ-imbalance estimator 1000. As in the OFDM receiving apparatus shown in FIG. 33, the signal corresponding to the value y from the frequency-offset estimator 22 is input to the IQ-imbalance estimator 1000, and the IQ-imbalance estimator 1000 performs the operations given by equations (16) to (25) on the basis of the input signals to determine a correction coefficient. The determined correction coefficient is supplied from the IQ-imbalance estimator 1000 to the IQ-imbalance corrector 1100 to perform IQ-imbalance correction on the received complex baseband signal on the basis of the correction coefficient.

As described above, the synchronous circuit shown in FIG. 8 corresponding to FIG. 42 includes the paths directed to the high-pass filter 21 and the DC-offset estimator 25 for each of the I-axis and Q-axis input signals, and the two switches 26 and 27 are exclusively turned on or off to switch between the paths. In the state where, of those paths, the path directed to the HPF 21 is active, the IQ-imbalance estimator 1000 determines a correction coefficient. The other structure (such as the switching control of the switches 26 and 27) is similar to that in the synchronous circuit shown in FIG. 8, and a detailed description thereof is thus omitted.

The synchronous circuit shown in FIG. 43 will now be described. In the synchronous circuit shown in FIG. 43, the switches 26 and 27 are not directly switched in response to a detection signal of the packet detector and coarse-timing detector 23, but a switch controller 28 is further provided. Also in this structure, the IQ-imbalance corrector 1100 is disposed between the DC-offset correctors and the frequency-offset corrector 24, and IQ-imbalance correction is performed on the received complex baseband signal.

Figure 44:
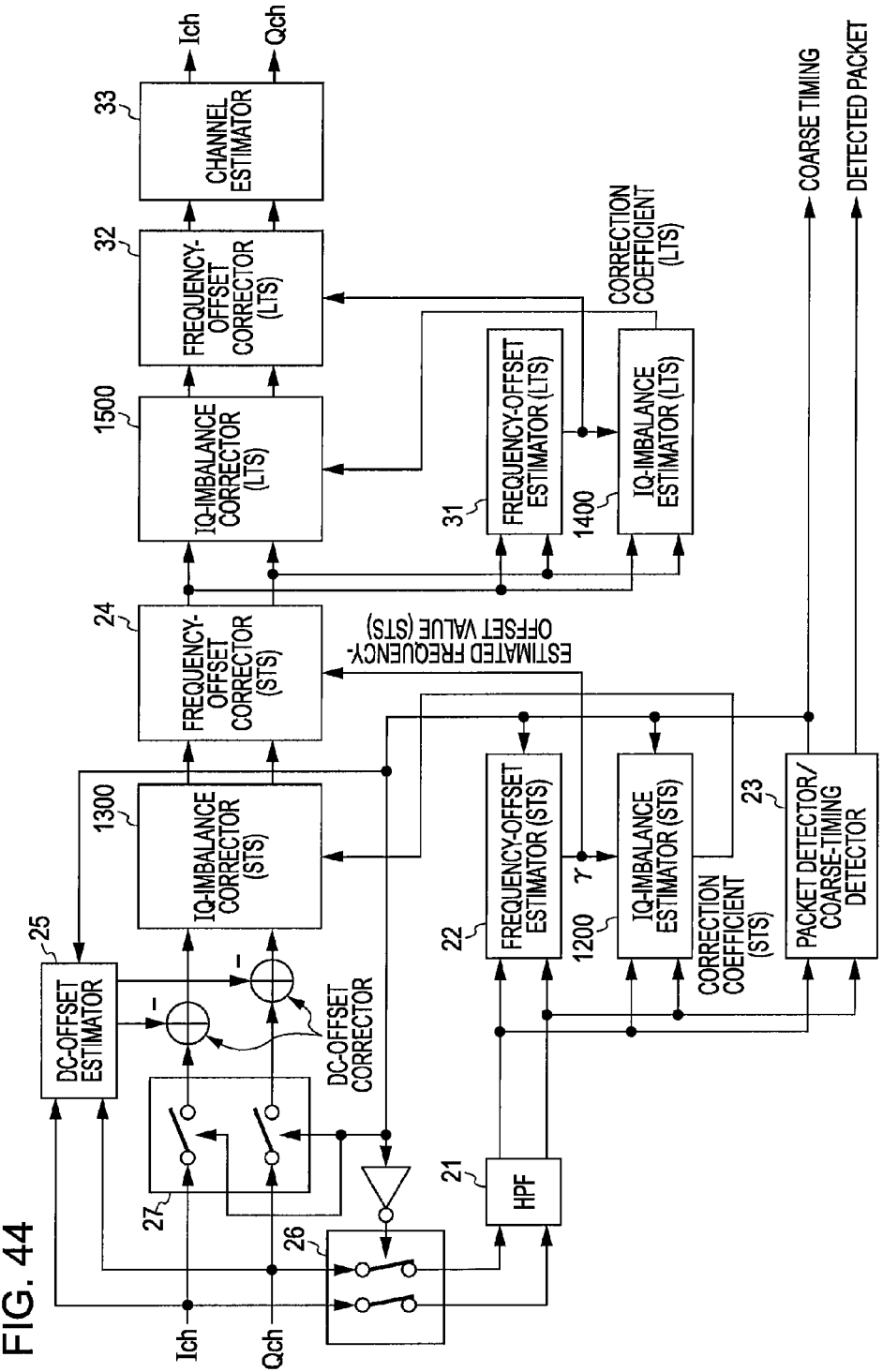
FIG. 44 is a diagram showing an example of the structure of a peripheral synchronous circuit including a circuit module that performs frequency-offset correction, IQ-imbalance correction, and channel estimation in the LTS.
Figure 45:
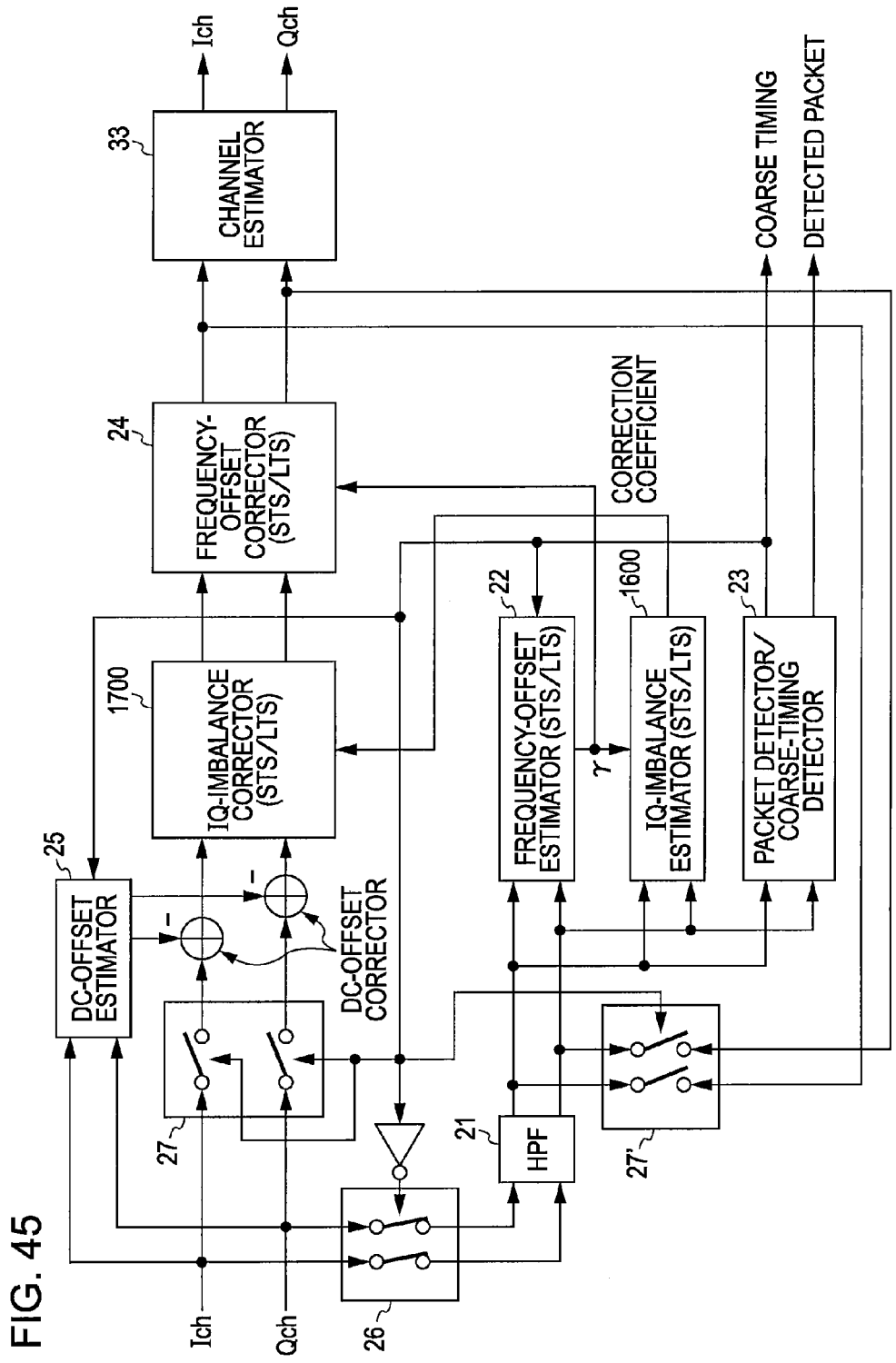
FIG. 45 is a diagram showing an example of the structure of a peripheral synchronous circuit including a circuit module that performs frequency-offset correction, IQ-imbalance correction, and channel estimation in the LTS.

Instead of, as shown in FIGS. 42 and 43, performing DC-offset correction, IQ-imbalance correction, and frequency-offset correction using only the STS, a function for achieving more accurate frequency-offset correction using the LTS can be realized. FIGS. 44 and 45 show the circuit structure of peripheral synchronous circuits for implementing this function. FIGS. 44 and 45 are diagrams showing the structure of the synchronous circuits configured such that a structure for IQ-imbalance correction is added to the synchronous circuits shown in FIGS. 13 and 14, respectively, and the components performing the same function and operation as those of the components shown in FIGS. 13 and 14 are represented by the same reference numerals as those shown in FIGS. 13 and 14.

In the synchronous circuit shown in FIG. 44, an IQ-imbalance estimator 1400 and IQ-imbalance corrector 1500 for the LTS are disposed separately from an IQ-imbalance estimator 1200 and IQ-imbalance corrector 1300 for the STS. The IQ-imbalance estimator 1200 for the STS determines a correction coefficient for performing coarse IQ-imbalance correction using the short preambles. The IQ-imbalance estimator 1400 for the LTS determines a correction coefficient for performing fine IQ-imbalance correction using the long preambles $T_1$ and $T_2$.

As described above, the IQ input terminals are switched from the path directed to the high-pass filter 21 to the path directed to the DC-offset correctors at the end of the short preamble period. After the LTS, the IQ-imbalance corrector 1300 performs IQ-imbalance correction by multiplying the received complex baseband signal by the correction coefficient determined until the end of the STS. Thereafter, the IQ-imbalance corrector 1500 corrects the secondary (residual) IQ imbalance using the LTS.

In the circuit structure shown in FIG. 44, a circuit module that performs IQ-imbalance correction on the portion of the received complex baseband signal subsequent to the LTS is separately disposed. Alternatively, as shown in FIG. 45, an IQ-imbalance estimator 1600 and an IQ-imbalance corrector 1700 may perform IQ-imbalance correction using the STS, and may also perform IQ-imbalance correction using the LTS.

The present invention has been described in detail with reference to specific embodiments thereof. However, it is to be understood that various modifications and alterations may be made to the embodiments by a person skilled in the art without departing from the scope.

While the embodiments have been described herein in the context of a wireless communication system complying with the IEEE 802.11 standard, the scope is not limited thereto. A receiver according to an embodiment can also be used in a wireless communication system in which the same OFDM symbol is repeatedly transmitted in the preamble portion, wherein DC subcarriers are set to null signals, to achieve accurate frequency-offset estimation. Applications to not only wireless LANs but also various digital communication technologies based on the OFDM transmission scheme, such as terrestrial digital broadcasting systems, fourth-generation mobile communication systems, and power line carrier communication systems may also fall within the scope.

Although a problem of DC offset caused in direct-conversion receivers can be overcome by an embodiment, the scope is not limited thereto. Receivers for down-converting RF received signals using other frequency conversion methods can be used to address both DC-offset and frequency-offset problems.

It is to be understood that the present invention is disclosed in the form of exemplary embodiments, and the disclosure in this specification should not be construed as a limitation on the scope. The true scope should be determined in terms of the appended claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A wireless communication apparatus for receiving a packet formed of a signal modulated by orthogonal frequency division multiplexing, comprising:
    a band-pass filter that extracts an orthogonal-frequency-division-multiplexing signal of a desired band;
    a low-noise amplifier having a gain controlled according to a received-signal intensity to amplify the orthogonal-frequency-division-multiplexing signal of the desired band;
    a frequency converter that down-converts the amplified orthogonal-frequency-division-multiplexing signal into a baseband signal;
    an analog-digital converter that converts the baseband signal into a digital signal;

a first high-pass filter that removes a DC offset from the digital signal corresponding to a predetermined preamble portion of the packet;
a frequency-offset estimator that estimates a frequency offset from sample signals constituting the digital signal from which the DC offset has been removed by the first high-pass filter;
a frequency-offset corrector that removes the estimated frequency offset from the digital signal; and
a demodulator that demodulates subcarrier signals arranged in a frequency domain from the digital signal compensated for the frequency offset.

2. The wireless communication apparatus according to claim 1, wherein the first high-pass filter comprises a differential filter.

3. The wireless communication apparatus according to claim 1, wherein upon detecting a rapid DC-offset change, the first high-pass filter inputs a detection signal to the frequency-offset estimator, and
the frequency-offset estimator does not perform frequency-offset estimation for a sample signal obtained from the first high-pass filter when the detection signal is input from among the sample signals.

4. The wireless communication apparatus according to claim 1, wherein the orthogonal-frequency-division-multiplexing signal input to the wireless communication apparatus does not include a DC subcarrier, and
the frequency-offset estimator estimates a frequency offset using a preamble in which two orthogonal-frequency-division-multiplexing symbols are transmitted.

5. The wireless communication apparatus according to claim 4, wherein one orthogonal-frequency-division-multiplexing symbol is formed of n subcarriers,
when an i-th sample of the time waveform of the two transmitted orthogonal-frequency-division-multiplexing symbols is represented by s(i), samples of the first transmitted orthogonal-frequency-division-multiplexing symbol are represented by $\{s(0), s(1), s(n-1)\}$, samples of the second transmitted orthogonal-frequency-division-multiplexing symbol are represented by $\{s(n), s(n+1), s(2n-1)\}$, the frequency offset is represented by $\Delta f$, and the DC offset is represented by D, the baseband signal r(i) is given by equation (1) below, and the first high-pass filter performs an operation given by equation (2) below on the baseband signal, and outputs a sample signal d(i), and
the frequency-offset corrector performs an operation given by the following equation (3) below using the sample signal d(i) to estimate the frequency offset $\Delta f$:

$$r(i) = s(i)\exp(j2\pi\Delta f i) + D \qquad (1)$$

$$d(i) = r(i+1) - r(i) \qquad (2)$$
$$= s(i+1)\exp(j2\pi\Delta f(i+1)) - s(i)\exp(j2\pi\Delta f i)$$

$$d(i+n)/d(i) = \frac{s(i+1+n)\exp(j2\pi f(i+1+n)) - s(i+n)\exp(j2\pi f(i+n))}{s(i+1)\exp(j2\pi f(i+1)) - s(i)\exp(j2\pi f(i))} \qquad (3)$$
$$= \exp(j2\pi\Delta f(n)).$$

6. The wireless communication apparatus according to claim 5, wherein when the absolute value of the output sample signal d(i) is large due to a DC-offset change between the i-th and (i+1)-th samples, given by D(i+1)−D(i), according to the following equation:

$$d(i) = r(i+1) - r(i) \qquad (4)$$
$$= \{s(i+1)\exp(j2\pi\Delta f(i+1)) - s(i)\exp(j2\pi\Delta f i)\} +$$
$$\{D(i+1) - D(i)\}$$

the first high-pass filter outputs to the frequency-offset estimator a detection signal for not estimating a frequency offset by performing the operation given by the equation (3) for the i-th sample.

7. The wireless communication apparatus according to claim 1, wherein the frequency converter converts the amplified orthogonal-frequency-division-multiplexing signal of the desired band into a baseband signal using a local frequency generated by a local oscillator according to a direct-conversion scheme, and
the phase of the local frequency oscillated by the local oscillator is inverted according to the frequency offset estimated by the frequency-offset estimator.

8. The wireless communication apparatus according to claim 1, further comprising:
a DC-offset estimator that estimates a DC offset in the digital baseband signal converted by the analog-digital converter; and
a DC-offset corrector that removes the estimated DC offset from the converted digital baseband signal.

9. The wireless communication apparatus according to claim 8, wherein upon detecting a rapid DC-offset change, the first high-pass filter inputs a detection signal to the DC-offset estimator, and
the DC-offset estimator excludes an estimated DC-offset value determined before the detection signal is input, and re-estimates a DC offset.

10. The wireless communication apparatus according to claim 1, further comprising a second high-pass filter that filters the baseband signal output from the frequency converter,
wherein the analog-digital converter converts the baseband signal transmitted through the second high-pass filter into a digital signal.

11. The wireless communication apparatus according to claim 10, wherein a cutoff frequency of the second high-pass filter is set lower than a cutoff frequency of the first high-pass filter.

12. The wireless communication apparatus according to claim 8, further comprising a detector that performs packet detection and coarse timing detection using an output signal of the first high-pass filter.

13. The wireless communication apparatus according to claim 12, further comprising a switch that exclusively connects an output terminal of the analog-digital converter to a path directed to the first high-pass filter or a path directed to the DC-offset corrector.

14. The wireless communication apparatus according to claim 13, wherein the switch switches the output terminal of the analog-digital converter from the path directed to the first high-pass filter to the path directed to the DC-offset corrector at a time when the detector detects the end of the predetermined preamble portion used for frequency-offset estimation.

15. The wireless communication apparatus according to claim 14, wherein the frequency-offset estimator estimates a frequency offset for a period of time until the end of the predetermined preamble portion using the digital signal from which the DC offset has been removed using the first high-pass filter.

16. The wireless communication apparatus according to claim 14, wherein the DC-offset estimator estimates a DC offset for a period of time until the end of the predetermined preamble portion, and the DC-offset corrector corrects the estimated DC offset from a portion of the digital signal subsequent to the end of the predetermined preamble portion.

17. The wireless communication apparatus according to claim 14, wherein the frequency-offset estimator estimates a frequency offset for a period of time until the end of the predetermined preamble portion, and the frequency-offset corrector corrects the estimated frequency offset from a portion of the digital signal subsequent to the end of the predetermined preamble portion.

18. The wireless communication apparatus according to claim 13, further comprising a switch controller that determines a moving average value of correlation values of output signals of the analog-digital converter and that controls switching of the switch at a time when the moving average value exceeds a predetermined threshold value.

19. The wireless communication apparatus according to claim 13, wherein the received packet includes a short preamble portion formed of a short training sequence with a relatively large subcarrier spacing, and a long preamble portion formed of a long training sequence with a relatively small subcarrier spacing, and the switch switches the output terminal of the analog-digital converter from the path directed to the first high-pass filter to the path directed to the DC-offset corrector at the beginning of the long preamble portion subsequent to the end of the short preamble portion.

20. The wireless communication apparatus according to claim 19, wherein the frequency-offset estimator estimates a frequency offset in the short preamble portion, and the frequency-offset corrector removes the estimated frequency offset from the long preamble portion, and the DC-offset estimator estimates a DC offset in the short preamble portion, and the DC-offset corrector removes the estimated DC offset from the long preamble portion, the wireless communication apparatus further comprising a second frequency-offset estimator that estimates a frequency offset from a portion of the digital signal subsequent to the long preamble portion from which the frequency offset and DC offset estimated in the short preamble portion have been removed, and a second frequency-offset corrector that removes the frequency offset estimated by the second frequency-offset estimator from the portion of the digital signal subsequent to the long preamble portion.

21. The wireless communication apparatus according to claim 19, wherein the frequency-offset estimator estimates a frequency offset in the short preamble portion, and the frequency-offset corrector removes the estimated frequency offset from the long preamble portion, the DC-offset estimator estimates a DC offset in the short preamble portion, and the DC-offset corrector removes the estimated DC offset from the long preamble portion, a portion of the digital signal subsequent to the long preamble portion from which the frequency offset and DC offset estimated in the short preamble portion have been removed is fed back to the frequency-offset estimator to estimate a frequency offset from the portion of the digital signal subsequent to the long preamble portion, and the frequency-offset corrector removes the estimated frequency offset from the portion of the digital signal subsequent to the long preamble portion.

22. The wireless communication apparatus according to claim 20 or 21, further comprising a channel estimator that estimates a channel from the digital signal from which the frequency offset and DC offset estimated in the short preamble portion have been removed and from which the frequency offset estimated in the portion of the digital signal subsequent to the long preamble portion has been corrected.

23. The wireless communication apparatus according to claim 1, further comprising:

an in-phase-and-quadrature-phase-imbalance estimator that estimates an in-phase and quadrature-phase imbalance from the sample signals from which the DC offset has been removed by the first high-pass filter; and an in-phase-and-quadrature-phase-imbalance corrector that corrects the in-phase and quadrature-phase imbalance from the digital signal.

24. The wireless communication apparatus according to claim 23, wherein the in-phase-and-quadrature-phase-imbalance corrector performs in-phase-and-quadrature-phase-imbalance correction on the digital signal from which the DC offset has been corrected.

25. The wireless communication apparatus according to claim 23, wherein the frequency-offset corrector removes the estimated frequency-offset from the digital signal from which the in-phase and quadrature-phase imbalance has been corrected by the in-phase-and-quadrature-phase-imbalance corrector.

26. The wireless communication apparatus according to claim 1, wherein a plurality of preamble symbols used for frequency-offset estimation are transmitted, and the frequency-offset estimator sums frequency offsets each estimated for one of the preamble symbols to obtain a final estimated frequency-offset value.

27. The wireless communication apparatus according to claim 26, further comprising a gain controller that adjusts the gain of the low-noise amplifier, wherein the frequency-offset estimator weights each of the frequency offsets estimated for the preamble symbols according to the gain set in the low-noise amplifier when the corresponding preamble symbol is received, and sums the weighted frequency offsets to obtain a final frequency-offset value.

28. The wireless communication apparatus according to claim 26, wherein the frequency-offset estimator calculates a weighting factor on the basis of the absolute value of the frequency offset estimated for each of the preamble symbols, weights the frequency offsets by the weighting factors, and sums the weighted frequency offsets to obtain a final frequency-offset value.

29. The wireless communication apparatus according to claim 28, wherein the frequency-offset estimator weights the frequency offsets estimated for the preamble symbols by applying a weighting factor of 0 to a frequency offset whose absolute value exceeds a predetermined threshold value and a weighting factor of 1 to a frequency offset whose absolute value does not exceed the predetermined threshold value, and sums the weighted frequency offsets to obtain a final frequency-offset value.

30. The wireless communication apparatus according to claim 29, wherein the frequency-offset estimator determines the predetermined threshold value on the basis of the received signal intensity.

31. The wireless communication apparatus according to claim 28, wherein the frequency-offset estimator weights the frequency offsets estimated for the preamble symbols by applying weighting factors formed of the inverse of the absolute values of the frequency offsets to the frequency offsets, and sums the weighted frequency offsets to obtain a final frequency-offset value.

* * * * *